(12) United States Patent
Sekine et al.

(10) Patent No.: US 11,647,130 B2
(45) Date of Patent: May 9, 2023

(54) INFORMATION PROCESSING SYSTEM CAPABLE OF CONNECTING A PLURALITY OF VOICE CONTROL DEVICES, METHOD OF CONTROLLING INFORMATION PROCESSING SYSTEM, AND STORAGE MEDIUM

(71) Applicant: CANON KABUSHIKI KAISHA, Tokyo (JP)

(72) Inventors: Hiroshi Sekine, Chiba (JP); Masato Fukuda, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/829,684

(22) Filed: Jun. 1, 2022

(65) Prior Publication Data
US 2022/0394142 A1 Dec. 8, 2022

(30) Foreign Application Priority Data
Jun. 8, 2021 (JP) .............................. JP2021-096097

(51) Int. Cl.
*G06F 3/12* (2006.01)
*H04N 1/00* (2006.01)

(52) U.S. Cl.
CPC ..... *H04N 1/00403* (2013.01); *H04N 1/00244* (2013.01); *H04N 2201/0094* (2013.01)

(58) Field of Classification Search
CPC ........... H04N 1/00403; H04N 1/00244; H04N 2201/0094
See application file for complete search history.

(56) References Cited

U.S. PATENT DOCUMENTS

| 9,648,191 B2 | 5/2017 | Ito |
| 2011/0238421 A1* | 9/2011 | Nobutani ................... B41J 3/44 704/E13.011 |
| 2019/0068810 A1* | 2/2019 | Okamoto ............. G06F 3/1229 |
| 2019/0156824 A1* | 5/2019 | Maeda ................... G06F 3/167 |

FOREIGN PATENT DOCUMENTS

JP        2016035514 A      3/2016

\* cited by examiner

*Primary Examiner* — Moustapha Diaby
(74) *Attorney, Agent, or Firm* — Rossi, Kimms & McDowell LLP

(57) ABSTRACT

An information processing system that is configured such that a plurality of speakers are coordinated with one information processing apparatus and is capable of coping with a state of competition between instructions to the speakers. An information processing system includes an image forming apparatus, a first voice control device that receives a voice instruction to the image forming apparatus, and a second voice control device that receives a voice instruction to the image forming apparatus. The image forming apparatus is controlled to execute a job based on information on which of the first voice control device and the second voice control device is a device which is to be preferentially used.

14 Claims, 50 Drawing Sheets

*FIG. 7B1*

| GROUP ID | VOICE RECOGNITION RESULT | |
| --- | --- | --- |
| | KANA | AFTER KANA-KANJI CONVERSION |
| OPR00000 | ソウサ(OPERATION) | 操作 |
| OPR00001 | タッチ (TOUCH) | |
| | タップ (TAP) | |
| | オス(PUSH) | 押す |
| | オウカ(DEPRESS) | 押下 |
| | クリック(CLICK) | |
| OPR00002 | ロングタッチ(LONG TOUCH) | |
| | ロングタップ(LONG TAP) | |
| | ナガオシ(LONG PRESS) | 長押し |
| OPR00003 | スワイプ (SWIPE) | |
| OPR00004 | スライド(SLIDE) | |
| OPR00005 | スクロール(SCROLL) | |
| OPR00010 | オーケー(OK) | OK |
| | オッケー (OK) | |
| | カクテイ(FINALLY DETERMINE) | 確定 |
| | ケッテイ (DECIDE) | 決定 |
| | キマリ(DETERMINE) | 決まり |
| OPR00011 | カイシ (START) | 開始 |
| | スタート(START) | |
| | ハジメ (START) | 始め |
| OPR00012 | シュウリョウ (TERMINATE) | 終了 |
| | オワリ(END) | 終わり |
| | カンリョウ (COMPLETE) | 完了 |
| OPR00013 | キャンセル (CANCEL) | |
| | チュウシ (STOP) | 中止 |
| OPR00014 | テイシ (SUSPEND) | 停止 |
| | ポーズ (PAUSE) | |
| OPR00020 | トジル(CLOSE) | 閉じる |
| | トジテ (CLOSE) | 閉じて |
| | クローズ (CLOSE) | |
| ⋮ | | |
| OPR00040 | センタク(SELECT) | 選択 |
| | セッテイ(SET) | 設定 |
| | シテイ(DESIGNATE) | 指定 |
| OPR00041 | ヘンコウ(CHANGE) | 変更 |
| | ヘンシュウ (EDIT) | 編集 |
| OPR00042 | ホセイ(CORRECT) | 補正 |
| | シュウセイ(CORRECT) | 修正 |
| | チョウセイ (ADJUST) | 調整 |
| OPR00043 | サクジョ(DELETE) | 削除 |
| | ケシ (DELETE) | 消し |
| | ケス(DELETE) | 消す |
| | ショウキョ (DELETE) | 消去 |
| | ジョキョ(REMOVE) | 除去 |
| | ナクス(ELIMINATE) | なくす |
| | ナクシテ(ELIMINATE) | なくして |
| | カット(CUT) | |
| OPR00044 | カイジョ(RELEASE) | 解除 |
| | クリア (CLEAR) | |
| OPR00045 | リセット(RESET) | |
| | ヤリナオシ (REDO) | やり直し |
| OPR00046 | トウロク (REGISTER) | 登録 |
| ⋮ | | |

*FIG. 7B2*

| GROUP ID | VOICE RECOGNITION RESULT | |
|---|---|---|
| | KANA | AFTER KANA-KANJI CONVERSION |
| FNC00000 | キノウ(FUNCTION) | 機能 |
| | ファンクション(FUNCTION) | |
| FNC00001 | コピー(COPY) | |
| | フクシャ(COPY) | 複写 |
| | フクセイ(DUPLICATE) | 複製 |
| FNC00002 | インサツ(PRINT) | 印刷 |
| | プリント(PRINT) | |
| FNC00003 | スキャン(SCAN) | |
| | ヨミトリ(READ) | 読み取り |
| | ヨミコミ(READ) | 読み込み |
| FNC00004 | ホゾン(SAVE) | 保存 |
| | ホカン(KEEP) | 保管 |
| | カクノウ(STORE) | 格納 |
| | ノコス(LEAVE) | 残す |
| | ホールド(HOLD) | |
| | キロク(RECORD) | 記録 |
| | カキコミ(WRITE) | 書き込み |
| FNC00005 | ソウシン(TRANSMIT) | 送信 |
| | センド(SEND) | |
| FNC00006 | ジュシン(RECEIVE) | 受信 |
| | レシーブ(RECEIVE) | |
| FNC00007 | スプール(SPOOL) | |
| | タマッテ(ACCUMULATE) | 溜まって |
| FNC00008 | ショウカイ(INTRODUCE) | 紹介 |
| | ヘルプ(HELP) | |
| | ガイド(GUIDE) | |
| | イントロ(INTRODUCTION) | |

⋮

| GROUP ID | VOICE RECOGNITION RESULT | |
|---|---|---|
| | KANA | AFTER KANA-KANJI CONVERSION |
| NUM00000 | ゼロ(ZERO) | 0、零 |
| | レイ(ZERO) | 0、零 |
| | ゼロバン(No. 0) | 0番、零番 |
| | レイバン(No. 0) | 0番、零番 |
| NUM00001 | イチ(ONE) | 1、一 |
| | イチバン(No. 1) | 1番、一番 |
| | ヒトツメ(FIRST) | 1つ目、一つ目 |
| NUM00002 | ニ(TWO) | 2、二 |
| | ニバン(No. 2) | 2番、二番 |
| | フタツメ(SECOND) | 2つ目、二つ目 |
| NUM00003 | サン(THREE) | 3、三 |
| | サンバン(No. 3) | 3番、三番 |
| | ミッツメ(THIRD) | 3つ目、三つ目 |
| NUM00004 | ヨン(FOUR) | 4、四 |
| | ヨンバン(No. 4) | 4番、四番 |
| | ヨッツメ(FOURTH) | 4つ目、四つ目 |

| NUM00050 | ゴジュウ(FIFTY) | 50、五十 |
|---|---|---|
| | ゴジュウバンメ(50-TH) | 50番、五十番 |

| NUM99999 | キュウマンキュウセンキュウヒャクキュウジュウキュウ (NINETY-NINE THOUSAND NINE HUNDRED NINETY NINE) | 99999、九万九千九百九十九 |
|---|---|---|
| | キュウマンキュウセンキュウヒャクキュウジュウキュウバン (No. 9999) | 99999、九万九千九百九十九番 |

| GROUP ID | VOICE RECOGNITION RESULT | |
|---|---|---|
| | KANA | AFTER KANA-KANJI CONVERSION |
| PAP00000 | ヨウシ(SHEET) | 用紙 |
| | カミ(PAPER) | 紙 |
| | シート(SHEET) | |
| | ペーパー(PAPER) | |
| PAP00001 | サイズ(SIZE) | |
| | オオキサ(MAGNITUDE) | 大きさ |
| PAP00002 | ケイレツ(SERIES) | 系列 |
| | ケイトウ(SYSTEM) | 系統 |
| | カテゴリ(CATEGORY) | |
| | カテゴリー(CATEGORY) | |
| PAP00003 | イサイズ(DIFFERENT SIZE) | 異サイズ |
| PAP00004 | ドウハバ(SAME WIDTH) | 同幅 |
| PAP00005 | イハバ(DIFFERENT WIDTH) | 異幅 |
| PAP00100 | エイサン(A3) | A3 |
| | エーサン(A3) | A3 |
| PAP00101 | エイヨン(A4) | A4 |
| | エーヨン(A4) | A4 |
| PAP00102 | エイゴ(A5) | A5 |
| | エーゴ(A5) | A5 |
| PAP00103 | ビイヨン(B4) | B4 |
| | ビーヨン(B4) | B4 |

⋮

| GROUP ID | VOICE RECOGNITION RESULT | |
|---|---|---|
| | KANA | AFTER KANA-KANJI CONVERSION |
| CNF00001 | ブ(COPY) | 部 |
| | ブスウ(NUMBER OF COPIES) | 部数 |
| CNF00002 | ノウド(DENSITY) | 濃度 |
| | コサ(THICKNESS) | 濃さ |
| | コク(DARKLY) | 濃く |
| CNF00003 | センメイ(VIVID) | 鮮明 |
| | シャープ(SHARP) | |
| | シャープネス(SHARPNESS) | |
| CNF00004 | アテサキ(DESTINATION) | 宛先 |
| CNF00005 | リョウメン(DOUBLE-SIDED) | 両面 |

⋮

| GROUP ID | VOICE RECOGNITION RESULT | |
|---|---|---|
| | KANA | AFTER KANA-KANJI CONVERSION |
| NAM00001 | ソウチ(APPARATUS) | 装置 |
| | デバイス(DEVICE) | |
| NAM00002 | ユウセン(PRIORITY) | 優先 |
| | プライオリティ(PRIORITY) | |

⋮

| NAM00006 | トナー(TONER) | |
|---|---|---|
| | カートリッジ(CARTRIDGE) | |
| NAM00007 | ザンリョウ(REMAINING AMOUNT) | 残量 |
| | ノコリ(REMAINDER) | 残り |

| GROUP ID | VOICE RECOGNITION RESULT | |
| --- | --- | --- |
| | KANA | AFTER KANA-KANJI CONVERSION |
| ALP00001 | エー(A) | A |
| ALP00002 | ビー(B) | B |
| ⋮ | | |
| ALP00006 | エフ(F) | F |
| ⋮ | | |
| ALP00013 | エム(M) | M |
| ⋮ | | |
| ALP00016 | ピー(P) | P |
| ⋮ | | |

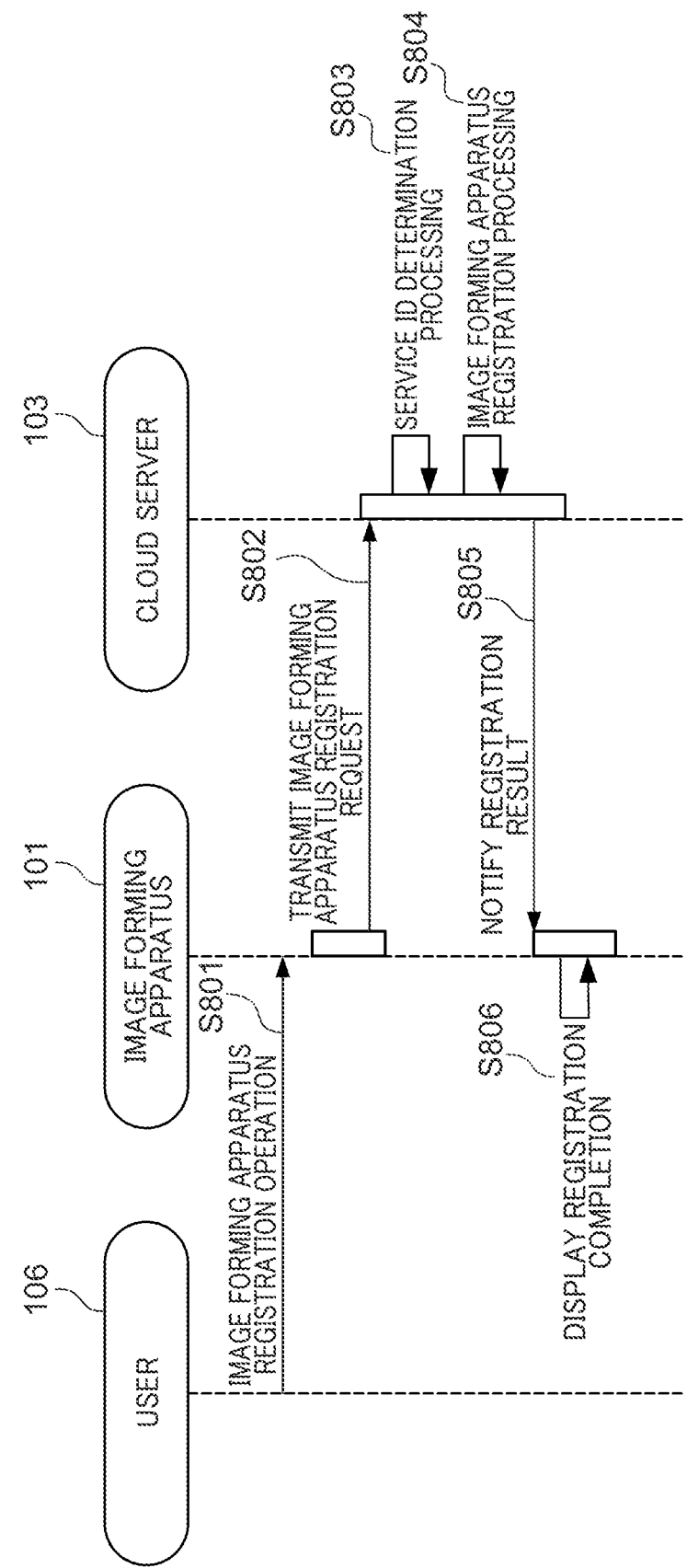

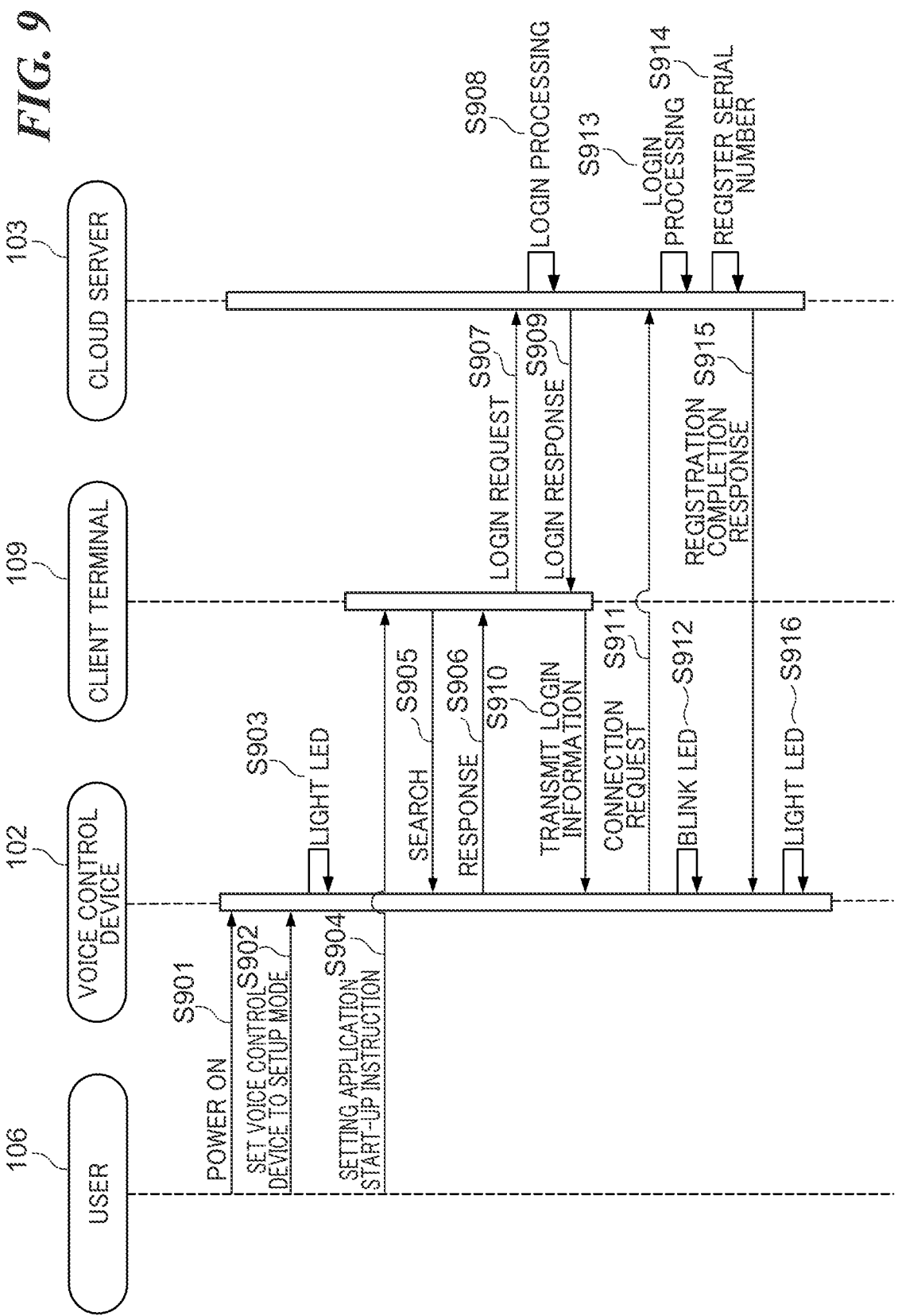

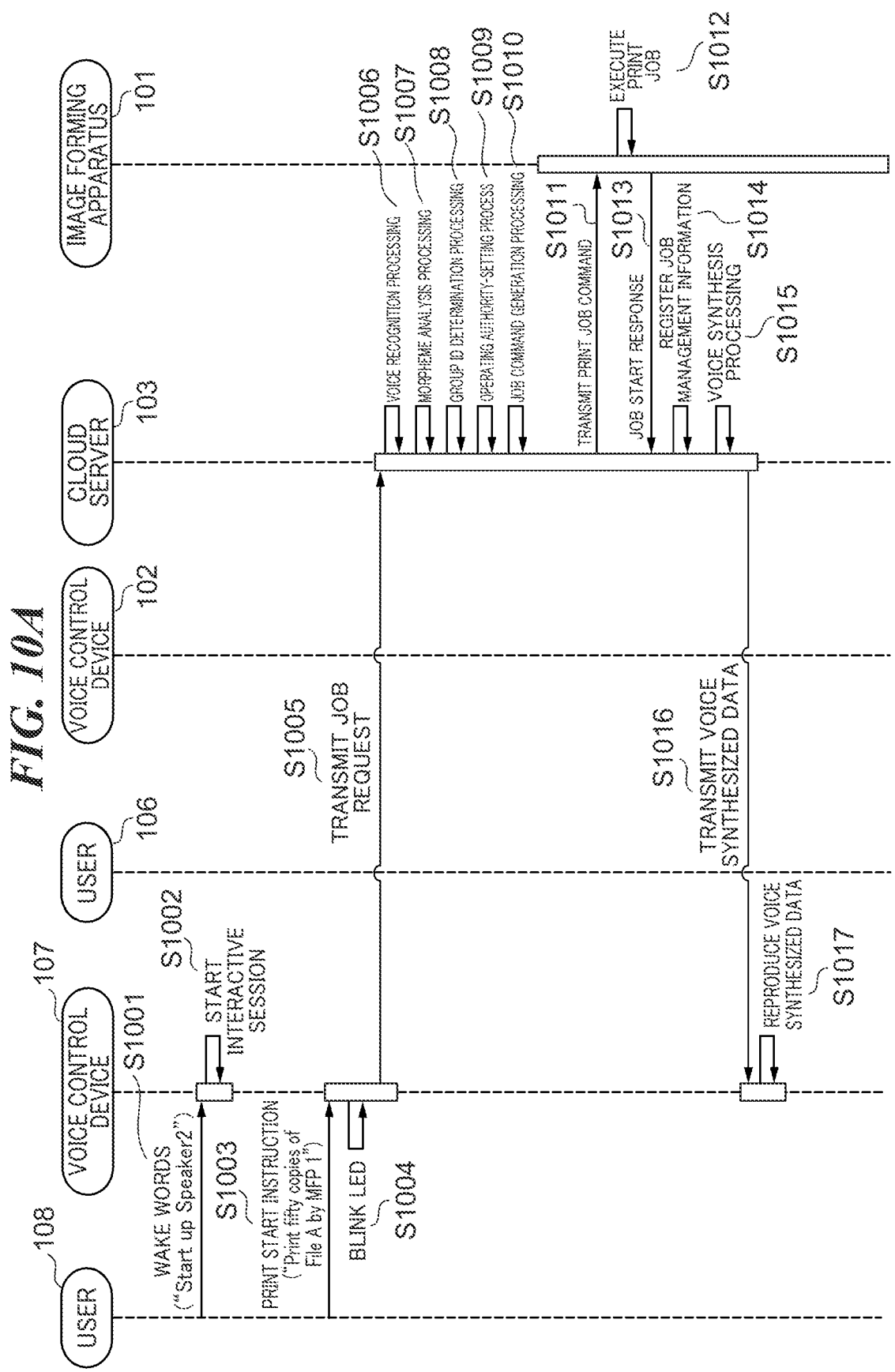

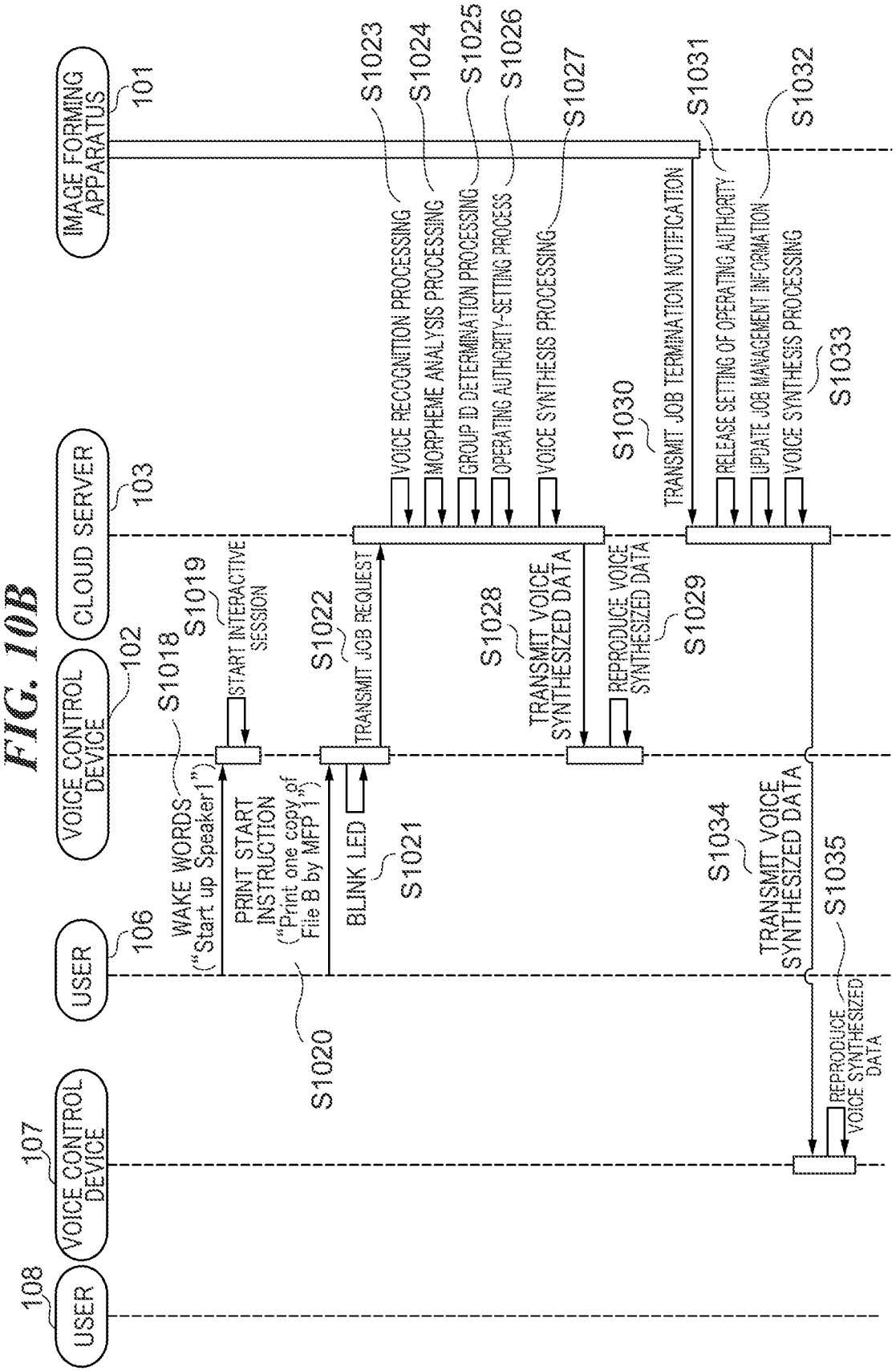

FIG. 11

1101 — https://

- SERVICE URL — 1103
- SERVICE ID — 1104
- PASSWORD — 1105

1106 — LOGIN / RESET

*INPUT VALUES IN ITEMS & PRESS "LOGIN" BUTTON*

↓

1107 — https://

SETTING MENU
- VOICE CONTROL DEVICE REGISTRATION
- MFP REGISTRATION
- PRIORITY SETTING — 1108

*PRESS "PRIORITY SETTING"*

↓

1109 — https://

MFP SELECTION — 1110
- MFP 1
- MFP 2
- MFP 3

*SELECT "MFP 1"*

↓

1111 — https://

PRIORITY SETTING FOR MFP 1
VOICE CONTROL DEVICE PRIORITY SETTING

| VOICE CONTROL DEVICE | PRIORITY |
|---|---|
| SPEAKER 1 | 1 |
| SPEAKER 2 | 2 |
| SPEAKER 3 | 3 |
| SPEAKER 4 | 4 |

1112 — OK / RESET

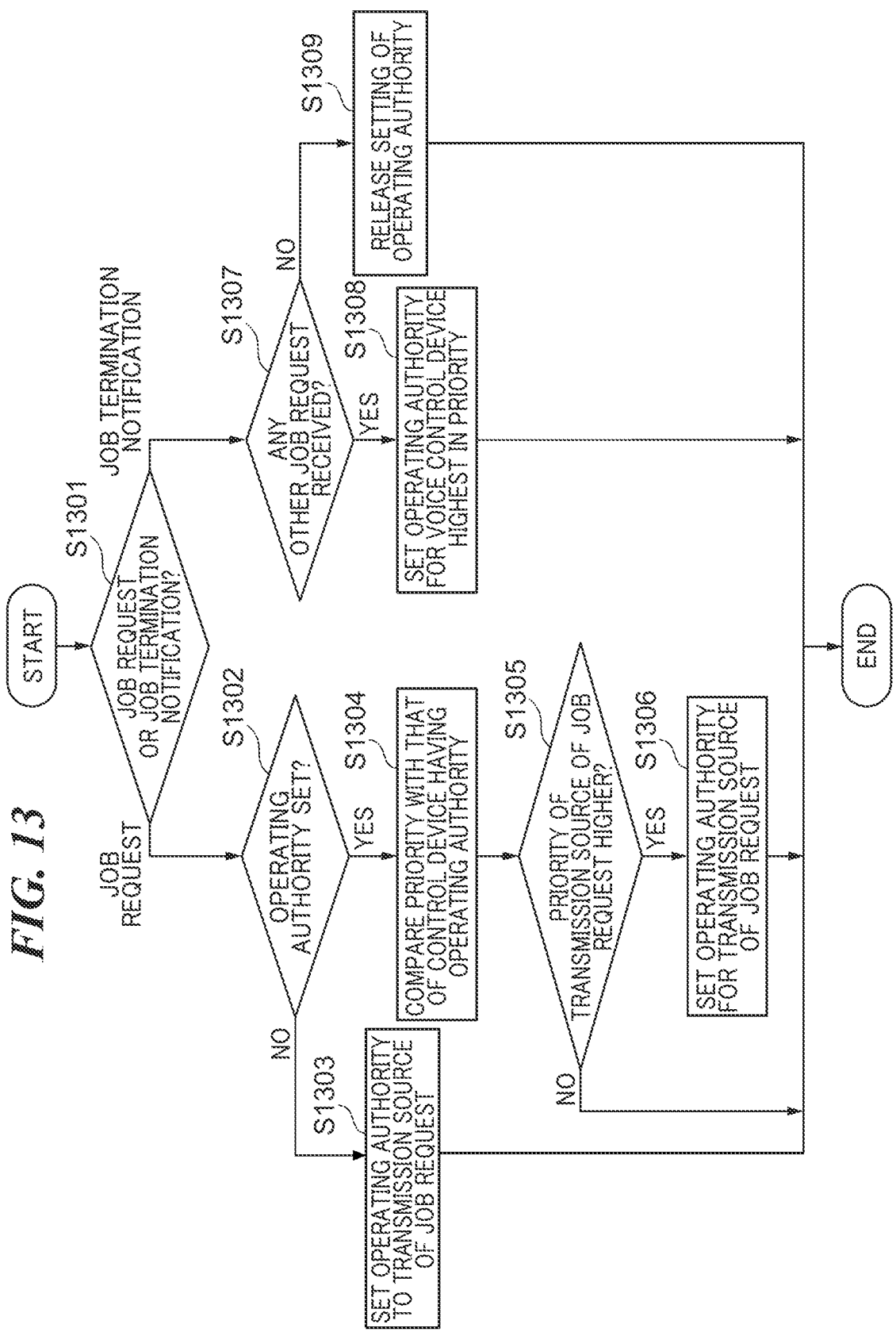

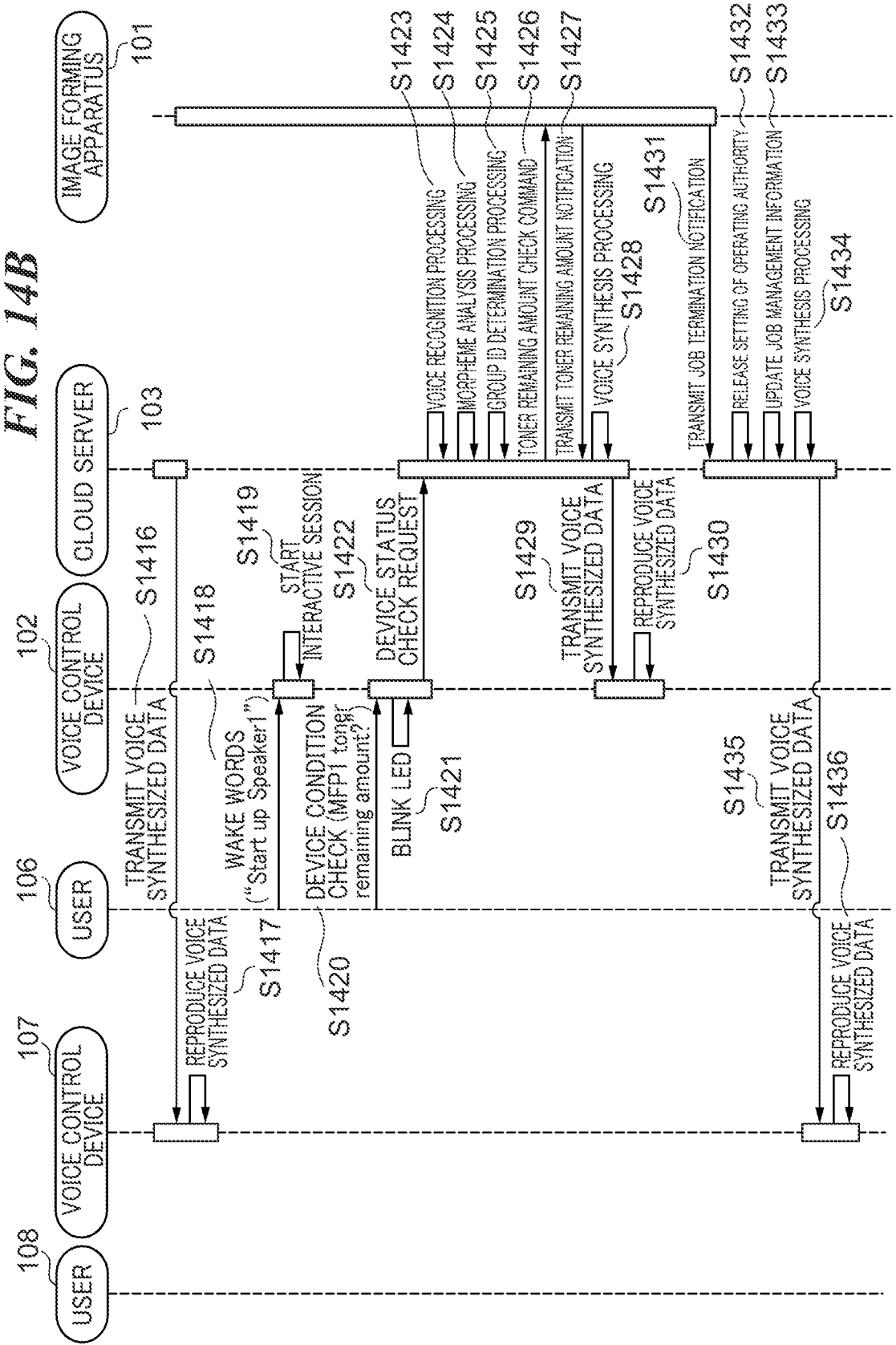

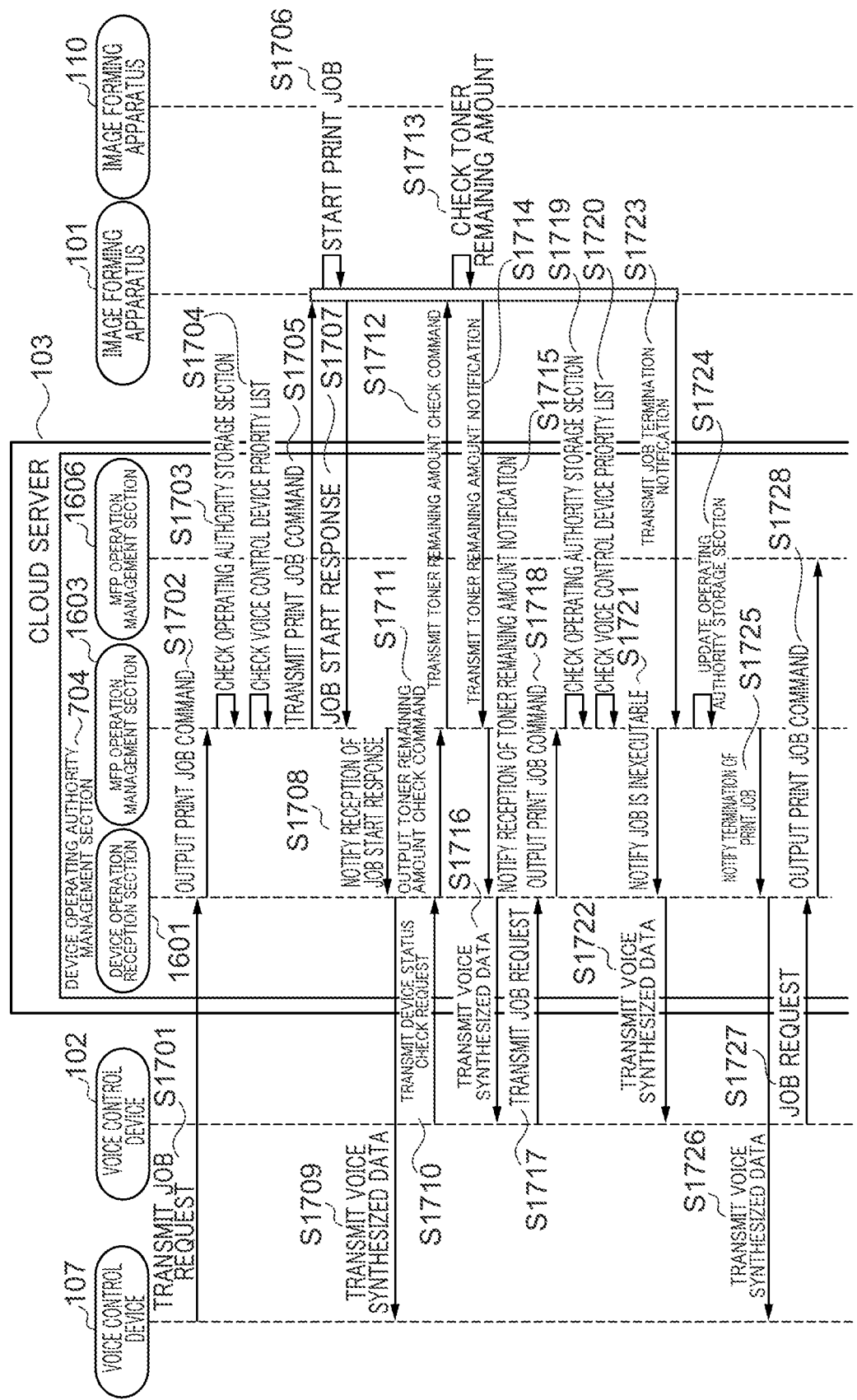

| JOB TYPE | DEVICE STATUS CHECK | PRINT JOB | COPY JOB | SCAN JOB | |
|---|---|---|---|---|---|
| EXCLUSIVE LEVEL 1 | POSSIBLE | POSSIBLE | IMPOSSIBLE | POSSIBLE | 1805 |
| EXCLUSIVE LEVEL 2 | POSSIBLE | IMPOSSIBLE | IMPOSSIBLE | IMPOSSIBLE | 1806 |
| EXCLUSIVE LEVEL 3 | IMPOSSIBLE | IMPOSSIBLE | IMPOSSIBLE | IMPOSSIBLE | 1807 |

FIG. 22

| SERVICE ID | SERIAL NUMBER OF IMAGE FORMING APPARATUS | IP | PRIORITY DEVICE |
|---|---|---|---|
| user1@aaa.com | mfp_serial111 | xxx.xxx.xxx.xxx | SPEAKER 1 |
| user1@aaa.com | mfp_serial112 | xxx.xxx.xxx.xxy | SPEAKER 1 |
| user2@aaa.com | mfp_serial222 | zzz.zzz.zzz.zzx | |

*FIG. 23*

| SERVICE ID | SERIAL NUMBER OF IMAGE FORMING APPARATUS | NICKNAME |
|---|---|---|
| user1@aaa.com | mfp_serial111 | MFP 1 |
| user1@aaa.com | mfp_serial111 | MULTI-FUNCTION PERIPHERAL 1 |
| user2@aaa.com | mfp_serial222 | MFP 1 |

FIG. 26

| SERVICE ID | SERIAL NUMBER OF VOICE CONTROL DEVICE | IP |
|---|---|---|
| user1@aaa.com | SPEAKER 1 | yyy.yyy.yyy.xxx |
| user1@aaa.com | SPEAKER 2 | yyy.yyy.yyy.xxy |
| user1@aaa.com | SPEAKER 3 | yyy.yyy.yyy.xyy |
| user1@aaa.com | SPEAKER A | yyy.yyy.yyy.yyy |
| user1@aaa.com | SPEAKER B | yyy.yyy.yyy.yxy |
| user1@aaa.com | SPEAKER C | yyy.yyy.yyy.yyx |
| user2@aaa.com | SPEAKER Z | zzz.yyy.yyy.xxy |

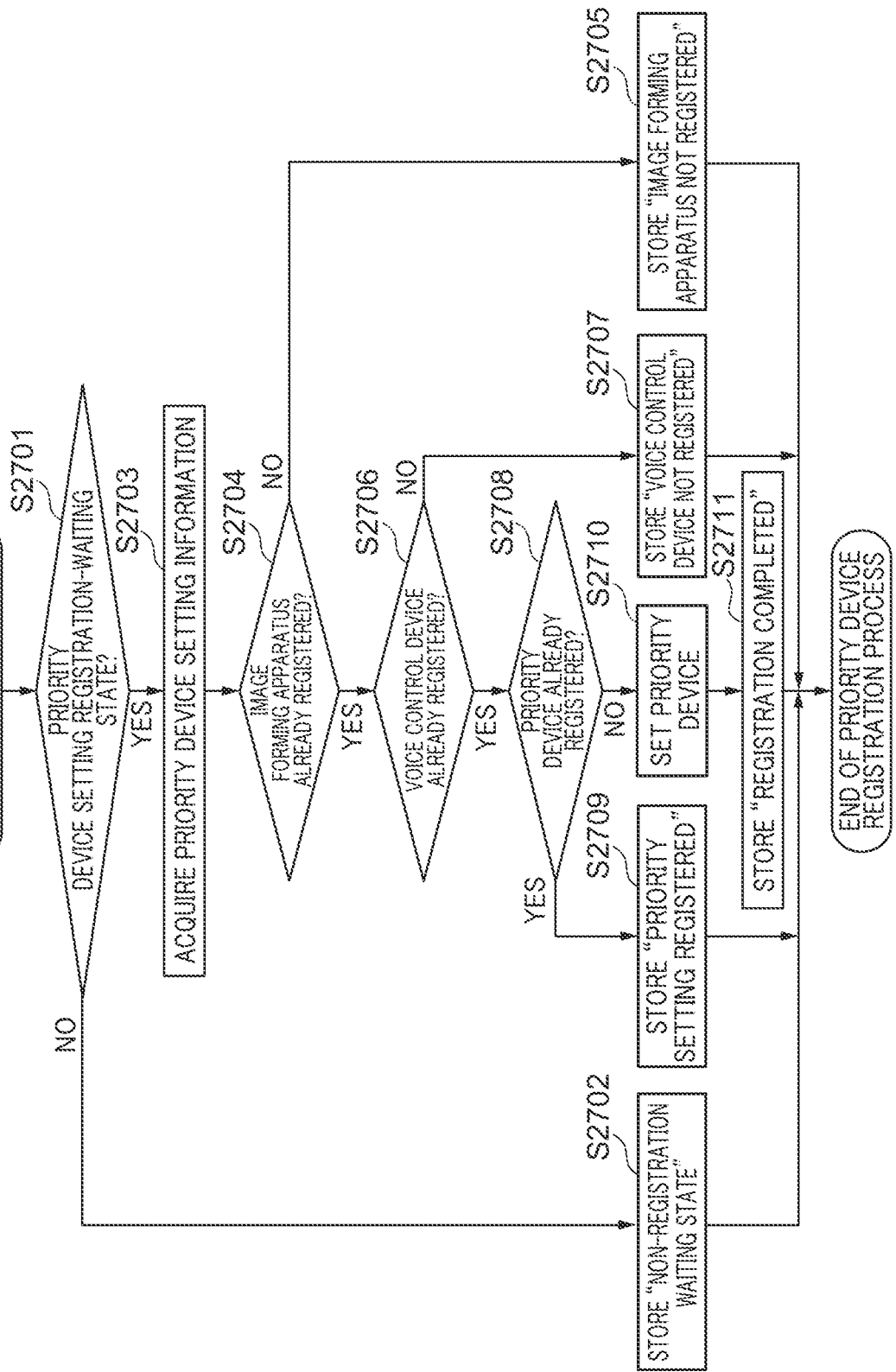

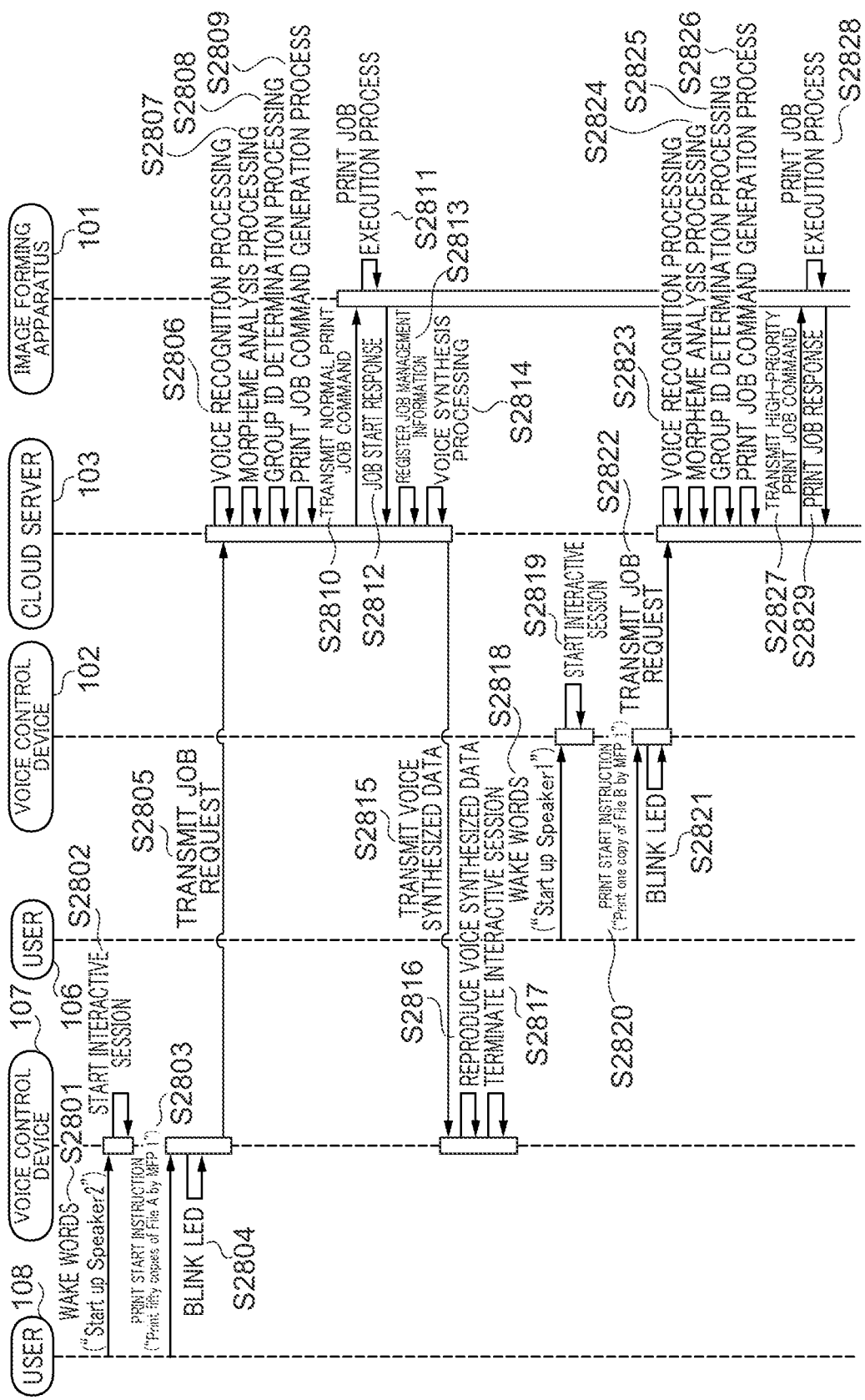

FIG. 29

```
{
    "command":[
    {
        "operation":"jobStart"
    },
    {
        "parameter":{
            "jobName":"Print",
            "priority":"low",
            "file" :[
                {
                    "format":"JPEG",
                    "data":"xxxx…",
                    "copies":"50",
                },
            ]
        },
    }
    ]
}
```

FIG. 30

```
{
    "command":[
    {
        "operation":"jobStart"
    },
    {
        "parameter":{
            "jobName":"Print",
            "priority":"high",
            "file" :[
                {
                    "format":"JPEG",
                    "data":"yyyy...",
                    "copies":"1",
                },
            ]
        },
    }
    ]
}
```

*FIG. 32*

| SERVICE ID | FILE WORD | FILE PATH | FORMAT |
|---|---|---|---|
| user1@aaa.com | FILE A | ¥user1¥file¥fileA.jpg | JPEG |
| user1@aaa.com | FILE B | ¥user1¥file¥fileB.jpg | JPEG |

FIG. 34

| KEYWORD | NUMERIC VALUE PERMISSION | JOB COMMAND |
|---|---|---|
| CNF00001 | Yes | "copies":"#NUM#" |
| CNF00005 | No | "duplex":"on" |

INFORMATION PROCESSING SYSTEM CAPABLE OF CONNECTING A PLURALITY OF VOICE CONTROL DEVICES, METHOD OF CONTROLLING INFORMATION PROCESSING SYSTEM, AND STORAGE MEDIUM

BACKGROUND OF THE INVENTION

Field of the Invention

The present invention relates to an information processing system capable of connecting a plurality of voice control devices, a method of controlling the information processing system, and a storage medium.

Description of the Related Art

There is known a system in which a print job is input by speech of a user (see e.g. Japanese Laid-Open Patent Publication (Kokai) No. 2016-35514). In recent years, the widespread use of a smart speaker has made it easy to establish the above-mentioned system by causing the smart speaker and an information processing apparatus to cooperate via a network.

Here, conventionally, a case has not been considered where a plurality of smart speakers are coordinated with one information processing apparatus. In the configuration in which a plurality of smart speakers are coordinated with one information processing apparatus, in a case where instructions are provided to the plurality of smart speakers almost at the same time, competition between the instructions can occur. For this reason, a system which can properly cope with such a competing state is desired.

SUMMARY OF THE INVENTION

The present invention provides an information processing system that is configured such that a plurality of speakers are coordinated with one information processing apparatus and is capable of coping with a state of competition between instructions to the speakers, a method of controlling the information processing system, and a storage medium.

In a first aspect of the present invention, there is provided an information processing system including an information processing apparatus, a first voice control device that receives a voice instruction to the information processing apparatus, and a second voice control device that receives a voice instruction to the information processing apparatus, at least one processor, and a memory coupled to the at least one processor, the memory having instructions that, when executed by the processor, perform the operations as: a control unit configured to preform control for causing the information processing apparatus to execute a job based on information on which of the first voice control device and the second voice control device is a device which is to be preferentially used.

In a second aspect of the present invention, there is provided a method of controlling an information processing system including an information processing apparatus, a first voice control device that receives a voice instruction to the information processing apparatus, and a second voice control device that receives a voice instruction to the information processing apparatus, including preforming control for causing the information processing apparatus to execute a job based on information on which of the first voice control device and the second voice control device is a device which is to be preferentially used.

According to the invention, it is possible to cope with a state of competition between instructions to a plurality of speakers of an information processing system configured such that the speakers are coordinated with one information processing apparatus.

Further features of the present invention will become apparent from the following description of exemplary embodiments (with reference to the attached drawings).

BRIEF DESCRIPTION OF THE DRAWINGS

FIG. 4 is a schematic block diagram of a cloud server appearing in

FIG. 1.

FIGS. 7B1 to 7B4 are diagrams each showing an example of a group ID list used by a group ID determination section appearing in FIG. 7A.

FIG. 8 is a sequence diagram useful in explaining a flow of registration of an image forming apparatus for the information processing system shown in FIG. 1.

FIG. 9 is a sequence diagram useful in explaining a flow of registration of a voice control device in the information processing system shown in FIG. 1.

FIGS. 10A and 10B are a sequence diagram showing a first example of voice operation control performed by the information processing system according to a first embodiment.

FIG. 11 is a diagram showing changes in a screen occurring when setting the priority of the voice control device in the information processing system shown in FIG. 1.

FIG. 13 is a flowchart of an operating authority-setting process performed in steps in FIGS. 12A and 12B.

FIGS. 14A and 14B are a sequence diagram showing a third example of the voice operation control performed by the information processing system according to the first embodiment.

FIGS. 17A and 17B are a sequence diagram useful in explaining internal operations of the device operating authority management section appearing in FIG. 7A.

FIG. 22 is a diagram showing an example of an image forming apparatus service data list used by the cloud server appearing in FIG. 1.

FIG. 23 is a diagram showing an example of a nickname data list used by the cloud server appearing in FIG. 1.

FIG. 26 is a diagram showing an example of a voice control device service data list used by the cloud server appearing in FIG. 1.

FIG. 27 is a flowchart of a priority device registration process in a step in FIG. 19.

FIGS. 28A and 28B are a sequence diagram showing a first example of the voice operation control performed by the information processing system according to the second embodiment.

FIG. 29 is a diagram showing an example of a normal print job command generated by the cloud server appearing in FIG. 1.

FIG. 30 is a diagram showing an example of a high-priority print job command generated by the cloud server appearing in FIG. 1.

FIG. 32 is a diagram showing an example of a file management list used by the cloud server appearing in FIG. 1.

FIG. 34 is a diagram showing an example of a job information-setting rule used by the cloud server appearing in FIG. 1.

DESCRIPTION OF THE EMBODIMENTS

The present invention will now be described in detail below with reference to the accompanying drawings showing embodiments thereof. First, a description will be given of an information processing system and a method of controlling the same according to a first embodiment of the present invention.

Figure 1:
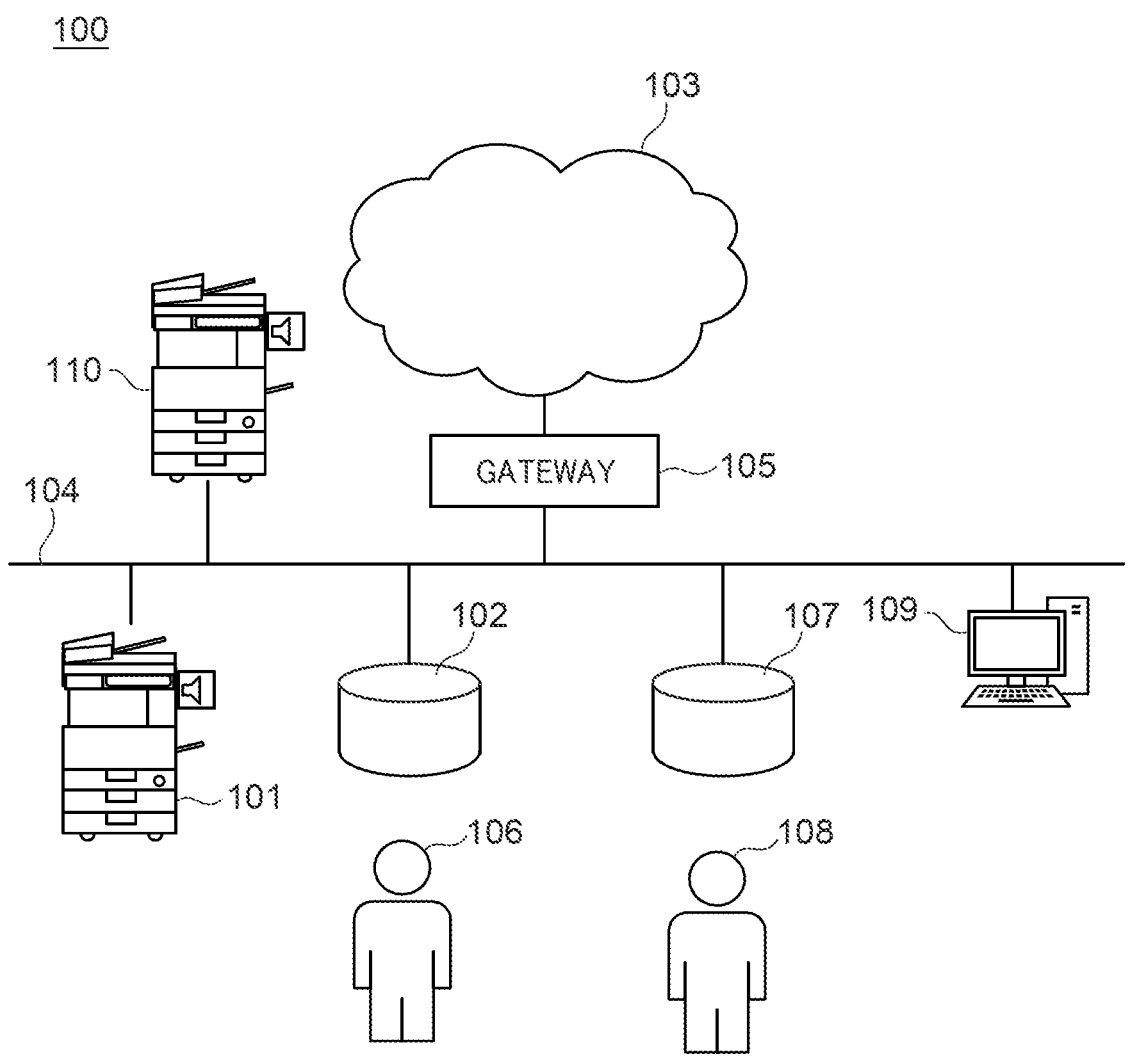
FIG. 1 is a diagram useful in explaining functions of an information processing system according to embodiments of the present invention.

FIG. 1 is a diagram useful in explaining functions of the information processing system, denoted by reference numeral 100, according to the embodiments of the present invention. The information processing system 100 is comprised of a cloud server 103, a plurality of voice control devices, and at least one image forming apparatus. In the present embodiment, the information processing system 100 including the cloud server 103, two voice control devices 102 and 107, and two image forming apparatuses 101 and 110 will be described by way of example.

The voice control device 102, the voice control device 107, the image forming apparatus 101, the image forming apparatus 110, and a client terminal 109 can communicate with each other via a gateway 105 and a network 104. Further, the voice control device 102, the voice control device 107, the image forming apparatus 101, the image forming apparatus 110, and the client terminal 109 can communicate with the cloud server 103 via the gateway 105 and the network 104.

The voice control device 102 and the voice control device 107 each record the voice of e.g. a user 106, encodes the recorded voice to generate voice data, and transmit the generated voice data to the cloud server 103, following a voice operation start instruction from the user 106. The voice control device 102 and the voice control device 107 are voice input/output devices, such as smart speakers and smartphones, which are capable of communicating with a user using voice. Note that although in the present embodiment, each voice control device is configured to be separate from the image forming apparatus, this is not limitative. For example, the image forming apparatus may be equipped with at least one of hardware, described hereinafter with reference to FIG. 3, and software, described hereinafter with reference to FIG. 6, as components of the voice control device.

The image forming apparatus 101 and the image forming apparatus 110 are multi-function peripherals each equipped with a plurality of functions, such as copy, scan, print, and FAX functions. Note that the image forming apparatus 101 and the image forming apparatus 110 may be apparatuses each equipped with a single function, such as a printer or a scanner. The cloud server 103 is formed by at least one cloud server. The cloud server 103 is a server that relays communication between a voice control device and an image forming apparatus which are coordinated with each other. The cloud server 103 performs voice recognition, and further, performs information processing for controlling the image forming apparatus 101 and the image forming apparatus 110. For example, the cloud server 103 performs voice recognition of voice data of the user 106, received from the voice control device 102, and determines a word associated with an operation of a screen of the image forming apparatus 101 and execution of a job, based on a result of the voice recognition. Note that the job indicates a unit of execution of a series of image formation processing operations, such as copying, scanning, and printing, which are realized by the image forming apparatus 101 using a print engine 211 and a scanner 213 (see FIG. 2). Further, the cloud server 103 generates text based on a result of the voice recognition and a result of determination of words, and generates voice synthesized data for reproducing the contents of this text as voice by the voice control device 102.

The client terminal 109 is e.g. a personal computer (PC) used by the user 106. The client terminal 109 transmits e.g. an electronic file to be printed to the image forming apparatus 101 or the image forming apparatus 110. Note that the electronic file may be stored in the client terminal 109 or a server (not shown) on the Internet, or may be stored in a storage of the image forming apparatus 101 or a storage of the image forming apparatus 110. Further, the client terminal 109 receives image data generated by a scan operation performed by the image forming apparatus 101 or the image forming apparatus 110. The network 104 interconnects the voice control device 102, the voice control device 107, the image forming apparatus 101, the image forming apparatus 110, and the client terminal 109, and the gateway 105.

The gateway 105 is e.g. a wireless LAN router compliant with the IEEE 802.11 standard series. The IEEE 802.11 standard series is a series of standards belonging to the IEEE 802.11, such as IEEE 802.11a and IEEE 802.11b. Note that the gateway 105 may have a capability of operating according to another wireless communication method. Further, the gateway 105 may be not a wireless LAN router, but a wired LAN router compliant with the Ethernet standard typified e.g. by 10 BASE-T, 100 BASE-T, and 1000 BASE-T, and may have a capability of operating according to another wired communication method.

Next, the configuration of the image forming apparatus 101 and the image forming apparatus 110 will be described. Note that in the present embodiment, the image forming apparatus 101 and the image forming apparatus 110 have the same configuration, and hence, the following description will be given of the configuration of the image forming apparatus 101 by way of example. Further, in the following description, as for the component elements of the image forming apparatus 110, an apostrophe is added to the end of reference numeral of each component element of the image forming apparatus 101.

Figure 2:
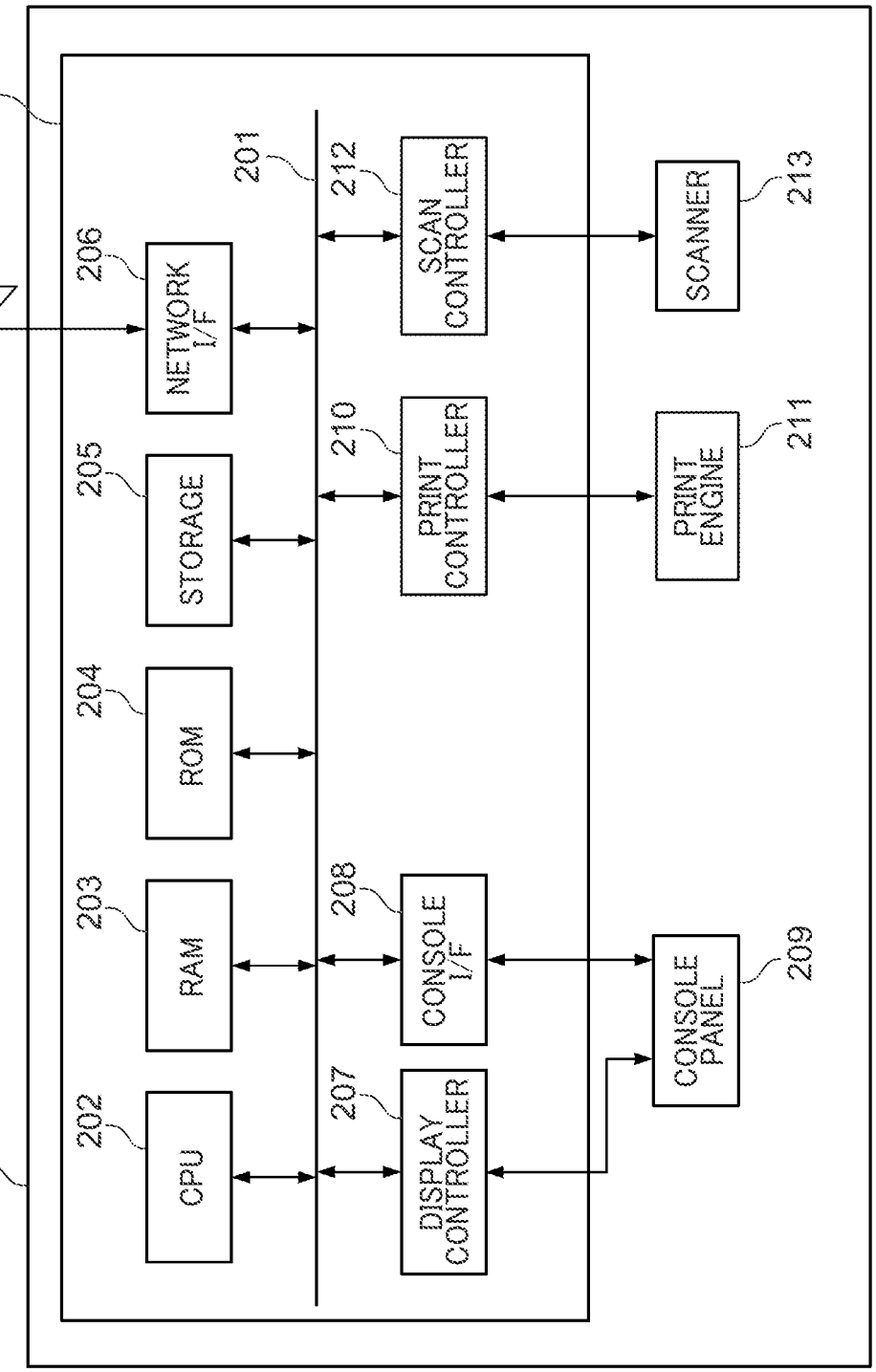
FIG. 2 is a schematic block diagram of an image forming apparatus appearing in FIG. 1.

FIG. 2 is a schematic block diagram of the image forming apparatus 101 appearing in FIG. 1. Referring to FIG. 2, the image forming apparatus 101 includes a controller 200, a console panel 209, the print engine 211, and the scanner 213. The controller 200 is connected to the console panel 209, the print engine 211, and the scanner 213. Further, the controller 200 includes a CPU 202, a RAM 203, a ROM 204, a storage 205, a network interface 206, a display controller 207, a console interface 208, a print controller 210, and a scan controller 212. These components are interconnected via a system bus 201. Note that the CPU is an abbreviated form of Central Processing Unit.

The CPU 202 controls the overall operation of the image forming apparatus 101. The CPU 202 reads control programs stored in the ROM 204 and the storage 205 to perform a variety of controls, such as reading control and print control. The RAM 203 is a main storage memory for the CPU 202. The RAM 203 is used as a work area, and also used as a temporarily storing area for loading therein a variety of control programs stored in the ROM 204 and the storage 205. The ROM 204 stores the control programs executed by the CPU 202 and the like. The storage 205 stores print data, image data, programs, setting information, and so forth.

Note that although in the present embodiment, the description is given of the configuration in which the one CPU 202 performs processes, described hereinafter, using one memory (RAM 203), this is not limitative. For example, the processes represented by the flowcharts, described hereinafter, may be executed by operating a plurality of CPUs, RAMs, ROMs, and storages in cooperation. Further, part of the processes may be executed using a hardware circuit, such as an ASIC (Application Specific Integrated Circuit) or an FPGA (Field-Programmable Gate Array).

The network interface 206 is an interface used by the image forming apparatus 101 to communicate with an external apparatus via the network 104. For example, the image forming apparatus 101 receives print data via the network interface 206 and analyzes the received print data using a PDL analysis module (not shown). The PDL analysis module is a software module for analyzing print data and is stored in the storage 205 or the ROM 204. The PDL analysis module generates data to be printed by the print engine 211 based on the print data expressed in a variety of types of page description languages.

The display controller 207 is connected to the console panel 209. The console panel 209 displays a screen controlled by the display controller 207. When a user operates the console panel 209, the image forming apparatus 101 acquires an event associated with the user operation via the console interface 208.

The print controller 210 is connected to the print engine 211. Image data to be printed is transferred to the print engine 211 via the print controller 210. The print engine 211 receives a control command and the image data from the print controller 210 and forms an image on a sheet based on the received image data. Note that the printing method used by the print engine 211 may be an electrophotographic method or an inkjet method. In a case where the printing method used by the print engine 211 is the electrophotographic method, the print engine 211 forms an image by forming an electrostatic latent image on a photosensitive member (not shown), thereafter developing the electrostatic latent image with toner, transferring the toner image onto a sheet, and fixing the transferred toner image. On the other hand, in a case where the printing method used by the print engine 211 is the inkjet method, the print engine 211 forms an image on a sheet by discharging ink.

The scan controller 212 is connected to the scanner 213. The scanner 213 reads an image on an original set thereon to generate image data. The scanner 213 includes a document feeder (not shown) and is capable of reading an image while conveying originals set on the document feeder one by one. The image data generated by the scanner 213 is stored in the storage 205. Further, the image forming apparatus 101 can form an image on a sheet using the image data generated by the scanner 213.

Next, the configuration of the voice control device 102 and the voice control device 107 will be described. Note that in the present embodiment, the voice control device 102 and the voice control device 107 have the same configuration, and hence the following description will be given of the configuration of the voice control device 102 by way of example. Further, in the following description, as for the component elements of the voice control device 107, an apostrophe is added to the end of reference numeral of each component element of the voice control device 102.

Figure 3:
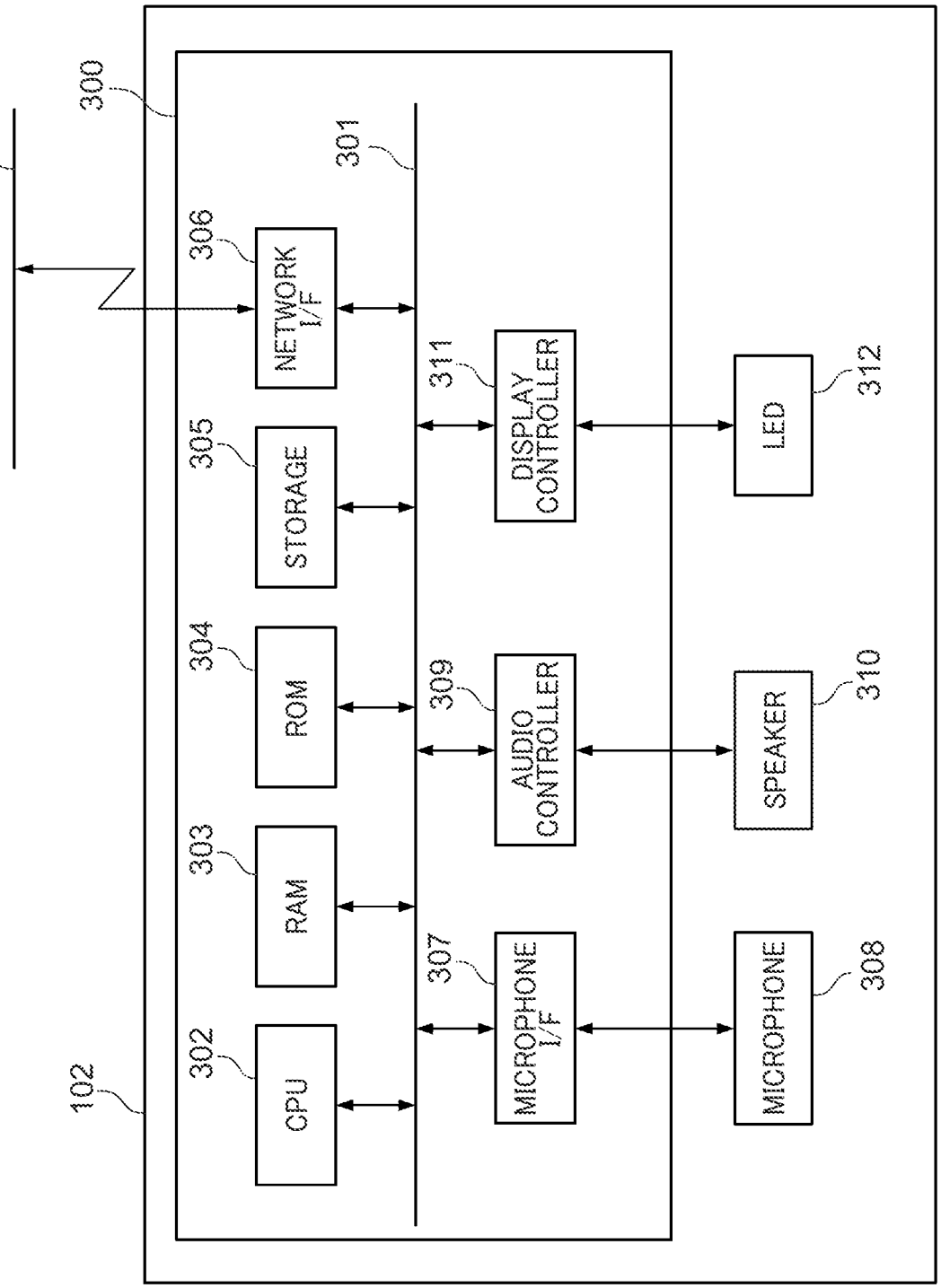
FIG. 3 is a schematic block diagram of a voice control device appearing in FIG. 1.

FIG. 3 is a schematic block diagram of the voice control device 102 appearing in FIG. 1. Referring to FIG. 3, the voice control device 102 includes a controller 300, a microphone 308, a speaker 310, and an LED 312. The controller 300 is connected to the microphone 308, the speaker 310, and the LED 312. Further, the controller 300 includes a CPU 302, a RAM 303, a ROM 304, a storage 305, a network interface 306, a microphone interface 307, an audio controller 309, and a display controller 311. These components are interconnected via a system bus 301.

The CPU 302 is a central processing unit that controls the overall operation of the controller 300. The RAM 303 is a volatile memory. The ROM 304 is a nonvolatile memory and stores a start-up program for the CPU 302 and a serial number of the voice control device 102 as an ID for identifying the voice control device 102. The storage 305 is a storage device, such as an SD card, which is larger in storage capacity than the RAM 303. Note that the storage 305 is not limited to the SD card but may be another storage device, such as a flash ROM, which has the same function as the SD card. The storage 305 stores control programs executed by the controller 300 and a service URL of a service used by the voice control device 102.

When the voice control device 102 is started up e.g. by powering-on, the CPU 302 executes the start-up program stored in the ROM 304. This start-up program is a program for reading control programs stored in the storage 305 and loading the control programs into the RAM 303. Upon execution of the start-up program, the CPU 302 successively executes the control programs loaded into the RAM 303 and performs a variety of controls. Further, the CPU 302 stores data used when executing the control programs in the RAM 303 and performs reading/writing of the stored data. Further, a variety of setting data items and the like required when executing the control programs are stored in the storage 305, and the CPU 302 performs reading/writing of these setting data items. The CPU 302 communicates with other devices on the network 104 via the network interface 306.

The network interface 306 includes a circuit and an antenna for performing communication according to a wireless communication method compliant with the IEEE 802.11 standard series. Note that the communication method of the network interface 306 is not limited to the wireless communication method, but for example, a wired communication method compliant with the Ethernet standard may be used.

The microphone interface 307 is connected to the microphone 308. When the microphone 308 receives voice uttered by a user, the microphone interface 307 converts the received voice to voice data by encoding the voice and stores the voice data in the RAM 303 according to an instruction received from the CPU 302.

The microphone 308 is e.g. a compact MEMS microphone installed in a smartphone or the like. Note that the microphone 308 is not limited to the MEMS microphone but may be another device insofar as it can acquire voice of a user. Further, it is preferable that the microphone 308 is used by arranging three or more microphones in respective predetermined positions so as to make it possible to calculate a direction from which comes voice uttered by a user. However, even when the one microphone 308 is provided, it is possible to realize the present invention, and the three or more microphones 308 are not necessarily required.

The audio controller 309 is connected to the speaker 310. The audio controller 309 converts voice data to analog voice signals and outputs the voice through the speaker 310 according to an instruction received from the CPU 302. The speaker 310 is a general-purpose device for reproducing voice. The speaker 310 outputs response sound indicating that the voice control device 102 is responding, and voice based on voice synthesized data generated by the cloud server 103.

The display controller 311 is connected to the LED 312 and controls lighting of the LED 312 according to an instruction received from the CPU 302. For example, the display controller 311 controls lighting of the LED 312 for indicating that the voice control device 102 is correctly inputting voice of a user. The LED 312 is an LED of e.g. blue which is visible to the user. Note that in the present embodiment, the voice control device 102 may be equipped with a display device which can display characters and a picture, instead of the LED 312.

Figure 4:
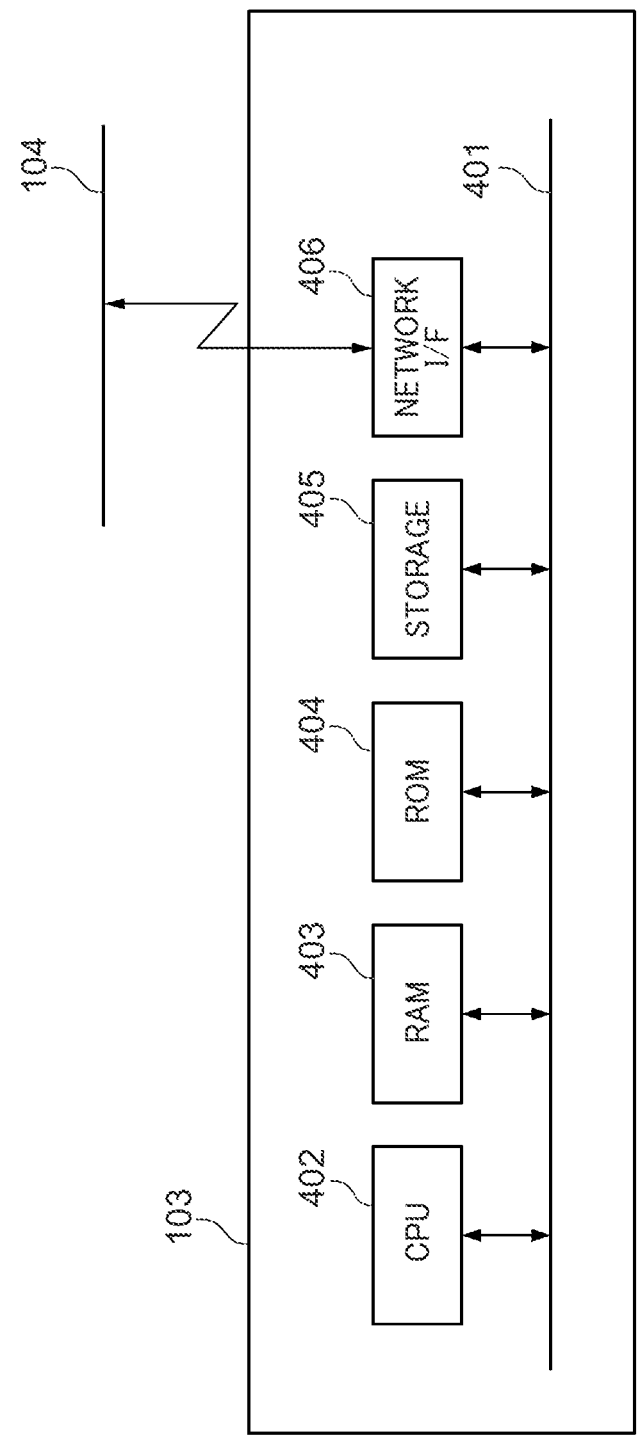

FIG. 4 is a schematic block diagram of the cloud server 103 appearing in FIG. 1. Referring to FIG. 4, the cloud server 103 includes a CPU 402, a RAM 403, a ROM 404, a storage 405, and a network interface 406. These components are interconnected via a system bus 401.

The CPU 402 is a central processing unit that controls the overall operation of the cloud server 103. The RAM 403 is a volatile memory. The ROM 404 is a nonvolatile memory and stores a start-up program for the CPU 402 and so forth. The storage 405 is a storage device, such as a hard disk drive (hereinafter referred to as the "HDD"), which is larger in storage capacity than the RAM 403. Note that the storage 405 is not limited to the HDD but may be another storage device having the same function as the HDD, such as a solid state drive (hereinafter referred to as the "SSD"). For example, the storage 405 stores control programs executed by the CPU 402.

When the cloud server 103 is started up e.g. by powering-on, the CPU 402 executes the start-up program stored in the ROM 404. This start-up program is a program for reading control programs stored in the storage 405 and loading the control programs into the RAM 403. Upon execution of the start-up program, the CPU 402 successively executes the control programs loaded into the RAM 403 and performs a variety of controls. Further, the CPU 402 stores data used when executing control programs in the RAM 403 and performs reading/writing of the data. Further, a variety of setting data items required for executing the control programs are stored in the storage 405, and the CPU 402 performs reading/writing of these setting data items. The CPU 402 communicates with other devices on the network 104 via the network interface 406.

Figure 5:
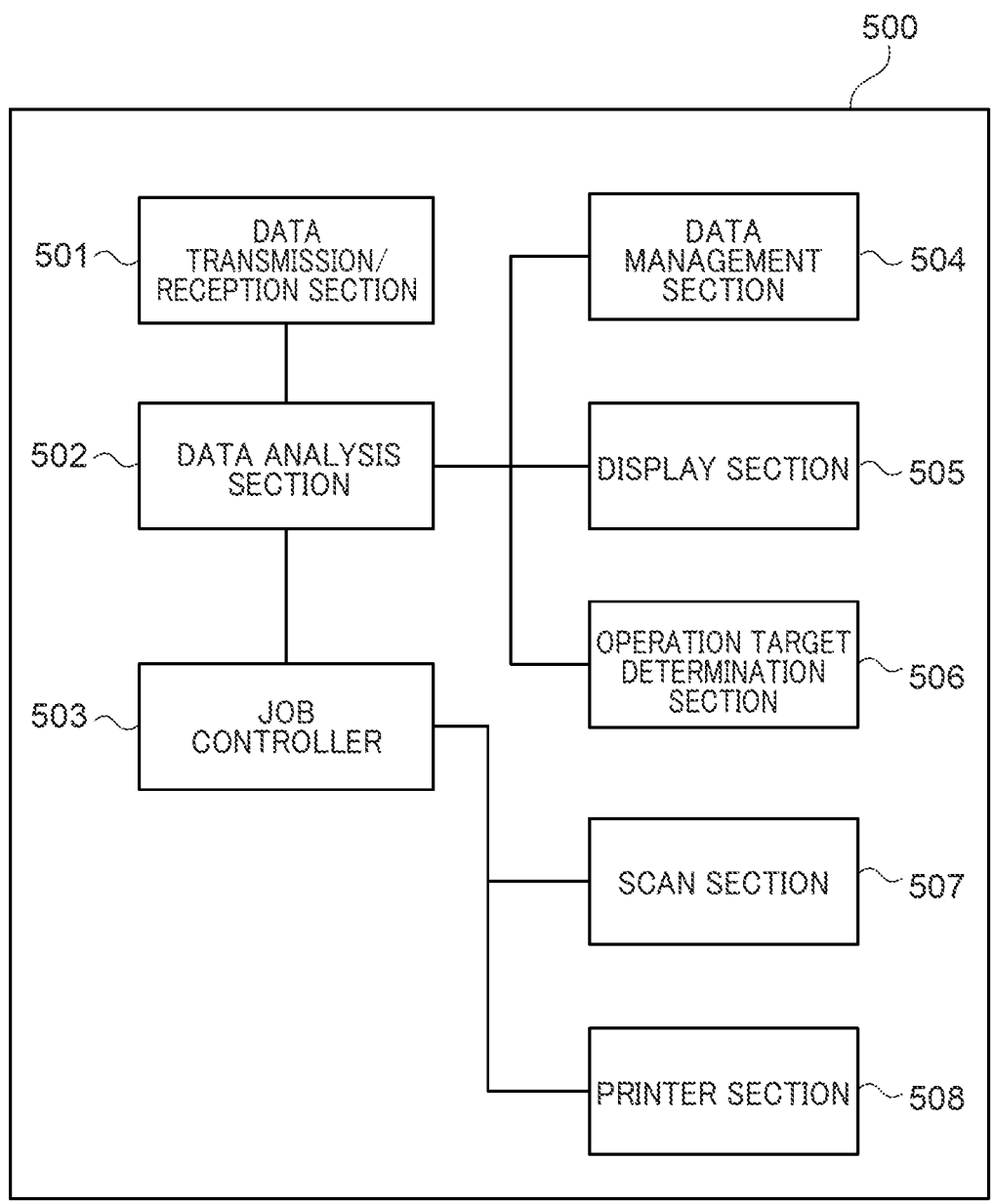
FIG. 5 is a block diagram showing a functional configuration of a device control program executed by the image forming apparatus appearing in FIG. 1.

FIG. 5 is a block diagram showing functional configuration of a device control program 500 executed by the image forming apparatus 101 and the image forming apparatus 110 appearing in FIG. 1. Referring to FIG. 5, the device control program 500 is comprised of a data transmission/reception section 501, a data analysis section 502, a job controller 503, a data management section 504, a display section 505, an operation target determination section 506, a scan section 507, and a printer section 508. For example, in the image forming apparatus 101, the device control program 500 is stored in the ROM 204, and the CPU 202 loads the device control program 500 into the RAM 203 and executes the same when started up. Note that in the following description, the functions of the above-mentioned component elements will be described by taking a case, as an example, where the CPU 202 of the image forming apparatus 101 executes the device control program 500.

The data transmission/reception section 501 causes the image forming apparatus 101 to transmit and receive data to and from another device on the network 104 using TCP/IP via the network interface 206. For example, the image forming apparatus 101 receives device operating data generated by the cloud sever 103 via the data transmission/reception section 501. Further, the image forming apparatus 101 transmits a screen update notification indicating that display contents of a screen, which indicate e.g. a job execution result, have been updated, and a job execution status notification indicating a job status, to the cloud sever 103 via the data transmission/reception section 501.

The data analysis section 502 converts device operating data received from the cloud server 103 to a plurality of commands associated with the job controller 503, the data management section 504, and the display section 505, respectively, and outputs the converted commands to the job controller 503, the data management section 504, and the display section 505, respectively.

The job controller 503 controls the print engine 211 via the print controller 210, and further, controls the scanner 213 via the scan controller 212. For example, in a case where the display section 505 detects pressing of a start key on a copy function screen displayed on the console panel 209, the job controller 503 receives parameters of a copy job and a job start instruction from the operation target determination section 506. The job controller 503 controls the print engine 211 to print image data read by the scanner 213 on a sheet based on the received parameters of the copy job.

The data management section 504 stores and manages work data generated during execution of the device control program 500, and data, such as setting parameters required for each device control, in respective predetermined areas in the RAM 203 and the storage 205. For example, the data management section 504 stores job data used by the job controller 503, a language setting as information on a language to be displayed on the console panel 209, and so forth, in the RAM 203 and the storage 205. The job data is data formed by a combination of setting items and setting values of a job. Further, the data management section 504 stores authentication information required for communication with the gateway 105, device information required for communication with the cloud server 103, and image data based on which an image is to be formed, in the RAM 203 and the storage 205. Further, the data management section 504 stores screen control information used by the display section 505 to control the screen display and operation target determination information used by the operation target determination section 506 to determine an operation target, in the RAM 203 and the storage 205. The screen control information and the operation target determination information are managed for each screen displayed by the display section 505.

The display section 505 controls the console panel 209 via the display controller 207. More specifically, the display section 505 displays UI components operable by a user (buttons, pull-down lists, check boxes, and so forth) on the console panel 209. The screen displayed on the console panel 209 is updated based on screen display control information. For example, the display section 505 acquires a language dictionary corresponding to the language setting stored in the data management section 504 from the storage 205 and displays text data on the screen based on the language dictionary.

The operation target determination section 506 acquires coordinates indicating a position where a user has touched on the console panel 209 from the console interface 208. The operation target determination section 506 determines a UI component, corresponding to the coordinates, which is displayed at this time on the console panel 209 and is operable by a user, as the operation target, reads out the screen display control information associated with the UI component determined as the operation target, and determines details of processing to be performed at the time of reception of the operation, based on the read screen display control information. For example, the operation target determination section 506 provides an instruction for updating the display contents on the screen to the display section 505 and transmits parameters of a job set by a user operation and an instruction for starting the job, to the job controller 503.

The scan section 507 causes the scanner 213 to execute scanning via the scan controller 212 based on settings of scan job parameters of the job controller 503, and stores read image data in the data management section 504. The printer section 508 causes the print engine 211 to execute printing via the print controller 210 based on settings of print job parameters of the job controller 503.

Figure 6:
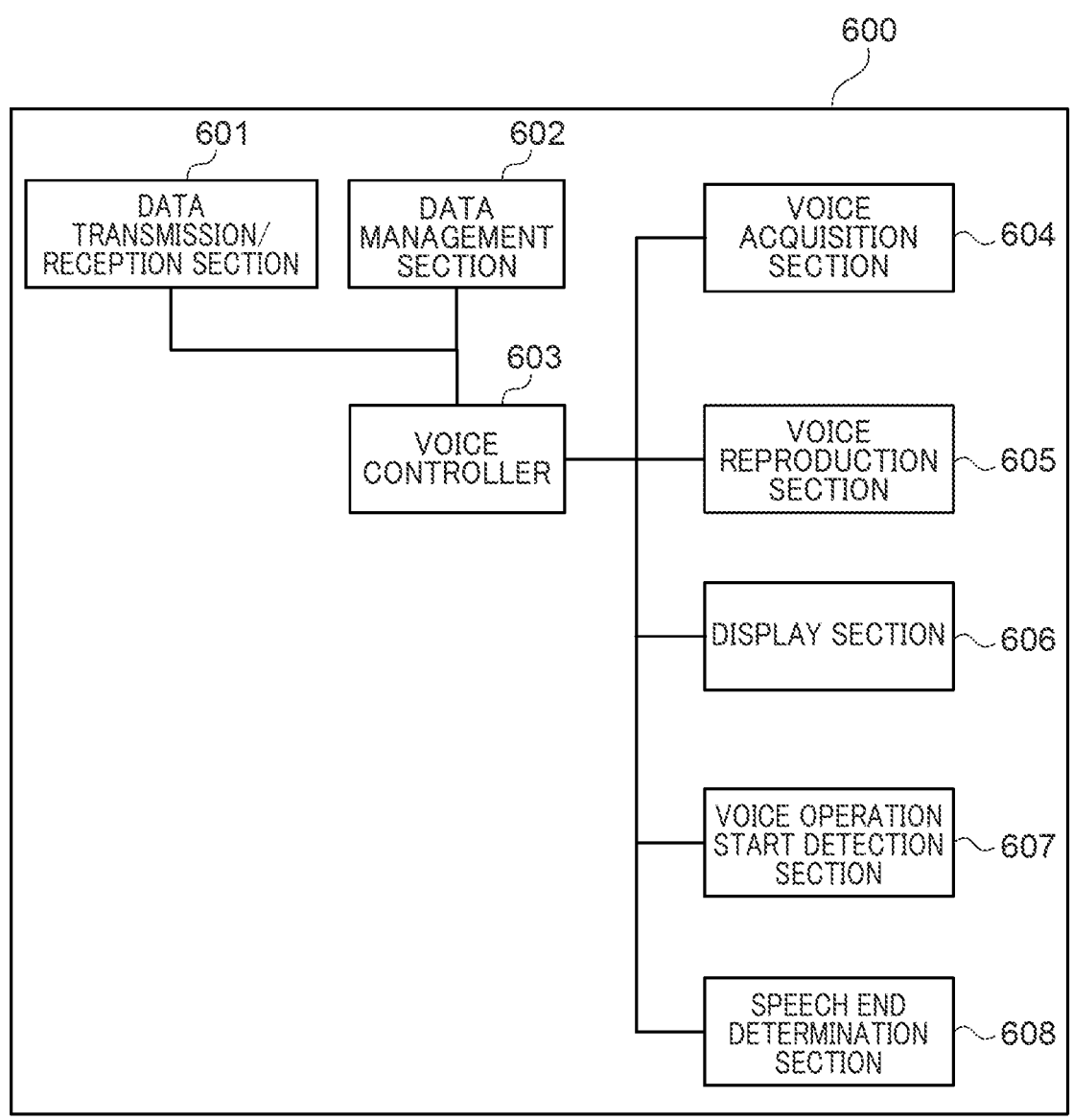
FIG. 6 is a block diagram showing a functional configuration of a voice control program executed by the voice control device appearing in FIG. 1.

FIG. 6 is a block diagram showing a functional configuration of a voice control program 600 executed by the voice control device 102 and the voice control device 107 appearing in FIG. 1. Referring to FIG. 6, the voice control program 600 is comprised of a data transmission/reception section 601, a data management section 602, a voice controller 603, a voice acquisition section 604, a voice reproduction section 605, a display section 606, a voice operation start detection section 607, and a speech end determination section 608. For example, in the voice control device 102, the voice control program 600 is stored in the storage 305, and the CPU 302 loads the voice control program 600 into the RAM 303 and executes the same when started up. Note that in the following description, the functions of the above-mentioned component elements will be described by taking a case, as an example, where the CPU 302 of the voice control device 102 executes the voice control program 600.

The data transmission/reception section 601 causes the voice control device 102 to transmit and receive data to and from another device on the network 104 using TCP/IP via the network interface 306. For example, the voice control device 102 transmits the serial number of the voice control device 102 and voice data acquired by the voice acquisition section 604, to the cloud server 103 via the data transmission/reception section 601. The serial number of the voice control device 102 is a number for identifying the voice control device 102 of the information processing system 100. Further, the transmission/reception section 601 receives voice synthesized data generated as a response to a user from the cloud server 103.

The data management section 602 stores and manages a variety of data, such as work data generated during execution of the voice control program 600, in a predetermined area of the storage 305. For example, the data management section 602 stores volume setting data of voice to be reproduced by the voice reproduction section 605, authentication information required for communication with the gateway 105, device information required for communication with the cloud server 103, and so forth, in the storage 305. The device information includes, for example, the serial numbers of the voice control device 102 and the voice control device 107.

The voice acquisition section 604 converts the analog voice of a user, which is acquired by the microphone 308, to voice data and temporarily stores the voice data in the RAM 303. The voice data is data which is converted to a predetermined format, such as MP3, and is further encoded so as to be transmitted to the cloud server 103. The timings of start and stop of processing performed by the voice acquisition section 604 are managed by the voice controller 603. Note that the voice data encoded in a general-purpose streaming format, and further, the encoded voice data may be sequentially transmitted by the data transmission/reception section 601.

The voice reproduction section 605 causes the speaker 310 to reproduce voice synthesized data received from the cloud server 103 via the audio controller 309. The timing in which the voice synthesized data is reproduced by the voice reproduction section 605 is managed by the voice controller 603.

The display section 606 controls lighting of the LED 312 via the display controller 311. For example, in a case where the voice operation start detection section 605 detects a voice instruction, the display section 606 lights the LED 312. The lighting timing of the LED 312 is managed by the voice controller 603.

The voice operation start detection section 607 detects wake words uttered by a user or pressing of an operation start key (not shown) of the voice control device 102 and transmits an operation start notification to the voice controller 603. The wake words are voice words for starting an interactive session and are determined in advance. The voice operation start detection section 607 always performs detection for wake words from the analog voice of a user, which is acquired by the microphone 308. The user can operate the image forming apparatus 101 or the image forming apparatus 110 by uttering the wake words and continuing uttering words indicating an operation desired by himself/herself. Voice processing performed after detection of wake words by the voice operation start detection section 607 will be described hereinafter.

The speech end determination section 608 determines the termination timing of the processing performed by the voice acquisition section 604. For example, the speech end determination section 608 determines that the speech of the user ends, when a predetermined time period (e.g. three seconds) elapses after the user's voice breaks off, and transmits a speech termination notification to the voice controller 603. Note that the speech end determination section 608 may perform the speech end determination based not on the time without utterance of voice (hereinafter referred to as the "blank time"), but on a predetermined word or phrase uttered by the user. For example, in a case where the user utters a predetermined word, such as "Yes", "No", "OK", "Cancel", "Finish", and "Start", the speech end determination section 608 may determine the end of speech without waiting for the elapse of the above-mentioned time period. Further, the speech end determination may be performed not by the voice control device 102 or the voice control device 107, but by the cloud server 103, and the cloud server 103 may determine the end of speech based on the meaning or context of contents uttered by the user.

The voice controller 603 performs control such that the modules of the voice control program 600 operate in coordination with each other. For example, the voice controller 603 controls the start and end of processing operations performed by the voice acquisition section 604, the voice reproduction section 605, and the display section 606. Further, after the voice acquisition section 604 acquires voice data, the voice controller 603 controls the data transmission/reception section 601 to transmit the voice data to the cloud server 103. Further, after the data transmission/reception section 601 receives voice synthesized data from the cloud server 103, the voice controller 603 controls the voice reproduction section 605 to reproduce the received voice synthesized data.

Next, the timings of the start and end of the processing operations performed by the voice acquisition section 604, the voice reproduction section 605, and the display section 606 will be described.

Let it be assumed, for example, that a user utters wake words, and then utters "I want to make a copy". At this time, the voice operation start detection section 607 detects the voice of the wake words, and transmits an operation start notification to the voice controller 603. Upon receipt of the operation start notification, the voice controller 603 controls the voice acquisition section 604 to start the processing. The voice acquisition section 604 acquires the analog voice of "I want to make a copy" uttered successively after the wake words, converts the acquired analog voice to voice data, and temporarily stores the voice data. When the voice of the user breaks off for a predetermined time period (e.g. three seconds) after the user has uttered the phrase of "I want to make a copy", the speech end determination section 608 transmits a speech termination notification to the voice controller 603. Upon receipt of the speech termination notification, the voice controller 603 controls the voice acquisition section 604 to terminate the processing. Note that a state from the start to the end of the processing performed by the voice acquisition section 604 is referred to as the speech processing state. The display section 606 lights the LED 312 during the speech processing state.

When it is determined that the utterance of voice by the user has ended, the voice controller 603 controls the data transmission/reception section 601 to transmit the voice data temporarily stored by the voice acquisition section 604 to the cloud server 103 and waits for a response from the cloud server 103. The response from the cloud server 103 is a response message comprised, e.g. of a header part indicating that the message is a response and voice synthesized data. When the data transmission/reception section 601 receives the response message from the cloud server 103, the voice controller 603 controls the voice reproduction section 605 to reproduce the voice synthesized data. When the voice synthesized data is reproduced, a voice, for example, "Copy screen is displayed", is output from the speaker 310. Note that a state after the determination that the speech performed by the user has ended until the end of reproduction of the voice synthesized data is referred to as the response processing state. The display section 606 blinks the LED 312 during the response processing state.

After the response processing, the user can continue uttering words expressing an operation desired by the user without uttering the wake words as long as the interactive session is continued. The determination of the end of the interactive session is performed by the cloud server 103, and the cloud server 103 transmits an interactive session termination notification to the voice control device 102 or the voice control device 107. Note that a state from the end of the interactive session to the start of the next interactive session is referred to as the standby state. The voice control device 102 is always in the standby state until an operation start notification is transmitted from the voice operation start detection section 607. The display section 606 holds the LED 312 off during the standby state.

Figure 7A:
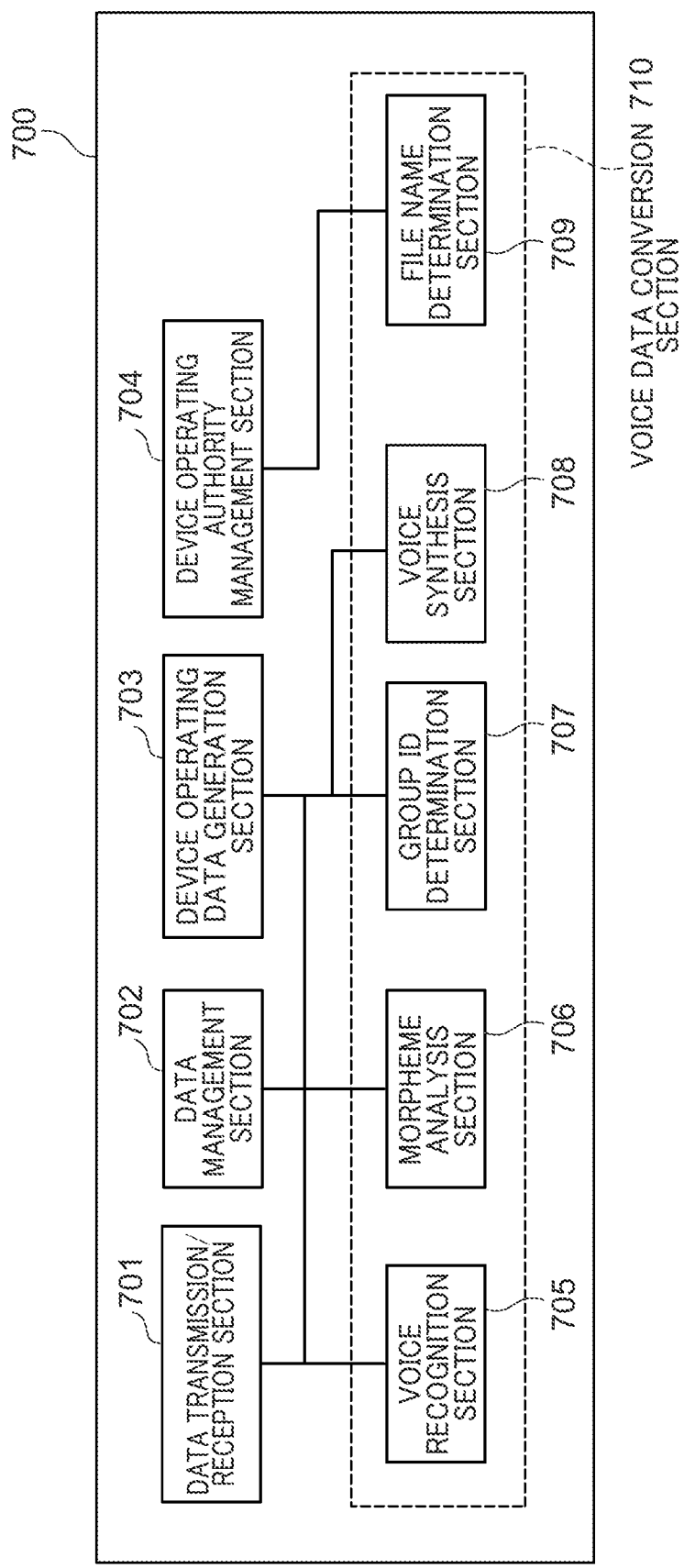
FIG. 7A is a block diagram showing a functional configuration of a voice data conversion control program executed by the cloud server appearing in FIG. 1.

FIG. 7A and FIGS. 7B1 to 7B4 are diagrams useful in explaining a voice data conversion control program 700 executed by the cloud server 103 appearing in FIG. 1. FIG. 7A is a block diagram showing a functional configuration of the voice data conversion control program 700. The voice data conversion control program 700 is stored in the storage 405, and the CPU 402 loads the voice data conversion control program 700 into the RAM 403 and executes the same when the CPU 402 is started. Referring to FIG. 7A, the voice data conversion control program 700 is comprised of a data transmission/reception section 701, a data management section 702, a device operation data generation section 703, a device operating authority management section 704, and a voice data conversion section 710. The voice data conversion section 710 includes a voice recognition section 705, a morpheme analysis section 706, a group ID determination section 707, a voice synthesis section 708, and a file name determination section 709.

The data transmission/reception section 701 causes the cloud server 103 to transmit and receive data to and from another device on the network 104 using TCP/IP via the network interface 406. For example, the cloud server 103 receives voice data of a user from the voice control device 102 or the voice control device 107 via the data transmission/reception section 701. Further, the cloud server 103 transmits a group ID determined by the group ID determination section 707 and a determination result of text data obtained by the voice recognition processing performed by the voice recognition section 705, via the data transmission/reception section 701.

The data management section 702 stores and manages work data generated during execution of the voice data conversion control program 700, parameters required for the voice data conversion section 710 to perform the voice recognition processing, and the like, in a predetermined area in the storage 405. For example, the data management section 702 identifies an associated service ID based on a device ID included in an interactive session start notification received by the data transmission/reception section 701. The data management section 702 stores interactive session data including a session ID of the interactive session, the device ID, and the service ID, in the RAM 403. Further, the data management section 702 stores and manages an acoustic model and a language model for converting voice data received by the data transmission/reception section 701 to text, and a dictionary used by the morpheme analysis section 706 to analyze morphemes of the text, in the storage 405. Furthermore, the data management section 702 stores and manages a group ID list used by the group ID determination section 707 to determine a group ID and a voice database used by the voice synthesis section 708 to perform voice synthesis, in the storage 405. Further, the data management section 702 stores and manages the respective device information items required to communicate with the voice control device 102, the voice control device 107, the image forming apparatus 101, the image forming apparatus 110, and so forth, in the storage 405 and the like.

The voice recognition section 705 performs the voice recognition processing for converting voice data of a user, which is received by the data transmission/reception section 701, to text. In the voice recognition processing, the voice recognition section 705 converts voice data of the user to phonemes using an acoustic model, and further converts the phonemes to actual text data using a language model. Note that the language of voice to be input may exist in plural. Therefore, the voice recognition processing may use a first voice recognition method in which a language of input voice data is determined and then the voice data is converted to text data based on the determined language. Further, the voice recognition processing may use a second voice recognition method in which input voice data is converted to phonemes using acoustic models of different languages, the phonemes are converted to text data of each language using an associated language model, and then the text data is output. In a case where the second voice recognition method is employed, to convert voice data to text data in a plurality of language formats, the voice recognition section 705 outputs voice recognition data formed by text and language settings as a result of the voice recognition processing. Note that as shown in FIGS. 7B1 to 7B4, originally, the used language is Japanese and the voice recognition is also written in Japanese based on the fact that the used language is Japanese (in the above-mentioned figures, parenthesized English translation is added after each word in KANA notation). Therefore, the following description is given by using English translation corresponding to written elements in Japanese language. Although the morphemes and the word order corresponding to the order of the morphemes and so forth are different between English language and Japanese language, the following description will be given using results of conversion to corresponding English words and word orders, without departing from the subject matter of the present invention.

The morpheme analysis section 706 performs morpheme analysis on voice recognition data converted by the voice recognition section 705, according to the language setting. The morpheme analysis is performed to derive morpheme strings from the voice recognition data using a dictionary containing information on the language, such as grammar and parts of speech, and further, identify parts of speech and the like of the morphemes. The morpheme analysis section 706 can be realized by using known morpheme analysis software, such as JUMAN, Chazutsu, and MeCab. For example, the morpheme analysis section 706 analyzes voice recognition data of "Print one copy of File B by MFP 1" converted by the voice recognition section 705 as a morpheme string of "Print", "one", "copy", "of", "File", "B", "by", "M", "F", "P", and "1".

The group ID determination section 707 determines a group ID by performing matching between a result of the morpheme analysis performed by the morpheme analysis section 706 and the group ID list shown in FIGS. 7B1 to 7B4 to generate a result of the group ID determination. A case where the morpheme string is formed by "Print", "one", "copy" will be described by way of example. In this case, the group ID determination section 707 determines "FNC00002", "NUM00001", and "CNF00001" as the respective group IDs of "Print", "one", and "copy" from the group ID list shown in FIGS. 7B1 to 7B4. As the result of the group ID determination, the group ID determination section 707 generates {ID:FNC00002, ID:NUM00001, ID:CNF00001}. In the group ID list, words which have the same meaning and intention concerning the user operation on the image forming apparatus 101 and the image forming apparatus 110 are grouped into the same ID. Note that these words are obtained as the results of voice recognition on utterance of voice by a user toward the voice control device 102 or the voice control device 107.

In a case where a file keyword, such as a file A, is included in the morphemes analyzed by the morpheme analysis section 706, the file name determination section 709 acquires a service ID from the interactive session data stored in the RAM 403. The file name determination section 709 searches a file management list, described hereinafter with reference to FIG. 32, which is stored in the storage 405 using the service ID and the file keyword as a key, to thereby acquire a file path "¥user1¥file¥fileB.JPG", for example.

The voice synthesis section 708 performs voice synthesis processing based on notification data received from the image forming apparatus 101 or the image forming apparatus 110. In the voice synthesis processing, the voice synthesis section 708 converts text forming a pair with a predetermined notification, which has been prepared in advance, to voice data of a predetermined format, such as MP3. For example, the voice synthesis section 708 generates voice data based on the voice database managed by the data management section 702. The voice database is a database formed by a collection of voice utterances of fixed contents, such as words. Note that although in the present embodiment, the voice synthesis processing is performed using the voice database, any other method may be used as the voice synthesis method, and the method is not limited to the method using the voice database.

The device operation data generation section 703 determines an operation on the image forming apparatus 101 or the image forming apparatus 110 based on the group ID determined by the group ID determination section 707 and the language setting of the voice recognition data and generates a file of a predetermined data format associated with the operation. A case where as the group ID determination result, {ID:FNC00002, ID:NUM00001, ID:CNF00001} is generated will be described. In this case, the device operation data generation section 703 determines based on "FNC00002" that the image forming apparatus 101 or the image forming apparatus 110 is caused to execute a print job. The device operation data generation section 703 generates a character string of "operation":"jobStart" and a character string of "jobName":"Print" for executing the print job. Further, the device operation data generation section 703 determines that the number of copies of the copy job is set to 1 based on "NUM00001" and "CNF00001", and generates a character string of "copies":"1" for specifying the number of copies of 1. Further, the device operation data generation section 703 refers to an image file "fileB. JPEG" stored in the storage 405 based on the file path "¥user1¥file¥fileB. JPG" acquired by the file name determination section 709. The device operation data generation section 703 generates character strings of binary data of the image file "fileB.JPEG". In actuality, although a huge amount of data including the file header part is generated as the character strings, in the present embodiment, for ease of explanation, the binary data is described as "data": "yyyy . . ." which is fictious data.

Further, the device operation data generation section 703 acquires the serial number of the image forming apparatus 101, for example, "mfp_serial111", from a nickname data list, described hereinafter with reference to FIG. 23, based on the morphemes "M", "F", "P", and "1" analyzed by the morpheme analysis section 706 and "user1@aaa.com" which is the service ID of the interactive session data stored in the RAM 403. A priority device, for example, "Speaker 1", which is acquired from an image forming apparatus service data list, described hereinafter with reference to FIG. 22, based on the service ID "user1@aaa.com" of the interactive session data and the serial number "mfp_serial111" of the image forming apparatus 101, matches the voice control device serial number "Speaker 1" of the interactive session data, and hence the device operation data generation section 703 generates "priority":"high" indicating the priority device. The device operation data generation section 703 generates data in a job execution format by combining these generated character strings.

The device operating authority management section 704 manages a flag for limiting the operating authority over a device/apparatus that receives the data in the job execution format, which is generated by the device operation data generation section 703. One device operating authority is given over to each of the image forming apparatus 101 and the image forming apparatus 110 which are voice operation targets. For example, only a voice control device of the voice control device 102 and the voice control device 107, for which the operating authority over the image forming apparatus 101 has been set, is enabled to operate the image forming apparatus 101 by voice via the cloud server 103.

FIG. 8 is a sequence diagram useful in explaining a flow of registration of an image forming apparatus of the information processing system 100 shown in FIG. 1. In FIG. 8, a case where the user 106 instructs registration of the image forming apparatus 101 will be described by way of example. In FIG. 8, it is assumed that the user 106 has registered user information in advance via an application provided by a service associated with a service URL "http://service1.com" managed by the cloud server 103, WebAPI, and so forth. The user information includes the service ID "user1@aaa.com" and a password "aaaa" associated with this service ID. The above-mentioned service ID and password are stored in the storage 405 of the cloud server 103.

Referring to FIG. 8, first, the user 106 performs an operation for registering the image forming apparatus 101 (step S801). More specifically, the user 106 operates the console panel 209 to input the service URL, the service ID "user1@aaa.com", and the password "aaaa" Then, the CPU 202 of the image forming apparatus 101 transmits a request for registering the image forming apparatus 101 to the cloud server 103 via the network interface 206 (step S802). The request for registering the image forming apparatus 101 includes the service ID and the password, which are input in the step S801. Further, the request for registering the image forming apparatus 101 also includes "mfp_serial111" which is the serial number of the image forming apparatus 101 and a nickname of a null character. Further, the request for registering the image forming apparatus 101 includes the IP address of the image forming apparatus 101, e.g. "xxx.xxx.xxx.xxx", which is stored in the RAM 203 of the image forming apparatus 101.

The CPU 402 of the cloud server 103 performs processing for determining the service ID included in the received request for registering the image forming apparatus 101 (step S803). More specifically, the CPU 402 determines whether or not the service ID and the password included in the received request for registering the image forming apparatus 101 match the user information registered in advance. If the above-mentioned service ID and password match the user information registered in advance, the CPU 402 performs processing for registering the image forming apparatus 101 (step S804). More specifically, the CPU 402 stores the service ID, the password, the serial number of the image forming apparatus 101, and the IP address of the image forming apparatus 101, which are included in the received request for registering the image forming apparatus 101, in the storage 405 in an associated state. Then, the CPU 402 notifies the image forming apparatus 101 of a result of the registration, which indicates "registration completion", via the network interface 406 (step S805).

The CPU 202 of the image forming apparatus 101 having received this notification displays a screen notifying the user of "registration completion" on the console panel 209 (step S806), followed by terminating the present process. Note that although in the present embodiment, the user 106 instructs registration of the image forming apparatus 101 by operating the image forming apparatus 101, the user 106 may instruct registration of the image forming apparatus 101 by operating the client terminal 109.

With the above-described registration process in FIG. 8, in the information processing system 100, it is possible to operate the image forming apparatus 101 by voice according to a voice instruction received by the voice control device set in association with the image forming apparatus 101.

FIG. 9 is a sequence diagram useful in explaining a flow of registration of a voice control device of the information processing system 100 shown in FIG. 1. In FIG. 9, a case where the user 106 instructs registration of the voice control device 102 will be described by way of example. Note that also in FIG. 9, it is assumed that the user 106 has registered the above-mentioned user information in advance via the application provided by the service corresponding to the service URL "http://service1.com" managed by the cloud server 103, the WebAPI, and so forth.

Referring to FIG. 9, first, the user 106 powers on the voice control device 102 (step S901) and sets the voice control device 102 to a setup mode (step S902). With this, the voice control device 102 shifts to the setup mode. The CPU 302 of the voice control device 102 performs LED lighting control for indicating that the voice control device 102 is in the setup mode. More specifically, the CPU 302 lights the LED 312 (step S903).

Then, the user 106 instructs the client terminal 109 to start a setting application to provide an instruction for registering the voice control device 102 (step S904). The client terminal 109 starts the setting application according to the start-up instruction and searches for the voice control device 102 in the setup mode (step S905).

The CPU 302 of the voice control device 102 searched for transmits a response to the client terminal 109 (step S906). The client terminal 109 having received the response transmits a login request to the cloud server 103 (step S907). The login request includes the service URL "http://service1.com", the service ID "user1@aaa.com", and the password "aaaa", which have been input by the user 106.

The CPU 402 of the cloud server 103 performs login processing based on the service ID and the password included in the received login request (step S908). If the login processing is successful, the CPU 402 notifies the client terminal 109 of a login response indicating the success (step S909).

Upon receipt of the login response to the effect that the login processing is successful, the client terminal 109 transmits the service URL, the service ID, and the password, which are included in the login request, to the voice control device 102 as the login information (step S910).

Upon receipt of the login information, the CPU 302 of the voice control device 102 transmits a connection request to the cloud server 103 (step S911). The connection request includes the above-mentioned login information received from the client terminal 109 and "Speaker 1" which is the serial number of the voice control device 102. Then, the CPU 302 performs the LED lighting control for indicating that the voice control device 102 is in a connection processing state. More specifically, the CPU 302 blinks the LED 312 (step S912).

The CPU 402 of the cloud server 103 executes the login processing based on the login information included in the received connection request (step S913). If the login processing is successful, the CPU 402 registers "Speaker 1" which is the serial number of the voice control device 102 (step S914). When registration of the serial number of the voice control device 102 is completed, the CPU 402 notifies the voice control device 102 of a registration completion response indicating the completion (step S915).

Upon receipt of the registration completion response, the CPU 302 of the voice control device 102 performs the LED lighting control for indicating that the voice control device 102 is in a state connected to the cloud server 103. More specifically, the CPU 302 lights the LED 312 (step S916), followed by terminating the present process.

With the registration process in FIG. 9, in the information processing system 100, it is possible to select the voice control device 102 as a voice control device to be coordinated with the image forming apparats 101 or the image forming apparatus 110.

FIGS. 10A and 10B are a sequence diagram showing a first example of voice operation control performed by the information processing system 100 according to the first embodiment. Note that also in the voice operation control in FIGS. 10A and 10B, it is assumed that the user 106 has registered the above-mentioned user information in advance via the application provided by the service corresponding to the service URL "http://service1.com" managed by the cloud server 103, the WebAPI, and so forth. Further, in the voice operation control in FIGS. 10A and 10B, it is assumed that the image forming apparatus 101 has already been registered by the registration process in FIG. 8, and the voice control device 107 and the voice control device 102 have already been registered by the registration process in FIG. 9. Note that in the voice operation control in FIGS. 10A and 10B, the voice control device 102, the image forming apparatus 101, the cloud server 103 are in a state communicable with one another. Further, the image forming apparatus 101 is in a state capable of calling copy, scan, print, and the like functions, after started up by powering-on.

Referring to FIGS. 10A and 10B, first, a user 108 utters wake words as a keyword for starting an interactive session to the voice control device 107 (step S1001). The wake words are e.g. "Start up Speaker 2". Note that Speaker 2 corresponds to the voice control device 107.

When a CPU 302' of the voice control device 107 detects that the user 108 has uttered the wake words, the CPU 302' performs the LED lighting control for indicating the response processing state. More specifically, the CPU 302' causes a LED 312' to blink, via a display controller 311'. Then, the CPU 302' starts an interactive session (step S1002). The user 108 can utter an instruction desired by himself/herself without uttering the wake words during continuation of the interactive session. The voice control device 107 is in the standby state after the interactive session has been started until an operation start notification is received by the voice operation start detection section 607, and the LED 312' is off in the standby state.

After the interactive session has been started, the user 108 utters a keyword as a print start instruction to the voice control device 107 (step S1003). This keyword is e.g. "Print fifty copies of File A by MFP 1". Note that the MFP 1 corresponds to the image forming apparatus 101.

When it is detected that the user 108 has uttered the above-mentioned keyword, the CPU 302' of the voice control device 107 performs the LED lighting control for indicating the response processing state. More specifically, the CPU 302' causes the LED 312' to blink, via the display controller 311' (step S1004). Then, the CPU 302' transmits a job request to the cloud server 103 via a network interface 306' (step S1005). This job request includes voice data of the keyword uttered by the user 108 in the step S1003 and "Speaker 2" which is the serial number of the voice control device 107.

The CPU 402 of the cloud server 103 performs the voice recognition processing on the received voice data (step S1006). With the processing in the step S1006, the voice of "Print fifty copies of File A by MFP 1" is generated as text. Then, the CPU 402 performs morpheme analysis processing on the generated text (step S1007). With the processing in the step S1007, the text of "Print fifty copies of File A by MFP 1" is analyzed as a morpheme string of "Print", "fifty", "copies", "of", "File", "A", "by", "M", "F", "P", and "1". The CPU 402 records the morpheme string of "Print", "fifty", "copies", "of", "File", "A", "by", "M", "F", "P", and "1" in a morpheme string analysis result list stored in the RAM 403.

Then, the CPU 402 performs group ID determination processing on the text of the morpheme string analyzed in the step S1007 (step S1008). In the group ID determination processing, for example, matching between the morpheme string of "Print", "fifty", "copies", "of", "File", "A", "by", "M", "F", "P" and "1" and the group ID list shown in FIGS. 7B1 to 7B4 is performed. As a group ID determination result, the CPU 402 generates {ID:FNC00002, ID:NUM00050, ID:CNF00001, ID:ALP00001, ID:ALP00013, ID:ALP00006, ID:ALP00016, ID:NUM00001}. Since the top of the group ID determination result is {ID:FNC00002}, the CPU 402 judges that the job request received from the voice control device 107 is a print job execution instruction.

Then, the CPU 402 performs processing for setting the operating authority over the image forming apparatus 101 (step S1009). As mentioned above, only one operating authority is given over one image forming apparatus. In a case where the operating authority over the image forming apparatus 101 is in an empty state, in other words, in a case where the operating authority over the image forming apparatus 101 has not been set for any other voice control device, the operating authority over the image forming apparatus 101 is set for the voice control device 107 having started the interactive session in the step S1002.

After the operating authority over the image forming apparatus 101 is set for the voice control device 107, the CPU 402 performs job command generation processing (step S1010). In the step S1010, a print job command for causing the image forming apparatus 101 to execute a print job associated with the job request received from the voice control device 107 is generated. Then, the CPU 402 transmits the generated print job command to the image forming apparatus 101 (step S1011).

The CPU 202 of the image forming apparatus 101 executes the print job based on the received print job command (step S1012). Then, the CPU 202 notifies the cloud server 103 of a job start response indicating that the image forming apparatus 101 has started the print job associated with the received print job command (step S1013).

Upon receipt of the job start response, the CPU 402 of the cloud server 103 registers job management information (step S1014). The job management information includes information indicating that the job status is "in-execution", information indicating the image forming apparatus 101 executing the print job, and information indicating the voice control device 107 for which the operating authority over the image forming apparatus 101 has been set. Then, the CPU 402 performs the voice synthesis processing (step S1015). In the step S1015, voice synthesized data of voice, for example, "Printing has been started by MFP 1", is generated. Then, the CPU 402 transmits the generated voice synthesized data to the voice control device 107 (step S1016).

The CPU 302' of the voice control device 107 reproduces the received voice synthesized data (step S1017). When this voice synthesized data is reproduced, the voice, for example, "Printing has been started by MFP 1", is output from a speaker 310'. Then, the CPU 302' lights off the LED 312'. After that, the cloud server 103 performs determination of termination of the interactive session, and upon receipt of the interactive session termination notification transmitted from the cloud server 103 based on a result of the determination, the CPU 302' terminates the interactive session.

After that, before the image forming apparatus 101 completes the print job, the user 106 different from the user 108 utters wake words to the voice control device 102 (step S1018 in FIG. 10B; see FIG. 10B hereafter). This wake words are e.g. "Start up Speaker 1". Note that Speaker 1 corresponds to the voice control device 102.

When it is detected that the user 106 has uttered the wake words, the CPU 302 of the voice control device 102 performs the LED lighting control for indicating the response processing state. More specifically, the CPU 302 causes the LED 312 to blink, via the display controller 311. Then, the CPU 302 starts an interactive session (step S1019).

After the interactive session has been started, the user 106 utters a keyword serving as a print start instruction to the voice control device 102 (step S1020). This keyword is e.g. "Print one copy of File B by MFP 1".

When it is detected that the user 106 has uttered the above-mentioned keyword, the CPU 302 of the voice control device 102 performs the LED lighting control for indicating the response processing state. More specifically, the CPU 302 causes the LED 312 to blink, via the display controller 311 (step S1021). Then, the CPU 302 transmits a job request to the cloud server 103 via the network interface 306 (step S1022). This job request includes voice data of the keyword uttered by the user 106 in the step S1020 and "Speaker 1" which is the serial number of the voice control device 102.

The CPU 402 of the cloud server 103 performs the voice recognition processing on the received voice data (step S1023). With the processing in the step S1023, the voice of "Print one copy of File B by MFP 1" is generated as text. Then, the CPU 402 performs the morpheme analysis processing on the generated text (step S1024). With the processing in the step S1024, the text of "Print one copy of File B by MFP 1" is analyzed as a morpheme string of "Print", "one", "copy", "of", "File", "B", "by", "M", "F", "P", and "1". The CPU 402 records the morpheme string of "Print", "one", "copy", "of", "File", "B", "by", "M", "F", "P", and "1" in the morpheme string analysis result list stored in the RAM 403.

Then, the CPU 402 performs the group ID determination processing on the text of the morpheme string analyzed in the step S1024 (step S1025). In the group ID determination processing, for example, matching between the morpheme string of "Print", "one", "copy", "of", "File", "B", "by", "M", "F", "P", and "1" and the group ID list shown in FIGS. 7B1 to 7B4 is performed. As a group ID determination result, the CPU 402 generates {ID:FNC00002, ID:NUM00001, ID:CNF00001, ID:ALP00002, ID:ALP00013, ID:ALP00006, ID:ALP00016, ID:NUM00001}. Since the top of the group ID determination result is {ID:FNC00002}, the CPU 402 judges that the job request received from the voice control device 102 is a print job execution instruction.

Then, the CPU 402 performs processing for setting the operating authority over the image forming apparatus 101 (step S1026). Here, the operating authority over the image forming apparatus 101 has already been set for the voice control device 107 in the step S1009, and hence the operating authority over the image forming apparatus 101 is not set for the voice control device 102 which has started an interactive session after that.

In a case where the operating authority over the image forming apparatus 101 is not set for the voice control device 102, the CPU 402 performs the voice synthesis processing (step S1027). In the step S1207, voice synthesized data of voice, for example, "MFP 1 is in use", is generated. Then, the CPU 402 transmits the generated voice synthesized data to the voice control device 102 (step S1028).

The CPU 302 of the voice control device 102 reproduces the received voice synthesized data (step S1029). When this voice synthesized data is reproduced, the voice, for example, "MFP 1 is in use", is output from the speaker 310. Then, the CPU 302 lights off the LED 312. After that, the cloud server 103 performs the determination of termination of the interactive session, and upon receipt of the interactive session termination notification indicating a result of the determination, from the cloud server 103, the CPU 302 terminates the interactive session.

On the other hand, when the print job started in the step S1012 is terminated, the CPU 202 of the image forming apparatus 101 transmits a job termination notification indicating "normal termination" to the cloud server 103 via the network interface 406 (step S1030).

Upon receipt of the job termination notification, the CPU 402 of the cloud server 103 cancels the setting of the operating authority over the image forming apparatus 101 for the voice control device 107 (step S1031). Then, the CPU 402 updates the job management information registered in the step S1014 (step S1032). More specifically, the CPU 402 updates the job status in the job management information from "in-execution" to "standby". Further, the CPU 402 deletes the information indicating the image forming apparatus 101 executing the print job and the information indicating the voice control device 107 for which the operating authority over the image forming apparatus 101 has been set, from the job management information. Then, the CPU 402 performs the voice synthesis processing (step S1033). In the step S1033, voice synthesized data of voice, for example, "Print job normally finished by MFP 1", is generated. Then, the CPU 402 transmits the generated voice synthesized data to the voice control device 107 via the network interface 406 (step S1034).

The CPU 302' of the voice control device 107 reproduces the received voice synthesized data (step S1035). When this voice synthesized data is reproduced, the voice, for example, "Print job normally finished by MFP 1", is output from the speaker 310', followed by terminating the present process.

According to the above-described first embodiment, the control for causing the image forming apparatus 101 to execute a job is performed based on the information on which of the voice control device 102 and the voice control device 107 is a device which is to be preferentially used. With this, it is possible to properly cope with the state of competition between instructions in the configuration in which a plurality of voice control devices are coordinated with one image forming apparatus.

Further, in the above-described first embodiment, the operating authority over the image forming apparatus 101 is set for one of the voice control device 102 and the voice control device 107, whereby the image forming apparatus 101 is caused to execute a job associated with a voice instruction received by the voice control device for which the operating authority over the image forming apparatus 101 is set. This makes it possible to avoid the state of competition between instructions.

Further, in the above-described first embodiment, the operating authority over the image forming apparatus 101 is set for one of the voice control device 102 and the voice control device 107, which has received a voice instruction first. This makes it possible to positively execute a print job associated with the voice instruction received first.

Note that in the above-described first embodiment, the operating authority over the image forming apparatus 101 may be set for one of the voice control device 102 and the voice control device 107, for which a higher priority has been set.

FIG. 11 is a diagram showing changes in a screen occurring when setting the priority of the voice control device in the information processing system 100 shown in FIG. 1. Although in the present embodiment, an example in which the image forming apparatus 101 is used as a terminal that logs in the cloud server 103 is described, the terminal that logs in the cloud server 103 is not limited to the image forming apparatus 101. For example, an apparatus, such as a PC or a mobile device, may be used as the terminal that logs in the cloud server 103.

A login screen 1101 appearing in FIG. 11 is a screen for logging in the cloud server 103 and is displayed on the console panel 209 of the image forming apparatus 101 as the terminal that logs in the cloud server 103. The login screen 1101 is displayed when a predetermined URL is input as a URL input box 1102 on the browser displayed on the console panel 209. When a user enters values in a service URL input box 1103, a service ID input box 1104, and a password input box 1105, and presses a login button 1106, the screen on the console panel 209 is changed to a setting menu screen 1107.

The setting menu screen 1107 is a screen for registering an image forming apparatus and a voice control device, and setting a priority. When the user presses a priority setting button 1108 on the setting menu screen 1107, the screen on the console panel 209 is changed to an MFP selection screen 1109.

The MFP selection screen 1109 is a screen for selecting an image forming apparatus for which the priority of a voice control device to be coordinated is set, from a plurality of registered image forming apparatuses. When the user selects one of the plurality of registered image forming apparatuses displayed on the MFP selection screen 1109, the screen on the console panel 209 is changed to a voice control device priority-setting screen 1111. In the present embodiment, it is assumed that an MFP button 1110 corresponding to the image forming apparatus 101 is selected, by way of example.

The voice control device priority-setting screen 1111 displays a list of voice control devices registered in advance as a device to be coordinated with the image forming apparatus 101 and the priority of each voice control device. When the user changes the priority of a voice control device and presses an OK button 1112, the changed priority is set as the priority of the voice control device. In the present embodiment, in a case where the value of the priority is "1", this priority is the highest, and the priority becomes lower as the value of the priority is larger.

Figure 12A:
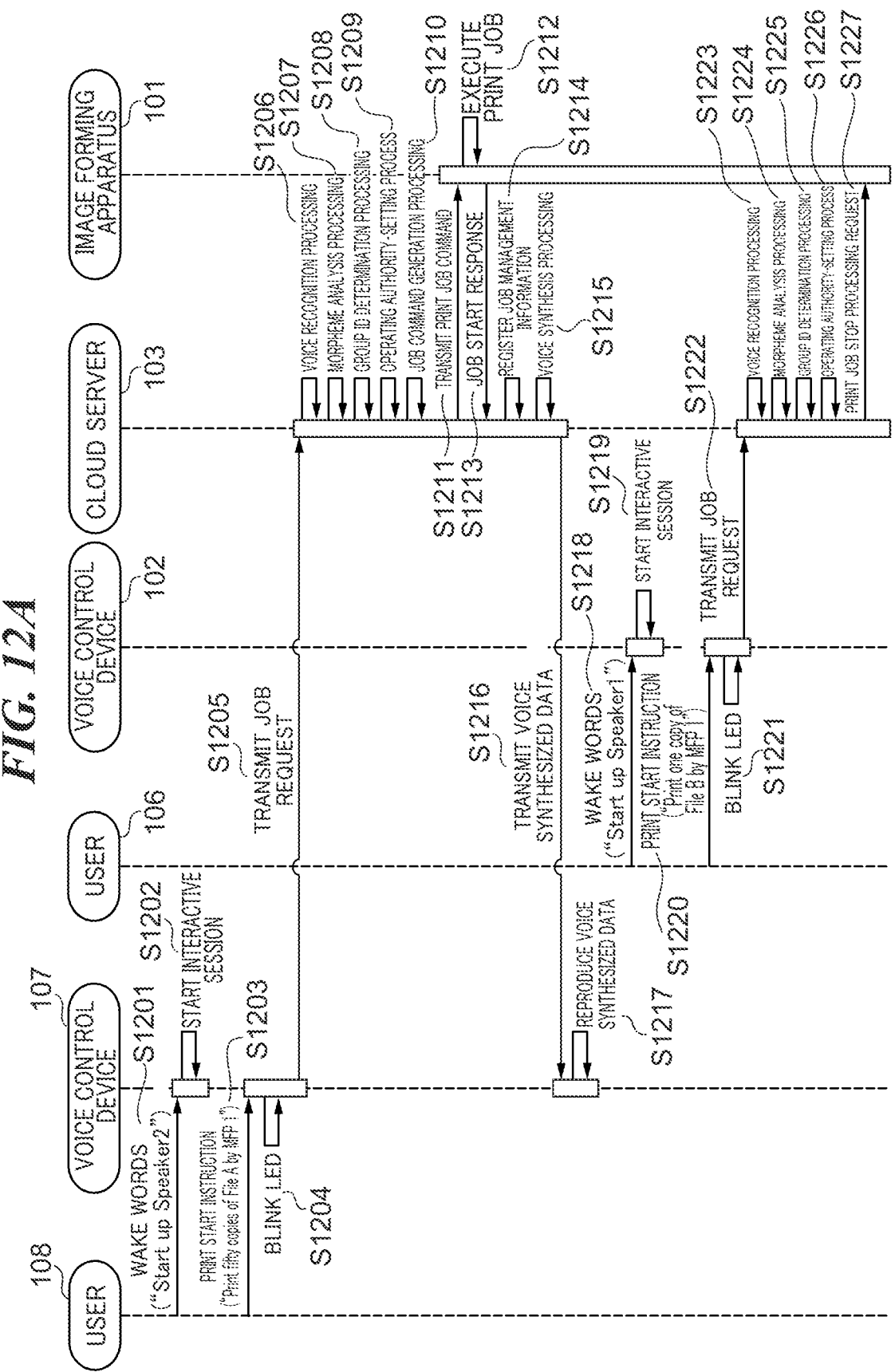
FIGS. 12A and 12B are a sequence diagram showing a second example of the voice operation control performed by the information processing system according to the first embodiment.
Figure 12B:
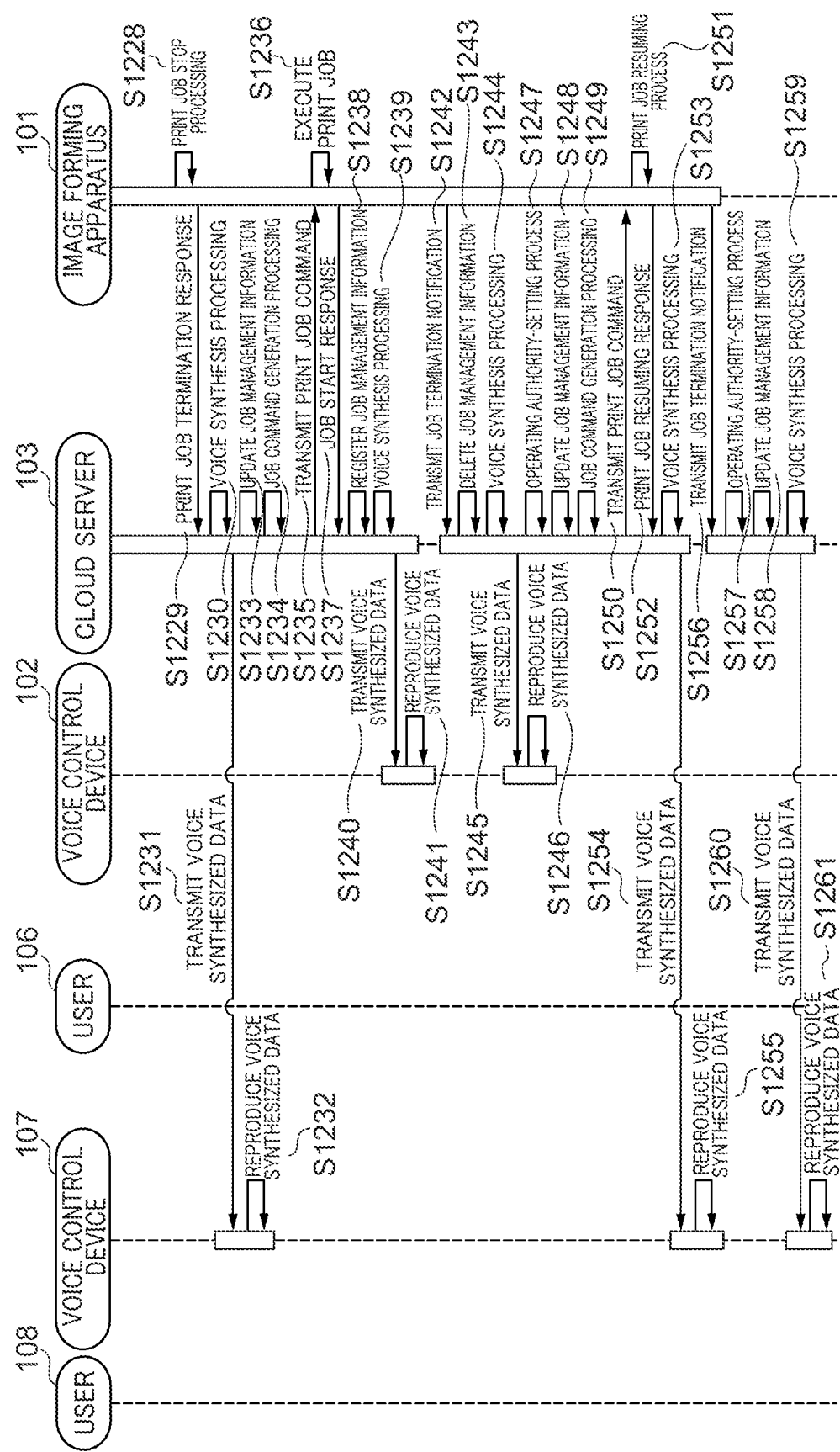

FIGS. 12A and 12B are a sequence diagram showing a second example of the voice operation control performed by the information processing system 100 according to the first embodiment. The voice operation control in FIGS. 12A and 12B is basically the same as the voice operation control in FIGS. 10A and 10B, and the following description will be given of different points from the voice operation control in FIGS. 10A and 10B. In FIGS. 12A and 12B, it is assumed that the priority lower than that of the voice control device 102 has been set for the voice control device 107. In FIGS. 12A and 12B, a case will be described, by way of example, where the voice control device 102 for which the higher priority than that of the voice control device 107 has been set receives a voice instruction as an instruction for executing another print job while the image forming apparatus 101 is executing a print job instructed by a voice operation given to the voice control device 107. Also in the voice operation control in FIGS. 12A and 12B, it is assumed that the user 106 has registered the above-mentioned user information in advance via the application provided by the service corresponding to the service URL "http://service1.com" managed by the cloud server 103, the WebAPI, and so forth. Further, also in the voice operation control in FIGS. 12A and 12B, it is assumed that the image forming apparatus 101 has already been registered by the registration process in FIG. 8, and the voice control device 107 and the voice control device 102 have already been registered by the registration process in FIG. 9. Note that also in the voice operation control in FIGS. 12A and 12B, the voice control device 102, the image forming apparatus 101, the cloud server 103 are in a state communicable with one another. Further, the image forming apparatus 101 is in a state capable of calling copy, scan, print, and the like functions, after started up by powering-on.

Referring to FIGS. 12A and 12B, first, steps S1201 to S1208 which are the same as the steps S1001 to S1008 are executed. With these steps, the cloud server 103 performs the voice recognition processing, the morpheme analysis processing, and the group ID determination processing based on a job request received from the voice control device 107. Then, the CPU 402 of the cloud server 103 executes an operating authority-setting process (step S1209), described hereinafter with reference to FIG. 13, and sets the operating authority over the image forming apparatus 101 for the voice control device 107. Then, steps S1210 to S1225 which are the same as the steps S1010 to S1025 are executed. With these steps, the cloud server 103 performs the voice recognition processing, the morpheme analysis processing, and the group ID determination processing based on the job request transmitted from the voice control device 102 while the image forming apparatus 101 is executing the print job associated with the job request received from the voice control device 107.

Then, the CPU 402 of the cloud server 103 executes the operating authority-setting process, described hereinafter with reference to FIG. 13 (step S1226). Here, although the operating authority over the image forming apparatus 101 is set for the voice control device 107 in the step S1209, the voice control device 102 is higher in priority than the voice control device 107 as mentioned above. In this case, in the step S1226, the setting of the operating authority over the image forming apparatus 101 for the voice control device 107 is canceled, and the operating authority over the image forming apparatus 101 is set for the voice control device 102. Then, the CPU 402 transmits a print job stop processing request for stopping the print job being executed to the image forming apparatus 101 (step S1227).

The CPU 202 of the image forming apparatus 101 execute print job stop processing according to the received print job stop processing request (step S1228; see FIG. 12B hereafter). In the print job stop processing, the CPU 202 stops the print job being executed, i.e. the print job which has been instructed by the voice operation on the voice control device 107 and started in the step S1212. When the image forming apparatus 101 has stopped this print job and shifted to a state capable of executing another print job, the CPU 202 transmits a print job termination response to the cloud server 103 (step S1229).

Upon receipt of the job termination response, the CPU 402 of the cloud server 103 performs the voice synthesis processing (step S1230). In the step S1230, voice synthesized data of voice, for example, "Printing by MFP 1 has been interrupted", is generated. Then, the CPU 402 transmits the generated voice synthesized data to the voice control device 107 (step S1231).

The CPU 302' of the voice control device 107 reproduces the received voice synthesized data (step S1232). When this voice synthesized data is reproduced, the voice, for example, "Printing by MFP 1 has been interrupted", is output from the speaker 310'.

On the other hand, after transmitting the voice synthesized data to the voice control device 107 in the step S1231, the CPU 402 of the cloud server 103 updates the job management information registered in the step S1214 (step S1233). In the step S1233, the information indicating that the job status is "in-execution" is deleted from this job management information. Then, the CPU 402 performs the job command generation processing based on the voice data received from the voice control device 102 in the step S1222 (step S1234). Then, the CPU 402 transmits the generated print job command to the image forming apparatus 101 (step S1235).

The CPU 202 of the image forming apparatus 101 executes a print job based on the received print job command (step S1236). Then, the CPU 202 notifies the cloud server 103 of a job start response indicating that the image forming apparatus 101 has started the print job associated with the received print job command (step S1237).

Upon receipt of the job start response, the CPU 402 of the cloud server 103 registers job management information (step S1238). This job management information includes information indicating that the job status is "in-execution", information indicating the image forming apparatus 101 executing the print job, and information indicating the voice control device 102 for which the operating authority over the image forming apparatus 101 has been set. Then, the CPU 402 performs the voice synthesis processing (step S1239). In the step S1239, voice synthesized data of voice, for example, "Interrupted printing by MFP 1", is generated. Then, the CPU 402 transmits the generated voice synthesized data to the voice control device 102 (step S1240).

The CPU 302 of the voice control device 102 reproduces the received voice synthesized data (step S1241). When this voice synthesized data is reproduced, the voice, for example, "Interrupted printing by MFP 1", is output from the speaker 310. Then, the CPU 302 lights off the LED 312. After that, the cloud server 103 performs determination of termination of the interactive session, and upon receipt of the interactive session termination notification transmitted from the cloud server 103 based on a result of the determination, the CPU 302 terminates the interactive session.

On the other hand, when the print job started in the step S1236 is terminated, the CPU 202 of the image forming apparatus 101 transmits a job termination notification indicating "normal termination" to the cloud server 103 via the network interface 406 (step S1242).

Upon receipt of the job termination notification, the CPU 402 of the cloud server 103 deletes the job management information registered in the step S1238 (step S1243). Then, the CPU 402 performs the voice synthesis processing (step S1244). In the step S1244, voice synthesized data of voice, for example, "Job of MFP 1 has been terminated", is generated. Then, the CPU 402 transmits the generated voice synthesized data to the voice control device 102 (step S1245).

The CPU 302 of the voice control device 102 reproduces the received voice synthesized data (step S1246). When this voice synthesized data is reproduced, the voice, for example, "Job of MFP 1 has been terminated", is output from the speaker 310.

On the other hand, after transmitting the voice synthesized data to the voice control device 102 in the step S1245, the CPU 402 of the cloud server 103 performs the operating authority-setting process, described hereinafter with reference to FIG. 13 (step S1247). In the step S1247, the setting of the operating authority over the image forming apparatus 101 for the voice control device 102 is canceled, and the operating authority over the image forming apparatus 101 is set for the voice control device 107 for which the setting of the same has been canceled in the step S1226. Note that this setting process may be executed at any other timing after the cloud server 103 has received the job termination notification transmitted from the image forming apparatus 101 in the step S1242 before the step S1248 is started. Then, the CPU 402 updates the job management information updated in the step S1233 (step S1248). In the step S1248, information indicating that the job state is "resume" is added to the job management information. Then, the CPU 402 executes the job command generation processing (step S1249). In the step S1249, a print job command for resuming the print job stopped in the step S1228 is generated. Then, the CPU 402 transmits the generated print job command to the image forming apparatus 101 (step S1250).

The CPU 202 of the image forming apparatus 101 performs print job resuming processing based on the received print job command (step S1251). With this, the print job stopped in the step S1228, i.e. the print job instructed by the voice operation given to the voice control device 107 is resumed. Then, the CPU 202 transmits a job resuming response indicating that the above-mentioned print job has been resumed to the cloud server 103 (step S1252).

Upon receipt of the print job resuming response, the CPU 402 of the cloud server 103 performs the voice synthesis processing (step S1253). In the step S1253, voice synthesized data of voice, for example, "Printing by MFP 1 has been resumed", is generated. Then, the CPU 402 transmits the generated voice synthesized data to the voice control device 107 (step S1254).

The CPU 302' of the voice control device 107 reproduces the received voice synthesized data (step S1255). When this voice synthesized data is reproduced, the voice, for example, "Printing by MFP 1 has been resumed", is output from the speaker 310'.

On the other hand, when the job resumed in the step S1251 is terminated, the CPU 202 of the image forming apparatus 101 transmits a job termination notification indicating "normal termination" to the cloud server 103 via the network interface 406 (step S1256).

Upon receipt of the job termination notification, the CPU 402 of the cloud server 103 performs the operating authority-setting process, described hereinafter with reference to FIG. 13 (step S1257), and cancels the setting of the operating authority over the image forming apparatus 101 for the voice control device 107. Then, the CPU 402 updates the job management information updated in the step S1248 (step S1258). More specifically, the CPU 402 updates the job state in the job management information from "in-execution" to "standby". Further, the CPU 402 deletes the information indicating the image forming apparatus 101 executing the print job, and the information indicating the voice control device 107 for which the operating authority over the image forming apparatus 101 has been set, from the job management information. Then, the CPU 402 performs the voice synthesis processing (step S1259). In the step S1259, voice synthesized data of voice, for example, "Print job by MFP 1 has been normally terminated", is generated. Then, the CPU 402 transmits the generated voice synthesized data to the voice control device 107 via the network interface 406 (step S1260).

The CPU 302' of the voice control device 107 reproduces the received voice synthesized data (step S1261). When this voice synthesized data is reproduced, the voice, for example, "Print job by MFP 1 has been normally terminated", is output from the speaker 310', followed by terminating the present process.

FIG. 13 is a flowchart of the operating authority-setting process performed in the steps S1209, S1226, S1247, and S1257 in FIGS. 12A and 12B. The operating authority-setting process in FIG. 13 is realized by the CPU 402 of the cloud server 103, which executes an associated program stored in the ROM 404 or the storage 405. The operating authority-setting process in FIG. 13 is executed in a case where the voice control device 102 or the voice control device 107 transmits voice data as a job request to the cloud server 103, or in a case where the image forming apparatus 101 or the image forming apparatus 110 transmits a job termination notification to the cloud server 103.

Referring to FIG. 13, the CPU 402 determines whether the received data is a job request or a job termination notification (step S1301).

If it is determined in the step S1301 that the received data is a job request, the CPU 402 determines whether or not the operating authority over an apparatus which is caused to execute a job associated with the received job request has been set for a voice control device different from the transmission source of the job request (step S1302). For example, in a case where the received data is a job request transmitted from the voice control device 102 and for causing the image forming apparatus 101 to execute a print job, it is determined in the step S1302 whether or not the operating authority over the image forming apparatus 101 has been set for the voice control device 107 different from the voice control device 102.

If it is determined in the step S1302 that the operating authority over the above-mentioned apparatus has not been set for a voice control device different from the transmission source of the job request, the CPU 402 sets the operating authority over the above-mentioned apparatus for the voice control device which is the transmission source of the job request (step S1303). With this, for example, the voice control device 102 which is the transmission source of the job request acquires the operating authority over the image forming apparatus 101, followed by terminating the operating authority-setting process.

If it is determined in the step S1302 that the operating authority over the above-mentioned apparatus has been set for a voice control device different from the transmission source of the job request, the CPU 402 compares the priority of the voice control device for which the operating authority over the above-mentioned apparatus has been set and the priority of the voice control device which is the transmission source of the job request (step S1304). The CPU 402 determines whether or not the priority of the voice control device which is the transmission source of the job request is higher than the priority of the voice control device for which the operating authority over the above-mentioned apparatus has been set (step S1305).

If it is determined in the step S1305 that the priority of the voice control device which is the transmission source of the job request is lower than the priority of the voice control device for which the operating authority over the above-mentioned apparatus has been set, the CPU 402 terminates the present process. If it is determined in the step S1305 that the priority of the voice control device which is the transmission source of the job request is higher than the priority of the voice control device for which the operating authority over the above-mentioned apparatus has been set, the CPU 402 executes a step S1306. In the step S1306, the CPU 402 cancels the setting of the operating authority over the above-mentioned apparatus for the voice control device for which the operating authority over the above-mentioned apparatus has been set, and sets anew the operating authority over the above-mentioned apparatus for the voice control device which is the transmission source of the job request, followed by terminating the operating authority-setting process.

If it is determined in the step S1301 that the received data is a job termination notification, the CPU 402 determines whether or not any other job request has been received (step S1307). In the step S1307, for example, in a case where a job request has been received from a voice control device different from the requesting source of the terminated job, the CPU 402 determines that another job request has been received. On the other hand, in a case where no job request has been received from any voice control device different from the requesting source of the terminated job, the CPU 402 determines that no other job request has been received.

If it is determined in the step S1307 that another job request has been received, the CPU 402 identifies a voice control device which is the highest in priority, out of the voice control devices which are the transmission sources of the received job requests. The CPU 402 sets the operating authority over the above-mentioned apparatus for the identified voice control device (step S1308), followed by terminating the operating authority-setting process.

If it is determined in the step S1307 that no other job request has been received, the CPU 402 cancels the setting of the operating authority over the above-mentioned apparatus for the voice control device as the requesting source of the terminated job (step S1309), followed by terminating the present process.

In the above-described first embodiment, the operating authority over the image forming apparatus 101 is set for a voice control device for which the higher priority has been set, out of the voice control device 102 and the voice control device 107. With this, it is possible to preferentially execute a print job associated with a voice instruction received by the voice control device for which the higher priority has been set.

Further, in the above-described first embodiment, in a case where the voice control device 102 for which the higher priority than that of the voice control device 107 has been set receives another voice instruction while the image forming apparatus 101 is executing a print job associated with a voice instruction received by the voice control device 107, a voice control device for which the operating authority over the image forming apparatus 101 is set is changed from the voice control device 107 to the voice control device 102. With this, in a case where the voice control device 102 for which the higher priority than that of the voice control device 107 has been set receives a voice instruction after the voice control device 107 has received a voice instruction, it is possible to positively set the operating authority over the image forming apparatus 101 for the voice control device 102.

Further, in the above-described first embodiment, the image forming apparatus 101 is caused to suspend execution of the print job associated with the voice instruction received by the voice control device 107 and execute the other print job associated with the other voice instruction received by the voice control device 102 as an interrupt. With this, even when the print job associated with the voice instruction received by the voice control device 107 is being executed first, it is possible to preferentially execute the other print job associated with the voice instruction received by the voice control device 102 for which the higher priority than that of the voice control device 107 has been set.

In the above-described first embodiment, after completion of the other print job associated with the other voice instruction received by the voice control device 102, the image forming apparatus 101 is caused to resume the suspended print job, i.e. the print job associated with the voice instruction received by the voice control device 107. With this, it is possible to prevent the print job associated with the voice instruction received by the voice control device 107 from being unexecuted by being left in the suspended state.

Note that in the above-described first embodiment, in a case where a voice instruction received by the voice control device 102 for which the higher priority than that of the voice control device 107 has been set is a keyword for checking the device status, the setting of the operating authority over the image forming apparatus 101 may be held in a state set for the voice control device 107.

Figure 14A:
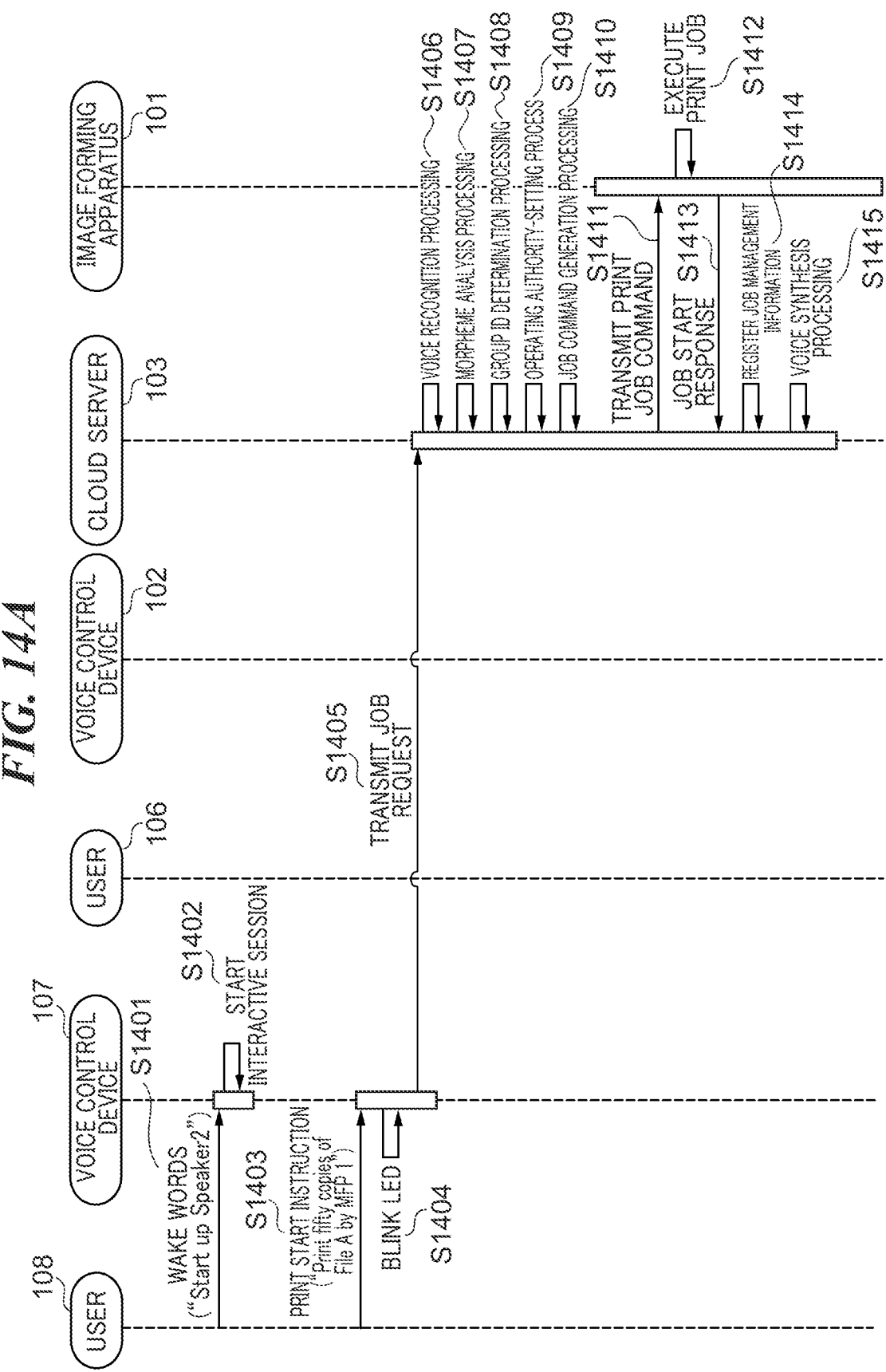

FIGS. 14A and 14B are a sequence diagram showing a third example of the voice operation control performed by the information processing system 100 according to the first embodiment. The voice operation control in FIGS. 14A and 14B is basically the same as the voice operation controls in FIGS. 10A and 10B and FIGS. 12A and 12B, and the following description will be given of different points from the voice operation controls in FIGS. 10A and 10B and FIGS. 12A and 12B. Also in FIGS. 14A and 14B, it is assumed that the priority lower than that of the voice control device 102 has been set for the voice control device 107. In FIGS. 14A and 14B, a case will be described, by way of example, where the voice control device 102 receives a keyword as an instruction for checking a status of the image forming apparatus 101 while the image forming apparatus 101 is executing a print job instructed by a voice operation given to the voice control device 107. Note that also in the voice operation control in FIGS. 14A and 14B, it is assumed that the user 106 has registered the above-mentioned user information in advance via the application provided by the service corresponding to the service URL "http://service1.com" managed by the cloud server 103, the WebAPI, and so forth, in advance. Further, also in the voice operation control in FIGS. 14A and 14B, it is assumed that the image forming apparatus 101 has already been registered by the registration process in FIG. 8, and the voice control device 107 and the voice control device 102 have already been registered by the registration process in FIG. 9. Note that also in the voice operation control in FIGS. 14A and 14B, the voice control device 102, the image forming apparatus 101, the cloud server 103 are in a state communicable with one another. Further, the image forming apparatus 101 is in a state capable of calling copy, scan, print, and the like functions, after started up by powering-on.

Referring to FIGS. 14A and 14B, first, steps S1401 to S1419 which are the same as the above-described steps S1201 to S1219 are executed. With these steps, the image forming apparatus 101 starts a print job instructed by a voice operation given to the voice control device 107, and then the voice control device 102 for which the higher priority than that of the voice control device 107 has been set starts an interactive session. Then, the user 106 utters a keyword for performing checking of the device status to the voice control device 102 (step S1420). This keyword is e.g. "MFP1 toner remaining amount?".

When it is detected that the user 106 has uttered the above-mentioned keyword, the CPU 302 of the voice control device 102 performs the LED lighting control for indicating the response processing state. More specifically, the CPU 302 causes the LED 312 to blink, via the display controller 311 (step S1421). Then, the CPU 302 transmits a device status check request to the cloud server 103 via the network interface 306 (step S1422). This device status check request includes voice data of the keyword uttered by the user 106 in the step S1420 and the serial number of the voice control device 102.

The CPU 402 of the cloud server 103 performs the voice recognition processing on the received voice data (step S1423). With the processing in the step S1423, the voice of "MFP1 toner remaining amount?" is generated as text. Then, the CPU 402 performs the morpheme analysis processing on the generated text (step S1424). As a result of the processing in the step S1424, the text of "MFP1 toner remaining amount?" is analyzed as a morpheme string of "M", "F", "P", "1", "toner", and "remaining amount?". The CPU 402 records the morpheme string "M", "F", "P", "1", "toner", and "remaining amount?" in the morpheme string analysis result list stored in the RAM 403.

Then, the CPU 402 performs the group ID determination processing on the text of the morpheme string analyzed in the step S1424 (step S1425). In the group ID determination processing, for example, matching between the morpheme string "M", "F", "P", "1", "toner", "remaining amount?" and the group ID list shown in FIGS. 7B1 to 7B4 is performed. As a group ID determination result, the CPU 402 generates {ID:ALP00013, ID:ALP00006, ID:ALP00016, ID:NUM00001, ID:NAM00006, ID: NAM00007}. Since the top of the group ID determination result is {ID: ALP00013} and the end of the same is {ID: NAM00006, ID: NAM00007}, the CPU 402 determines that the request received from the voice control device 102 is not a job request, but a request for checking the toner remaining amount.

Then, the CPU 402 transmits a toner remaining amount check command to the image forming apparatus 101 without performing the above-described operating authority-setting process (step S1426). Thus, even when a request is received from the voice control device 102 which is higher in priority than the voice control device 107 while the print job instructed by a voice operation given to the voice control device 107 is being executed, in a case where the processing associated with this request can be executed in parallel with the job being executed, the setting of the operating authority is not changed (see e.g. the step S1226).

The CPU 202 of the image forming apparatus 101 checks the toner remaining amount while executing the print job instructed by the voice operation given to the voice control device 107 and transmits a toner remaining amount notification indicating the checked toner remaining amount to the cloud server 103 (step S1427).

The CPU 402 of the cloud server 103 performs the voice synthesis processing based on the received toner remaining amount notification (step S1428). In the step S1428, voice synthesized data of voice, for example, "MFP 1 toner remaining amount is 50%", is generated. Then, the CPU 402 transmits the generated voice synthesized data to the voice control device 102 (step S1429).

The CPU 302 of the voice control device 102 reproduces the received voice synthesized data (step S1430). When this voice synthesized data is reproduced, the voice, for example, "MFP 1 toner remaining amount is 50%", is output from the speaker 310. Then, steps S1431 to S1436 which are the same as the steps S1030 to S1035 are executed, followed by terminating the present process.

In the above-described first embodiment, in a case where the voice control device 102 for which the higher priority than that of the voice control device 107 has been set receives a voice instruction for checking the device status while the print job associated with the job request received from the voice control device 107 is being executed, the operating authority over the image forming apparatus 101 set for the voice control device 107 is held. With this, it is possible to prevent the print job from being unnecessarily suspended even when a voice instruction received by the voice controller 102 is an instruction for executing processing which can be executed in parallel with the print job associated with the job request received from the voice control device 107.

Note that in the above-described embodiment, the operating authority over the image forming apparatus 101 may be set for a voice control device that has received a predetermined word indicating urgency (hereinafter referred to as the "urgency suggesting word"), out of the voice control device 102 and the voice control device 107.

Figure 15:
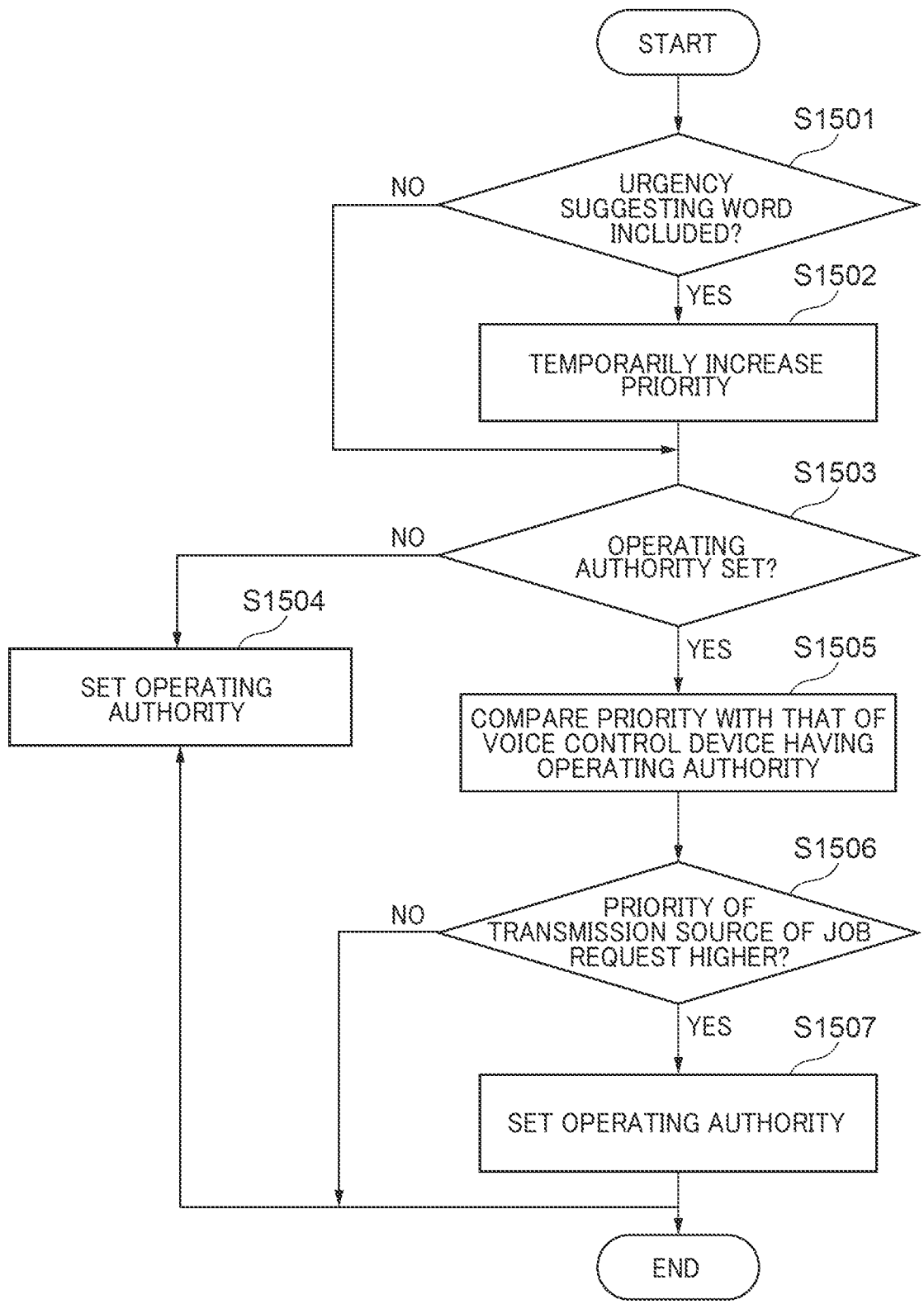
FIG. 15 is a flowchart of a variation of the operating authority-setting process in FIG. 13.

FIG. 15 is a flowchart of a variation of the operating authority-setting process in FIG. 13. The operating authority-setting process in FIG. 15 is realized by the CPU 402 of the cloud server 103, which executes an associated program stored in the ROM 404 or the storage 405. The operating authority-setting process in FIG. 15 is executed in a case where the cloud server 103 receives a job request from the voice control device 102 or the voice control device 107.

Referring to FIG. 15, the CPU 402 determines whether or not an urgency suggesting word is included in voice data included in the received job request (step S1501). The urgency suggesting word is e.g. "hurry" or "urgent".

If it is determined in the step S1501 that an urgency suggesting word is included in the voice data included in the received job request, the CPU 402 performs processing for temporarily increasing the priority of the voice control device which is the transmission source of the job request (step S1502). With the processing in the step S1502, the priority of the voice control device which is the transmission source of the job request becomes highest. With this, the operating authority over the apparatus which is caused to execute a print job associated with the job request is set for the voice control device having received the urgency suggesting word. Note that the priority temporarily changed in the step S1502 is changed to the original setting of the priority at a predetermined timing, such as a timing when the interactive session of the voice control device is terminated. In a step S1503 following the step S1502, the CPU 402 determines whether or not the operating authority over the apparatus which is caused to execute the print job associated with the job request has been set for another voice control device different from the voice control device which is the transmission source of the job request. If it is determined in the step S501 that no urgency suggesting word is included in the voice data included in the received job request, the CPU 402 directly proceeds to the step S1503.

If it is determined in the step S1503 that the operating authority over the above-mentioned apparatus has not been set for any other voice control device, the CPU 402 sets the operating authority over the above-mentioned apparatus for the voice control device which is the transmission source of the job request (step S1504), followed by terminating the present process.

If it is determined in the step S1503 that the operating authority over the above-mentioned apparatus has been set for another voice control device, the CPU 402 compares the priority of the voice control device for which the operating authority over the above-mentioned apparatus has been set and the priority of the voice control device which is the transmission source of the job request (step S1505). Then, the CPU 402 determines whether or not the priority of the voice control device which is the transmission source of the job request is higher than the priority of the voice control device for which the operating authority over the above-mentioned apparatus has been set (step S1506).

If it is determined in the step S1506 that the priority of the voice control device which is the transmission source of the job request is not higher than the priority of the voice control device for which the operating authority over the above-mentioned apparatus has been set, the CPU 402 terminates the present process. If it is determined in the step S1506 that the priority of the voice control device which is the transmission source of the job request is higher than the priority of the voice control device for which the operating authority over the above-mentioned apparatus has been set, the CPU 402 executes a step S1507. In the step S1507, the CPU 402 cancels the setting of the operating authority over the above-mentioned apparatus for the voice control device and sets anew the operating authority over the above-mentioned apparatus for the voice control device which is the transmission source of the job request, followed by terminating the operating authority-setting process.

In the above-described first embodiment, the operating authority over the image forming apparatus 101 is set for a voice control device that has received an urgency suggesting word, out of the voice control device 102 and the voice control device 107. With this, it is possible to immediately execute a print job having high urgency even when the user performs a voice instruction to any of the voice control device 102 and the voice control device 107.

Next, details of the function and the configuration of the device operating authority management section 704 included in the voice data conversion control program 700 executed by the cloud server 103 will be described.

Figure 16:
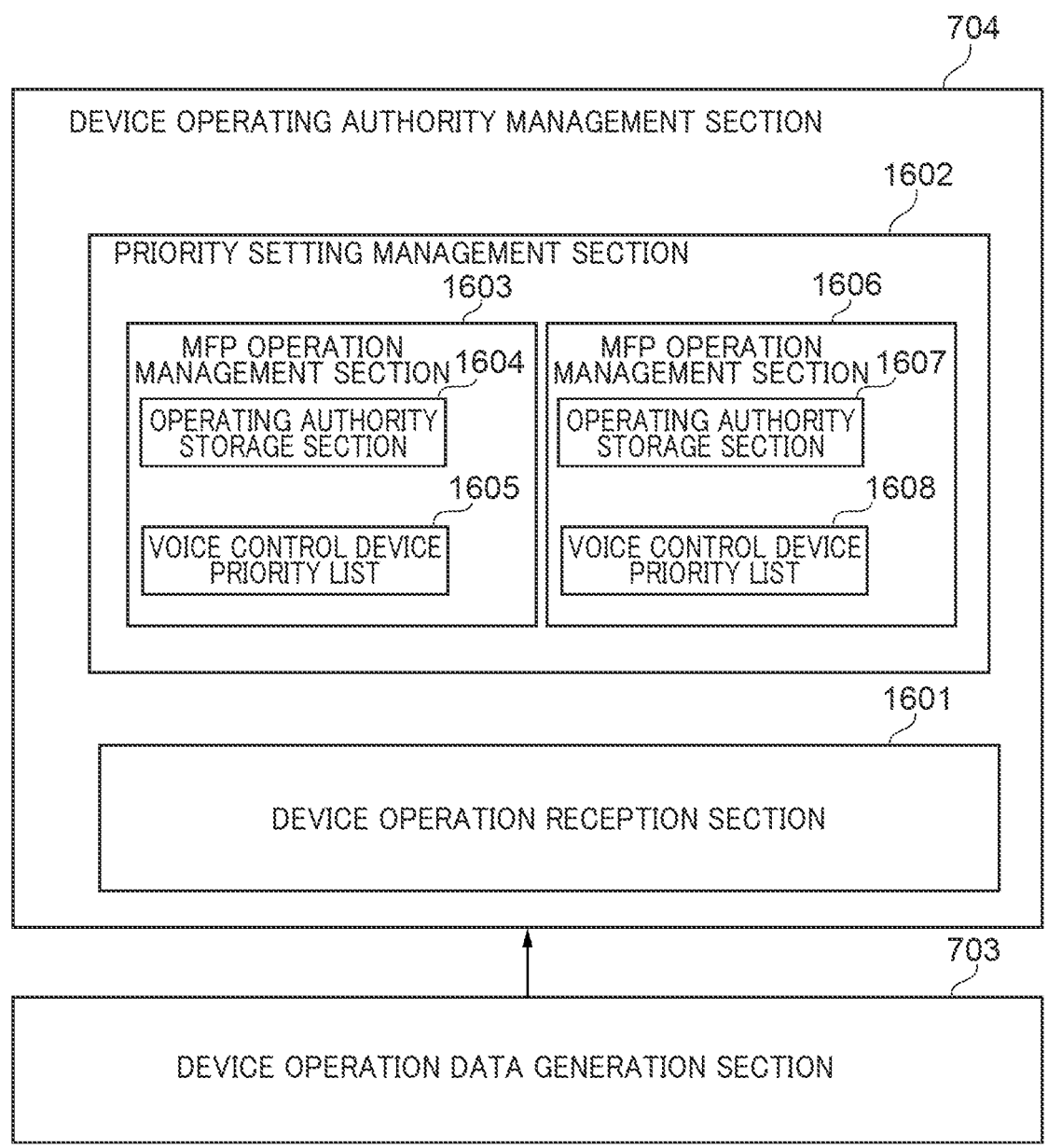
FIG. 16 is a schematic block diagram of a device operating authority management section appearing in FIG. 7A.

FIG. 16 is a schematic block diagram of the device operating authority management section 704 appearing in FIG. 7A. Referring to FIG. 16, the device operating authority management section 704 is comprised of a device operation reception section 1601 and a priority setting management section 1602.

The device operation reception section 1601 receives a command generated based on a job request or a device status check request, which is transmitted e.g. from the voice control device 102, from the device operation data generation section 703. The priority setting management section 1602 has MFP operation management sections corresponding in number to the number of registered image forming apparatuses. FIG. 16 shows a configuration of the device operating authority management section 704 including two MFP operation management section 1603 and 1606 corresponding in number to the number of the registered image forming apparatuses 101 and 110, by way of example. The priority setting management section 1602 determines whether the command received by the device operation reception section 1601 is a command to the image forming apparatus 101 or a command to the image forming apparatus 110, and assigns the received command to the MFP operation management section 1603 or the MFP operation management section 1606. A command to the image forming apparatus 101 is assigned to the MFP operation management section 1603, and a command to the image forming apparatus 110 is assigned to the MFP operation management section 1606.

The MFP operation management section 1603 manages the operation of the image forming apparatus 101, and the MFP operation management section 1606 manages the operation of the image forming apparatus 110. Note that in the present embodiment, the MFP operation management section 1603 and the MFP operation management section 1606 have the same functions and components except a point that the management target is different. The following description will be given of the functions and components of the MFP operation management section 1603, by way of example.

The MFP operation management section 1603 includes an operating authority storage section 1604 and a voice control device priority list 1605. In the operating authority storage section 1604, a serial number of a voice control device which is a requesting source of a job being executed by the image forming apparatus 101 is recorded. In the voice control device priority list 1605, the priorities of voice control devices coordinated with the image forming apparatus 101 are set.

The MFP operation management section 1603 determines whether a received command is based on a job request or a device status check request. For example, in a case where the received command is based on a device status check request, the MFP operation management section 1603 transmits the received command to the image forming apparatus 101. On the other hand, in a case where the received command is based on a job request, the MFP operation management section 1603 checks whether or not the serial number of the voice control device which is the requesting source of the job being executed by the image forming apparatus 101 has been recorded in the operating authority storage section 1604.

In a case where the serial number of the voice control device which is the requesting source of the job being executed by the image forming apparatus 101 has been recorded in the operating authority storage section 1604, the MFP operation management section 1603 checks the voice control device priority list 1605. The MFP operation management section 1603 compares the priority of the voice control device which is the requesting source of the job and the priority of a voice control device corresponding to the serial number recorded in the operating authority storage section 1604. As a result of the comparison, in a case where the priority of the voice control device which is the requesting source of the job is higher, the control for suspending the job being executed by the image forming apparatus 101 and causing the image forming apparatus 101 to execute a job according to the command received by the MFP operation management section 1603 is performed. In doing this, in the operating authority storage section 1604, the recorded serial number is rewritten with the serial number of the voice control device which is the transmission source of the job. On the other hand, as a result of the comparison, in a case where the priority of the voice control device which is the requesting source of the job is not higher, an error response is transmitted to the voice control device which is the transmission source of the job request.

Figure 17B:
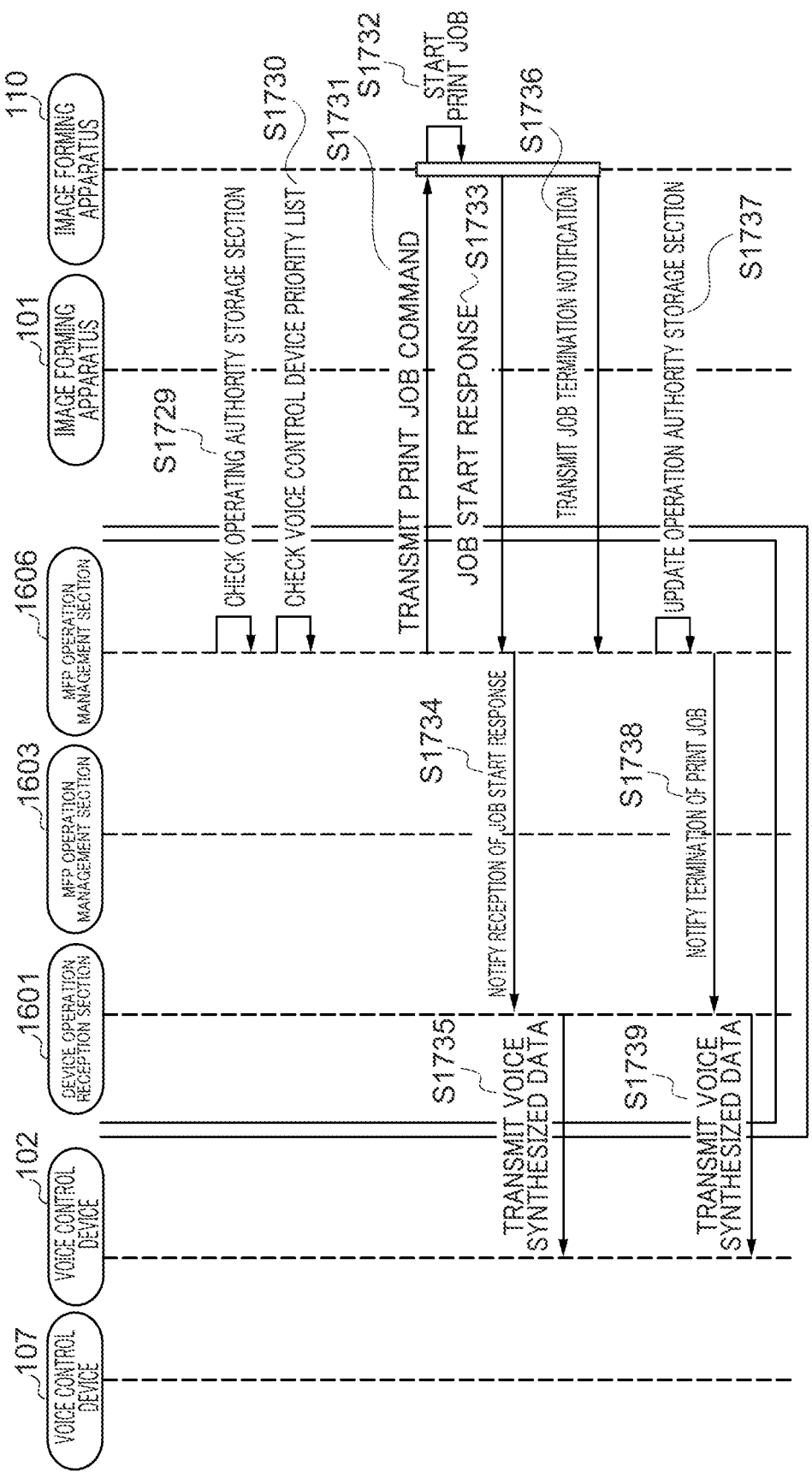

FIGS. 17A and 17B are a sequence diagram useful in explaining internal operations of the device operating authority management section 704 appearing in FIG. 7A.

Referring to FIGS. 17A and 17B, the voice control device 107 transmits a job request for the image forming apparatus 101 to the cloud server 103 (step S1701). In the cloud server 103, a print job command is generated based on the received job request, and the device operation reception section 1601 of the device operating authority management section 704 receives the generated print job command.

Then, the device operation reception section 1601 analyzes the received print job command and outputs the print job command to the MFP operation management section 1603 that manages the operation of the image forming apparatus 101 (step S1702).

The MFP operation management section 1603 checks the operating authority storage section 1604 (step S1703). In a case where a serial number of another voice control device different from the voice control device 107 has been recorded in the operating authority storage section 1604, the MFP operation management section 1603 checks the voice control device priority list 1605 (step S1704). The MFP operation management section 1603 compares the priority of the voice control device corresponding to the serial number recorded in the operating authority storage section 1604 and the priority of the voice control device 107. As a result of the comparison, in a case where the priority of the voice control device 107 is higher, the MFP operation management section 1603 rewrites the serial number recorded in the operating authority storage section 1604 with the serial number of the voice control device 107. Then, the MFP operation management section 1603 transmits the print job command to the image forming apparatus 101 (step S1705).

The image forming apparatus 101 starts a print job based on the received print job command (step S1706). Then, the image forming apparatus 101 notifies the cloud server 103 of a job start response indicating that the image forming apparatus 101 has started the print job associated with the received print job command (step S1707).

Upon receipt of the job start response, the MFP operation management section 1603 notifies the device operation reception section 1601 of this response (step S1708). Then, the cloud server 103 generates voice synthesized data for reproducing voice to the effect that the print job has been started and transmits the generated voice synthesized data to the voice control device 107 (step S1709).

After that, the voice control device 102 different from the voice control device 107 transmits a device status check request for checking a toner remaining amount of the image forming apparatus 101 to the cloud server 103 (step S1710). In the cloud server 103, a toner remaining amount check command is generated based on the received device status check request, and the device operation reception section 1601 receives the toner remaining amount check command.

Then, the device operation reception section 1601 analyzes the received toner remaining amount check command and outputs the toner remaining amount check command to the MFP operation management section 1603 (step S1711). The MFP operation management section 1603 checks the operating authority storage section 1604, confirms that the image forming apparatus 101 can execute the toner remaining amount check command, and transmits the toner remaining amount check command to the image forming apparatus 101 (step S1712).

The image forming apparatus 101 checks the toner remaining amount according to the received toner remaining amount check command (step S1713) and transmits a toner remaining amount notification including a result of the check to the cloud server 103 (step S1714).

Upon receipt of the toner remaining amount notification from the image forming apparatus 101, the MFP operation management section 1603 notifies the device operation reception section 1601 of the toner remaining amount (step S1715). Then, the cloud server 103 generates voice synthesized data for reproducing a result of the toner remaining amount check and transmits the generated voice synthesized data to the voice control device 102 (step S1716).

After that, the voice control device 102 transmits a job request for the image forming apparatus 101 to the cloud server 103 (step S1717). In the cloud server 103, a print job command is generated based on the received job request, and the device operation reception section 1601 of the device operating authority management section 704 receives the generated print job command.

Then, the device operation reception section 1601 analyzes the received print job command and outputs the print job command to the MFP operation management section 1603 that manages the operation of the image forming apparatus 101 (step S1718).

The MFP operation management section 1603 checks the operating authority storage section 1604 (step S1719). For example, in a case where a serial number of another voice control device different from the voice control device 102 has been recorded in the operating authority storage section 1604, the MFP operation management section 1603 checks the voice control device priority list 1605 (step S1720). The MFP operation management section 1603 compares the priority of the voice control device corresponding to the serial number recorded in the operating authority storage section 1604 and the priority of the voice control device 102 having transmitted the job request in the step S1717. As a result of the comparison, in a case where the priority of the voice control device 102 is not higher, the MFP operation management section 1603 notifies the device operation reception section 1601 that the print job based on the print job command received in the step S1718 cannot be executed (step S1721). The cloud server 103 generates voice synthesized data for reproducing voice to the effect that the print job cannot be executed and transmits the generated voice synthesized data to the voice control device 102 (step S1722).

On the other hand, when the print job started in the step S1706 is terminated, the image forming apparatus 101 transmits a job termination notification to the cloud server 103 (step S1723).

Upon receipt of the job termination notification, the MFP operation management section 1603 updates the operating authority storage section 1604 (step S1724). More specifically, the MFP operation management section 1603 deletes the serial number of the voice control device 107, which has been recorded in the operating authority storage section 1604. Then, the MFP operation management section 1603 notifies the device operation reception section 1601 that the print job executed by the image forming apparatus 101 has been terminated (step S1725). The cloud server 103 generates voice synthesized data for reproducing voice to the effect that the print job by the image forming apparatus 101 has been terminated and transmits the generated voice synthesized data to the voice control device 107 (step S1726).

After that, the voice control device 102 transmits a job request for the image forming apparatus 110 to the cloud server 103 (step S1727). In the cloud server 103, a print job command is generated based on the received job request, and the device operation reception section 1601 of the device operating authority management section 704 receives the generated print job command.

Then, the device operation reception section 1601 analyzes the received print job command and outputs the print job command to the MFP operation management section 1606 that manages the operation of the image forming apparatus 110 (step S1728).

The MFP operation management section 1606 checks an operating authority storage section 1607 of the MFP operation management section 1606 (step S1729). For example, in a case where a serial number of another voice control device different from the voice control device 102 has been recorded in the operating authority storage section 1607, the MFP operation management section 1606 checks a voice control device priority list 1608 of the MFP operation management section 1606 (step S1730). The MFP operation management section 1606 compares the priority of the voice control device associated with the serial number recorded in the operating authority storage section 1607 and the priority of the voice control device 102 having transmitted the job request in the step S1727. As a result of the comparison, in a case where the priority of the voice control device 102 is higher, the MFP operation management section 1606 rewrites the serial number recorded in the operating authority storage section 1607 with the serial number of the voice control device 102. Then, the MFP operation management section 1606 transmits the print job command to the image forming apparatus 110 (step S1731).

The image forming apparatus 110 starts a print job based on the received print job command (step S1732). Then, the image forming apparatus 110 notifies the cloud server 103 of a job start response indicating that the image forming apparatus 110 has started the print job associated with the received print job command (step S1733).

Upon receipt of the job start response, the MFP operation management section 1606 notifies the device operation reception section 1601 of this fact (step S1734). Then, the cloud server 103 generates voice synthesized data for reproducing voice to the effect that the print job has been started and transmits the generated voice synthesized data to the voice control device 102 (step S1735).

On the other hand, when the print job started in the step S1732 is terminated, the image forming apparatus 110 transmits a job termination notification to the cloud server 103 (step S1736).

Upon receipt of the job termination notification, the MFP operation management section 1606 updates the operating authority storage section 1607 (step S1737). More specifically, the MFP operation management section 1606 deletes the serial number of the voice control device 102, which has been recorded in the operating authority storage section 1607. Then, the MFP operation management section 1606 notifies the device operation reception section 1601 that the print job executed by the image forming apparatus 110 has been terminated (step S1738). The cloud server 103 generates voice synthesized data for reproducing voice to the effect that the print job by the image forming apparatus 110 has been terminated and transmits the generated voice synthesized data to the voice control device 102 (step S1739), followed by terminating the present process.

Next, the configurations of the operating authority storage section 1604 and the operating authority storage section 1607 will be described in detail. Note that in the present embodiment, the configuration of the operating authority storage section 1604 and the configuration of the operating authority storage section 1607 are the same, and hence, the following description will be given of the configuration of the operating authority storage section 1604, by way of example.

Figures 18A, 18B:
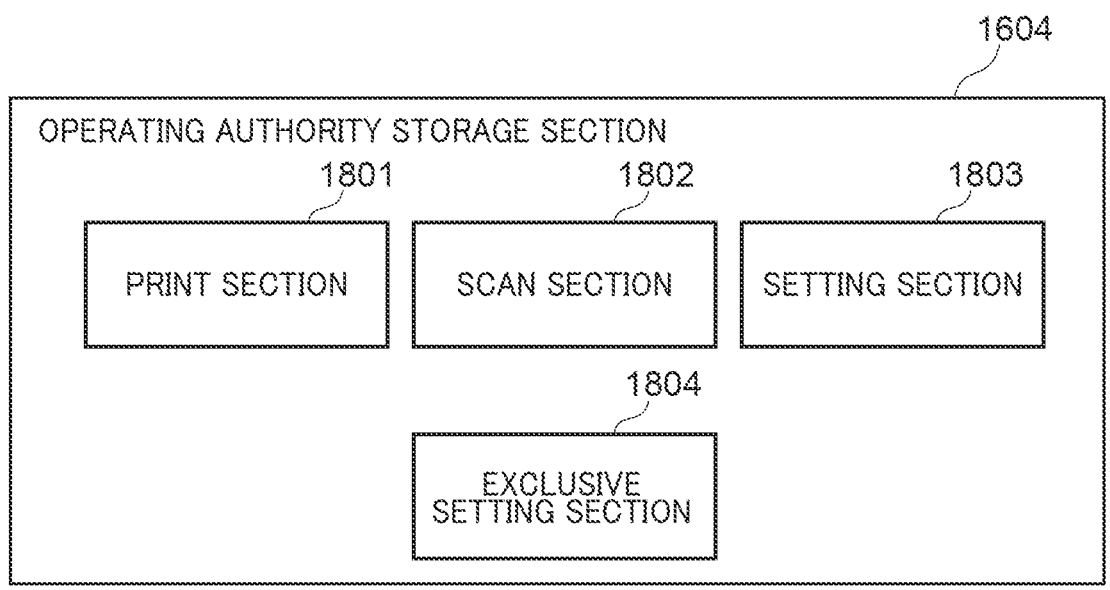
FIGS. 18A and 18B are diagrams useful in explaining a configuration of an operating authority storage section appearing in FIG. 16.

FIGS. 18A and 18B are diagrams useful in explaining the configuration of the operating authority storage section 1604 appearing in FIG. 16. FIG. 18A is a schematic block diagram of the operating authority storage section 1604. FIG. 18B is a table showing operable states of the operating authority storage section 1604.

Referring to FIG. 18A, the operating authority storage section 1604 includes a print section 1801, a scan section 1802, a setting section 1803, and an exclusive setting section 1804.

In a case where the cloud server 103 receives a job request for causing the image forming apparatus 101 to execute a print job from the voice control device 102 or the voice control device 107, the flag of the print section 1801 is changed to indicate that the print section 1801 is in-use. Further, the serial number of the voice control device which is the transmission source of the job request is recorded in the operating authority storage section 1604.

In a case where the cloud server 103 receives a job request for causing the image forming apparatus 101 to execute a scan job from the voice control device 102 or the voice control device 107, the flag of the scan section 1802 is changed to indicate that the scan section 1802 is in-use. Further, the serial number of the voice control device which is the transmission source of the job request is recorded in the operating authority storage section 1604.

In a case where the cloud server 103 receives a job request for causing the image forming apparatus 101 to execute a copy job from the voice control device 102 or the voice control device 107, the flags of the print section 1801 and the scan section 1802 are both changed to indicate that the print section 1801 and the scan section 1802 are in-use, respectively. Further, the serial number of the voice control device which is the transmission source of the job request is recorded in the operating authority storage section 1604.

In a case where the cloud server 103 receives a device status check request for checking the toner remaining amount, the setting of the image forming apparatus 101, or the like, from the voice control device 102 or the voice control device 107, the flag of the setting section 1803 is changed to indicate that the setting section 1803 is in-use. At this time, the serial number of the voice control device which is the transmission source of the device status check request is not recorded in the operating authority storage section 1604.

To the exclusive setting section 1804, an exclusive level of the image forming apparatus 101 is set. In the present embodiment, as the exclusive level, one of an exclusive level 1, an exclusive level 2, and an exclusive level 3 is set. Note that the setting of the exclusive level may be set by a user who logs in the cloud server 103, or a user may set the exclusive level using a PC or a mobile terminal.

The exclusive level 1 is a setting of the lowest exclusive level. In a case where the exclusive level 1 is set for the exclusive setting section 1804, it is possible to cause the image forming apparatus 101 to execute a specified job set in advance in parallel. The image forming apparatus 101 can execute checking of the device status or a scan job, instructed by a voice operation given to the voice control device 102, while e.g. a print job instructed by a voice operation given to the voice control device 107 is being executed (see e.g. reference numeral 1805 in FIG. 18B). Note that the copy job cannot be executed in parallel with a print job or a scan job because both of the scanner 213 and the print engine 211 of the image forming apparatus 101 are used.

The exclusive level 2 is a setting of higher exclusive level than the exclusive level 1. In a case where the exclusive level 2 is set for the exclusive setting section 1804, even when a job request is received from a voice control device lower in priority than one voice control device while a job instructed by a voice operation given to the one voice control device is being executed, the job associated with the received job request is not executed (see e.g. reference numeral 1806 in FIG. 18B). However, in a case where a device status check request is received from a voice control device lower in priority than the one voice control device while a job instructed by a voice operation given to the one voice control device is being executed, processing associated with the received device status check request is executed.

The exclusive level 3 is a setting of the highest exclusive level. In a case where the exclusive level 3 is set for the exclusive setting section 1804, even when a job request is received from another voice control device while a job instructed by a voice operation given to the one voice control device is being executed, a job associated with the received job request is not executed (see e.g. reference numeral 1807 in FIG. 18B).

Next, a description will be given of an information processing system according to a second embodiment of the present invention and a method of controlling the same. The second embodiment is basically the same in configuration and action as the above-described first embodiment, but differs from the first embodiment in that a job associated with a voice instruction received by a voice control device which is set as the priority device, out of the voice control device 102 and the voice control device 107, is preferentially executed. Therefore, redundant description of the configuration and action is omitted, and the following description will be given of different points in the configuration and action.

Figure 19:
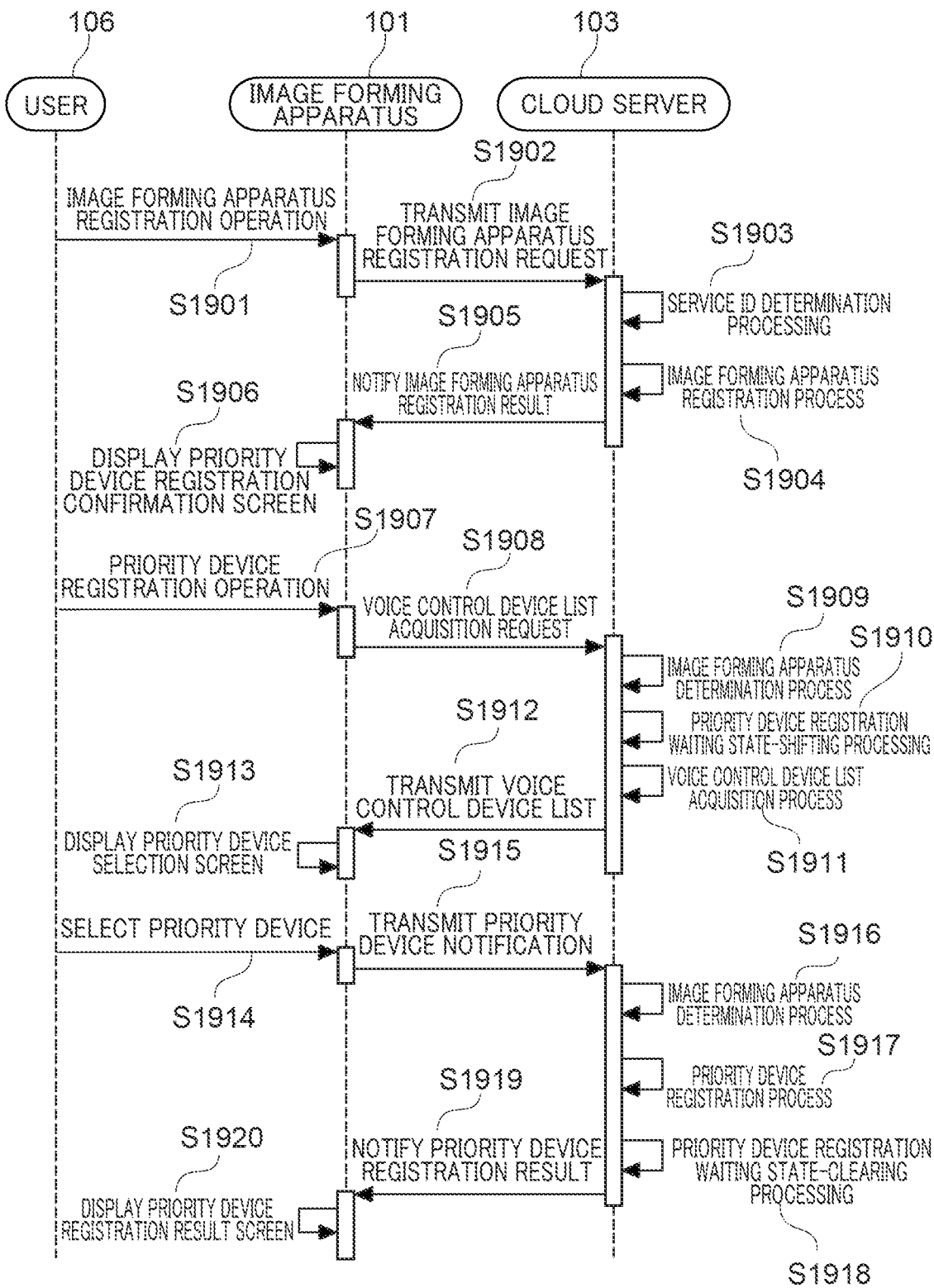
FIG. 19 is a sequence diagram showing a first example of registration of an image forming apparatus for the information processing system according to a second embodiment.

FIG. 19 is a sequence diagram showing a first example of registration of an image forming apparatus in the information processing system 100 according to the second embodiment. In FIG. 19, a case where the user 106 instructs registration of the image forming apparatus 101 will be described by way of example. Note that also in FIG. 19, it is assumed that the user 106 has registered the above-mentioned user information via the application provided by the service corresponding to the service URL "http://service1.com" managed by the cloud server 103, the WebAPI, and so forth, in advance. Further, it is assumed that a voice control service-setting screen 2001 appearing in FIG. 20 for registering an image forming apparatus is displayed on the console panel 209 of the image forming apparatus 101.

Referring to FIG. 19, first, the user 106 performs an operation for registering the image forming apparatus 101 (step S1901). More specifically, the user 106 inputs the service URL, the service ID "user1@aaa.com", and the password "aaaa" on the voice control service-setting screen 2001 displayed on the console panel 209 of the image forming apparatus 101 and presses a registration button 2002.

Then, the CPU 202 of the image forming apparatus 101 transmits a request for registering the image forming apparatus 101 to the cloud server 103 via the network interface 206 (step S1902). The image forming apparatus registration request includes the service ID "user1@aaa.com" and the password "aaaa", which have been input in the step S1901.

Further, the image forming apparatus registration request also includes "mfp_serial111" which is the serial number of the image forming apparatus 101 and a nickname of a null character. Further, the image forming apparatus registration request includes the IP address of the image forming apparatus 101, such as "xxx.xxx.xxx.xxx", which is stored in the RAM 203 of the image forming apparatus 101.

The CPU 402 of the cloud server 103 performs processing for determining the service ID included in the received registration request command (step S1903). More specifically, the CPU 402 stores the information included in the received registration request command in the RAM 403 as service information. Further, the CPU 402 determines whether or not the service ID and the password, which are included in the received registration request command, match the user information registered in advance. If the above-mentioned service ID and password, which are included in the received registration request command, match the user information registered in advance, the CPU 402 performs an image forming apparatus registration process, described hereinafter with reference to FIG. 21 (step S1904). When the image forming apparatus registration process is completed, the CPU 402 deletes the service information stored in the RAM 402 in the step S1903. Then, the CPU 402 notifies the image forming apparatus 101 of a registration result indicating "registration completion" via the network interface 406 (step S1905).

Figure 20:
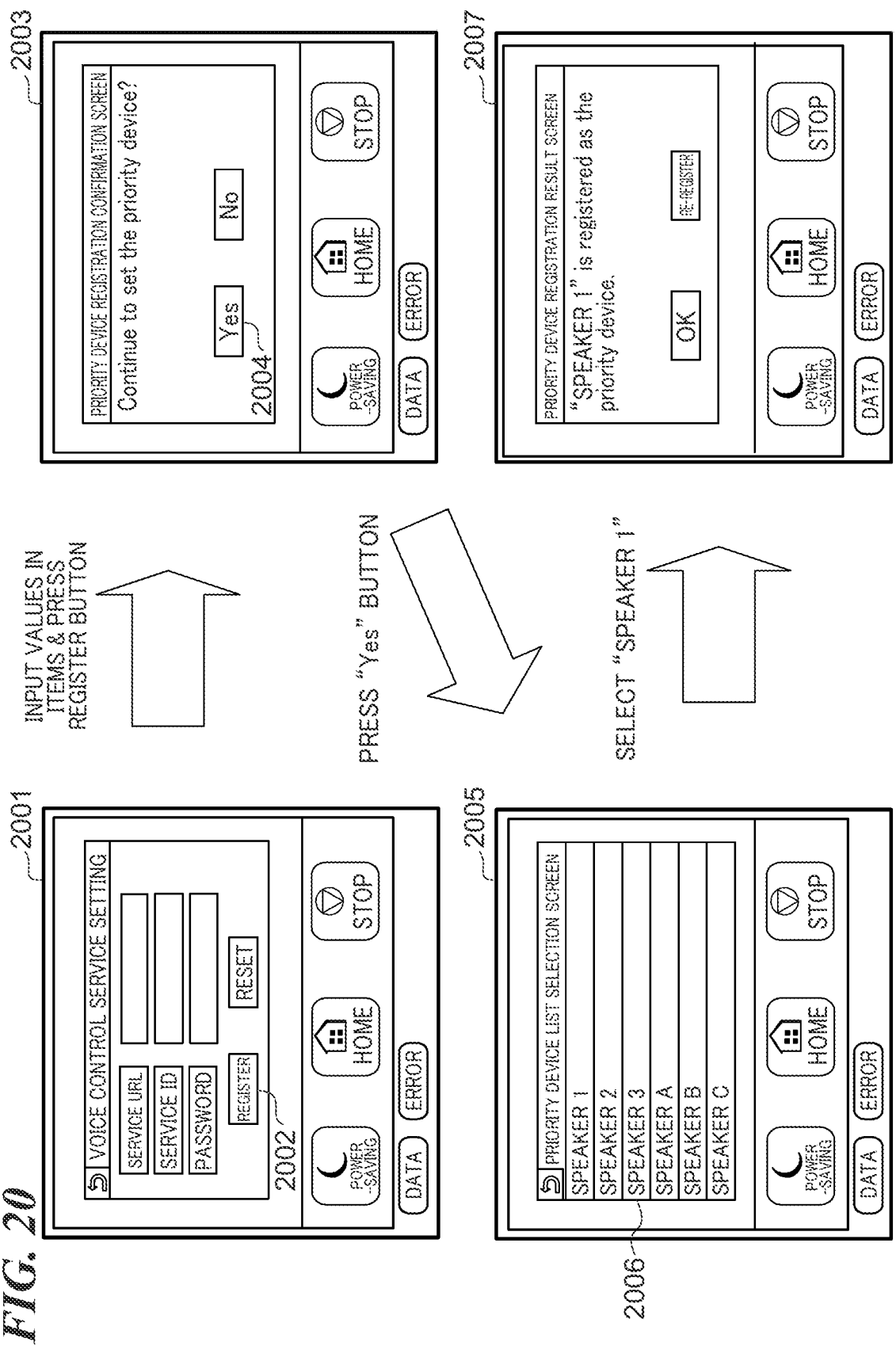
FIG. 20 is a diagram showing changes in a screen occurring when setting a priority image forming apparatus for the information processing system according to the second embodiment.

The CPU 202 of the image forming apparatus 101 having received this notification displays a priority device registration confirmation screen 2003 appearing in FIG. 20 on the console panel 209 (step S1906).

Then, the user 106 performs an operation for registering a priority device (step S1907). More specifically, the user 106 presses an Yes button 2004 on the priority device registration confirmation screen 2003.

When the operation for registering a priority device is performed, the CPU 202 of the image forming apparatus 101 transmits a voice control device list acquisition request to the cloud server 103 via the network interface 206 (step S1908). The voice control device list acquisition request includes the serial number of the image forming apparatus 101, and the service ID and the password, which have been input in the step S1901.

The CPU 402 of the cloud server 103 stores the service ID and the serial number of the image forming apparatus 101, which are included in the received voice control device list acquisition request, in the RAM 403 as image forming apparatus information, and performs an image forming apparatus determination process, described hereinafter with reference to FIG. 24 (step S1909). Then, the CPU 402 executes priority device registration waiting state-shifting processing (step S1910). In the priority device registration waiting state-shifting processing, the CPU 402 stores flag data "registration waiting: TRUE" indicating the priority device registration waiting state and the serial number of the image forming apparatus 101 in the RAM 403 as priority device registration waiting state data.

Then, the CPU 402 executes a voice control device list acquisition process, described hereinafter with reference to FIG. 25 (step S1911), and acquires the voice control device list including the serial numbers of all voice control devices associated with the service ID included in the above-mentioned voice control device list acquisition request. The CPU 402 stores the acquired voice control device list in the RAM 403. Then, the CPU 402 transmits the voice control device list stored in the RAM 403 to the image forming apparatus 101 via the network interface 406 (step S1912).

The CPU 202 of the image forming apparatus 101 having received the voice control device list displays a priority device selection screen 2005 appearing in FIG. 20 on the console panel 209 (step S1913). The user 106 selects a serial number of a voice control device which is desired to be set as the priority device from a priority device list 2006 on the priority device selection screen 2005 (step S1914). The CPU 202 of the image forming apparatus 101 transmits a priority device notification to the cloud server 103 via the network interface 206 (step S1915). The priority device notification includes the service ID and the password, which have been input in the step S1901, the serial number of the voice control device selected by the user 106 in the step S1914, and the serial number of the image forming apparatus 101.

The CPU 402 of the cloud server 103 stores the service ID and the password, which are included in the received priority device notification, in the RAM 403 as the image forming apparatus information and executes the image forming apparatus determination process, described hereinafter with reference to FIG. 24 (step S1916). Then, the CPU 402 stores the serial number of the voice control device, the serial number of the image forming apparatus 101, and the service ID, which are included in the received priority device notification, in the RAM 403, as the priority device setting information, and executes a priority device registration process, described hereinafter with reference to FIG. 27 (step S1917). With this, a voice control device that is to be coordinated with the image forming apparatus 101 and be set as the priority device for the image forming apparatus 101 is set, out of the plurality of voice control devices associated with the above-mentioned service ID. Then, the CPU 402 performs priority device registration waiting state-clearing processing (step S1918). In the priority device registration waiting state-clearing processing, the CPU 402 deletes the priority device registration waiting state data stored in the RAM 403 in the step S1910 and the image forming apparatus information stored in the RAM 403 in the step S1916. Then, the CPU 402 transmits "registration completion" to the image forming apparatus 101 via the network interface 406, as a priority device registration result obtained by the priority device registration process executed in the step S1917 (step S1919).

Upon receipt of the priority device registration result from the cloud server 103, the CPU 202 of the image forming apparatus 101 displays a priority device registration result screen 2007 appearing in FIG. 20 on the console panel 209 (step S1920), followed by terminating the present process.

Figure 21:
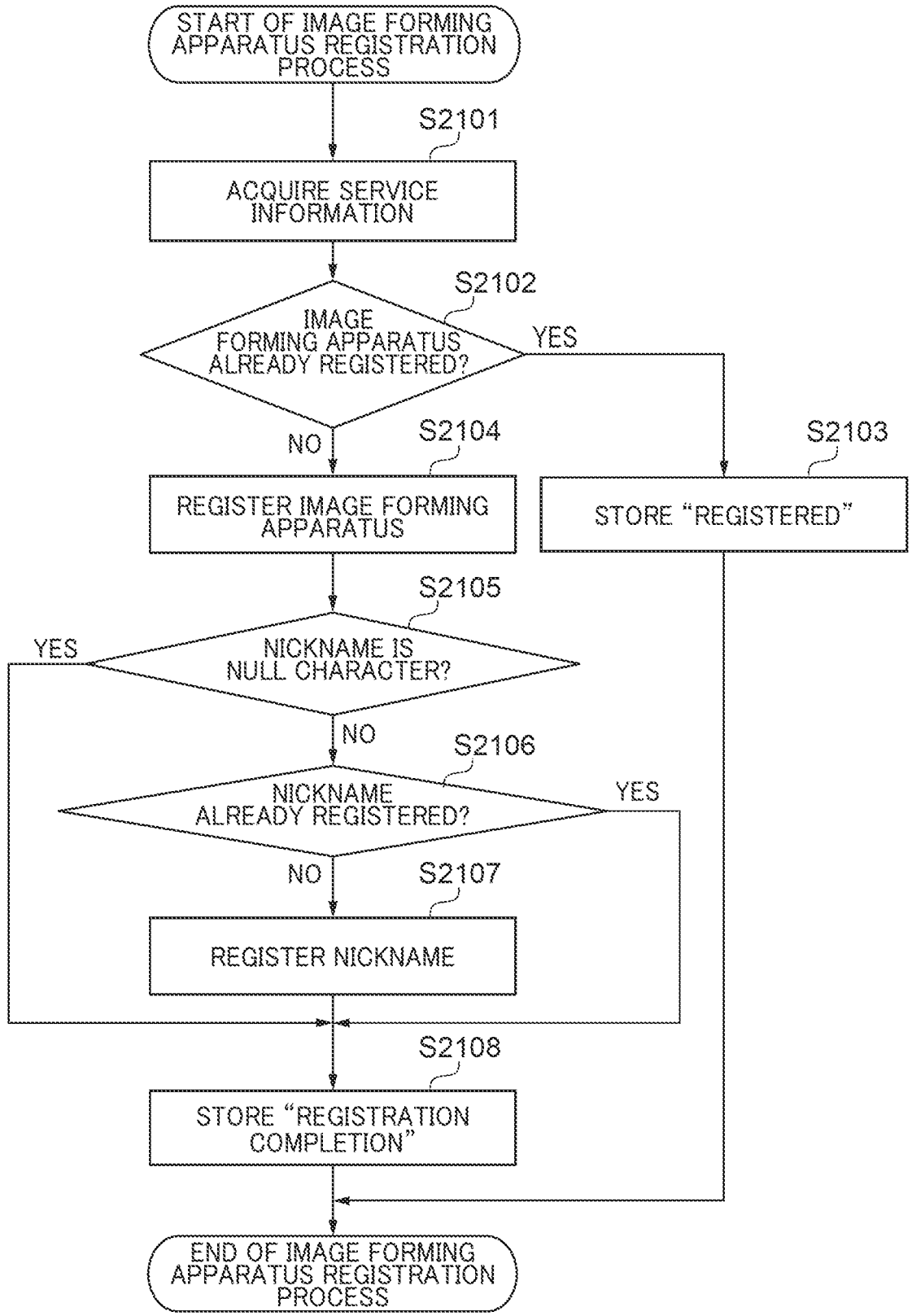
FIG. 21 is a flowchart of an image forming apparatus registration process in a step in FIG. 19.

FIG. 21 is a flowchart of the image forming apparatus registration process in the step S1904 in FIG. 19. The image forming apparatus registration process in FIG. 21 is realized by the CPU 402 of the cloud server 103, which executes an associated program stored in the ROM 404 or the storage 405.

Referring to FIG. 21, the CPU 402 acquires the service information stored in the RAM 403 (step S2101). This service information includes the service ID, the password, the serial number of the image forming apparatus 101, the nickname, and the IP address of the image forming apparatus 101, which are included in the image forming apparatus registration request transmitted from the image forming apparatus 101 in the step S1902. Then, the CPU 402 determines whether or not the image forming apparatus 101 corresponding to the acquired service information has already been registered (step S2102). More specifically, the CPU 402 determines whether or not the information of a combination of the service ID and the serial number of the image forming apparatus 101, which are included in the acquired service information, has been set in the image forming apparatus service data list shown in FIG. 22. In this image forming apparatus service data list, the service ID, the serial number, and the IP address of the registered image forming apparatus, and the serial number of the voice control device registered as the priority device for the image forming apparatus are set. In a case where the information of the combination of the service ID and the serial number of the image forming apparatus 101, which are included in the acquired service information, has not been set in the image forming apparatus service data list, the CPU 402 determines that the image forming apparatus 101 has not been registered. In a case where the information of the combination of the service ID and the serial number of the image forming apparatus 101, which are included in the acquired service information, has been set in the image forming apparatus service data list, the CPU 402 determines that the image forming apparatus 101 has already been registered.

If it is determined in the step S2102 that the image forming apparatus 101 has already been registered, the CPU 402 stores "registered" in the RAM 403 as a registration result (step S2103), followed by terminating the present process.

If it is determined in the step S2102 that the image forming apparatus 101 has not been registered, the CPU 402 registers the image forming apparatus 101 (step S2104). More specifically, the CPU 402 adds the image forming apparatus service data formed by a set of the service ID, and the serial number and the IP address of the image forming apparatus 101, which are included in the service information acquired in the step S2101, to the end of the image forming apparatus service data list. Then, the CPU 402 determines whether or not the nickname included in the acquired service information is a null character (step S2105).

If it is determined in the step S2105 that the nickname included in the acquired service information is a null character, the image forming apparatus registration process proceeds to a step S2108, described hereinafter. If it is determined in the step S2105 that the nickname included in the acquired service information is not a null character, the CPU 402 determines whether or not the nickname included in the acquired service information has already been registered (step S2106). More specifically, the CPU 402 determines whether or not the information of the combination of the service ID, the serial number of the image forming apparatus 101, and the nickname, which are included in the acquired service information, has been set in the nickname data list shown in FIG. 23. In this nickname data list, the service ID, the serial number, and the nickname of the registered image forming apparatus are set. In a case where the information of the combination of the service ID, the serial number of the image forming apparatus 101, and the nickname, which are included in the acquired service information, has not been set in the nickname data list, the CPU 402 determines that the nickname included in the acquired service information has not been registered. In a case where the information of the combination of the service ID, the serial number of the image forming apparatus 101, and the nickname, which are included in the acquired service information, has been set in the nickname data list, the CPU 402 determines that the nickname included in the acquired service information has already been registered.

If it is determined in the step S2106 that the nickname included in the acquired service information has already been registered, the image forming apparatus registration process proceeds to the step S2108, described hereinafter. If it is determined in the step S2106 that the nickname included in the acquired service information has not been registered, the CPU 402 registers this nickname (step S2107). More specifically, the CPU 402 adds nickname data formed by a set of the service ID and the serial number of the image forming apparatus 101, and the nickname, which are included in the acquired service information, to the end of the nickname data list. Then, the CPU 402 stores "registration completion" in the RAM 403 as a registration result (step S2108), followed by terminating the present process.

Figure 24:
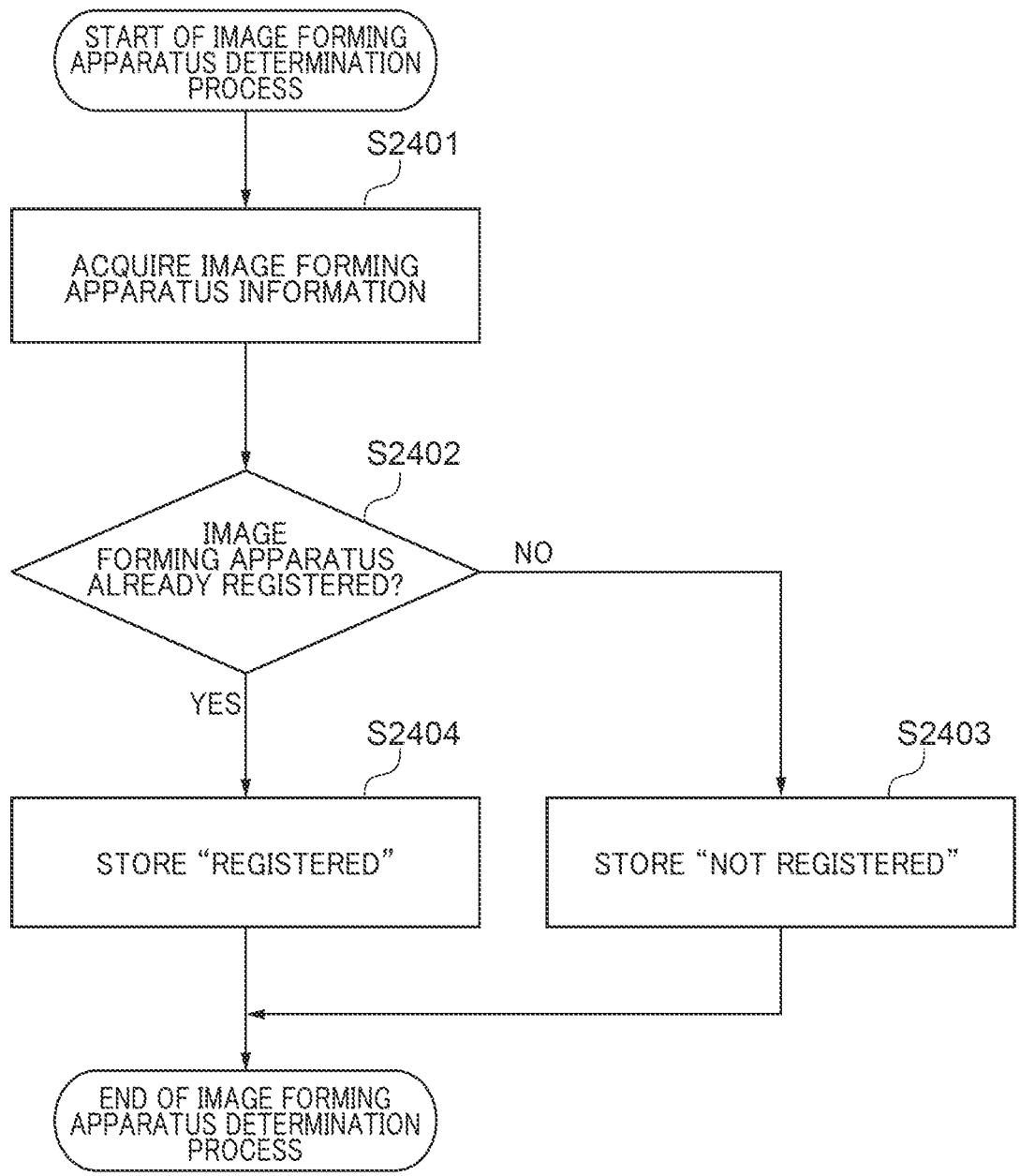
FIG. 24 is a flowchart of an image forming apparatus determination process in each of steps in FIG. 19.

FIG. 24 is a flowchart of the image forming apparatus determination process in the steps S1909 and S1916 in FIG. 19. The image forming apparatus determination process in FIG. 24 is also realized by the CPU 402 of the cloud server 103, which executes an associated program stored in the ROM 404 or the storage 405.

Referring to FIG. 24, the CPU 402 acquires the image forming apparatus information stored in the RAM 403 (step S2401). This image forming apparatus information includes the service ID and the serial number of the image forming apparatus 101, which have been received from the image forming apparatus 101. Then, the CPU 402 determines whether or not the image forming apparatus 101 has already been registered (step S2402). More specifically, the CPU 402 determines whether or not the information of the combination of the service ID and the serial number of the image forming apparatus 101, which are included in the acquired image forming apparatus information, has been set in the image forming apparatus service data list. In a case where the information of the combination of the service ID and the serial number of the image forming apparatus 101, which are included in the acquired image forming apparatus information, has not been set in the image forming apparatus service data list, the CPU 402 determines that the image forming apparatus 101 has not been registered. In a case where the information of the combination of the service ID and the serial number of the image forming apparatus 101, which are included in the acquired image forming apparatus information, has been set in the image forming apparatus service data list, the CPU 402 determines that the image forming apparatus 101 has already been registered.

If it is determined in the step S2402 that the image forming apparatus 101 has not been registered, the CPU 402 stores "not registered" in the RAM 403 as an image forming apparatus determination result (step S2403), followed by terminating the present process. If it is determined in the step S2402 that the image forming apparatus 101 has already been registered, the CPU 402 stores "registered" in the RAM 403 as the image forming apparatus determination result (step S2404), followed by terminating the present process.

Figure 25:
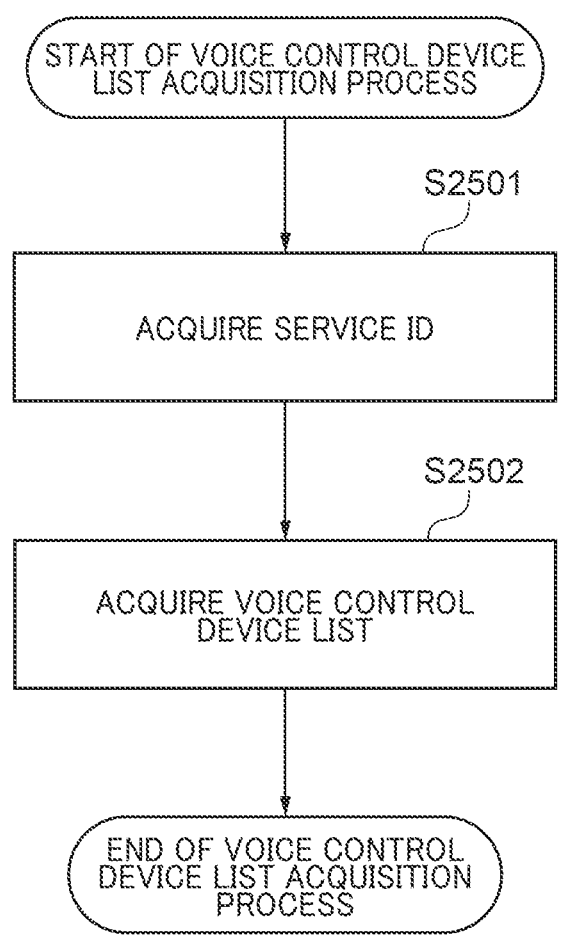
FIG. 25 is a flowchart of a voice control device list acquisition process in a step in FIG. 19.

FIG. 25 is a flowchart of the voice control device list acquisition process in the step S1911 in FIG. 19. The voice control device list acquisition process in FIG. 25 is also realized by the CPU 402 of the cloud server 103, which executes an associated program stored in the ROM 404 or the storage 405.

Referring to FIG. 25, the CPU 402 acquires the service ID from the image forming apparatus information stored in the RAM 403 (step S2501). Then, the CPU 402 acquires the voice control device list based on a voice control device service data list shown in FIG. 26 (step S2502). In the voice control device service data list, the serial numbers and the IP addresses of all voice control devices registered by the registration process shown in FIG. 9 are set. In the step S2502, the CPU 402 identifies the serial numbers of all voice control devices associated with the service ID acquired in the step S2501 and acquires the voice control device list including all identified serial numbers. For example, in a case where the service ID is "user1@aaa.com", the voice control device list has the contents, such as {Speaker 1, Speaker 2, Speaker 3, Speaker A, Speaker B, Speaker C}. The voice control device list is stored in the RAM 403. After that, the voice control device list acquisition process is terminated.

FIG. 27 is a flowchart of the priority device registration process in the step S1917 in FIG. 19. The priority device registration process in FIG. 27 is also realized by the CPU 402 of the cloud server 103, which executes an associated program stored in the ROM 404 or the storage 405.

Referring to FIG. 27, the CPU 402 determines whether or not the present status is a priority device setting registration-waiting state (step S2701). In the step S2701, for example, in a case where flag data indicating the priority device registration-waiting state, which is included in the priority device registration-waiting state data stored in the RAM 403, is "TRUE", the CPU 402 determines that the present status is the priority device setting registration-waiting state. On the other hand, in a case where the above-mentioned flag data is not "TRUE", the CPU 402 determines that the present status is not the priority device setting registration waiting state.

If it is determined in the step S2701 that the present status is not the priority device setting registration-waiting state, the CPU 402 stores "non-registration waiting state" in the RAM 403 as a priority device registration result (step S2702), followed by terminating the present process. If it is determined in the step S2701 that the present status is the priority device setting registration-waiting state, the CPU 402 acquires priority device setting information stored in the RAM 403 (step S2703). This priority device setting information includes the service ID input in the step S1901 as described above, the serial number of the voice control device selected by the user 106 in the step S1914, and the serial number of the image forming apparatus 101. Then, the CPU 402 determines whether or not the image forming apparatus 101 has already been registered (step S2704). For example, in a case where the information of the combination of the serial number of the image forming apparatus 101 and the service ID, which are included in the acquired priority device setting information, has been set in the above-mentioned image forming apparatus service data list, the CPU 402 determines that the image forming apparatus 101 has already been registered. On the other hand, in a case where the above-mentioned combination information has not been set in the above-mentioned image forming apparatus service data list, the CPU 402 determines that the image forming apparatus 101 has not been registered.

If it is determined in the step S2704 that the image forming apparatus 101 has not been registered, the CPU 402 stores "image forming apparatus not registered" in the RAM 403 as the priority device registration result (step S2705), followed by terminating the present process.

If it is determined in the step S2704 that the image forming apparatus 101 has already been registered, the CPU 402 determines whether or not the voice control device selected by the user has already been registered (step S2706). For example, in a case where the information of the combination of the serial number of the voice control device and the service ID included in the acquired priority device setting information has been set in the above-mentioned voice control device service data list, the CPU 402 determines that the voice control device selected by the user has already been registered. On the other hand, in a case where the information of the combination of the serial number of the voice control device and the service ID included in the acquired priority device setting information has not been set in the above-mentioned voice control device service data list, the CPU 402 determines that the voice control device selected by the user has not been registered.

If it is determined in the step S2706 that the voice control device selected by the user has not been registered, the CPU 402 stores "voice control device not registered" in the RAM 403 as the priority device registration result (step S2707), followed by terminating the present process. If it is determined in the step S2706 that the voice control device selected by the user has already been registered, the CPU 402 determines whether or not the priority device for the image forming apparatus 101 has already been registered (step S2708). More specifically, the CPU 402 acquires data associated with the serial number of the image forming apparatus 101 and the service ID, which are included in the acquired priority device setting information, from the image forming apparatus service data list. In a case where the priority setting of the acquired data has not been set, the CPU 402 determines that the priority device for the image forming apparatus 101 has not been registered. On the other hand, in a case where the priority setting of the acquired data has already been set, i.e. one of the voice control device has been set in the priority setting of the data, the CPU 402 determines that the priority device for the image forming apparatus 101 has already been registered.

If it is determined in the step S2708 that the priority device for the image forming apparatus 101 has already been registered, the CPU 402 stores "priority setting registered" in the RAM 403 as the priority device registration result (step S2709), followed by terminating the present process. If it is determined in the step S2708 that the priority device for the image forming apparatus 101 has not been registered, the CPU 402 registers the priority device for the image forming apparatus 101 (step S2710). More specifically, the CPU 402 identifies from the image forming apparatus service data list, data matching the serial number of the image forming apparatus 101 and the service ID included in the acquired priority device setting information, and sets the serial number of the voice control device included in the priority device setting information acquired in the step S2703 in the priority setting of the identified data. Then, the CPU 402 stores "registration completion" in the RAM 403 as the priority device registration result (step S2711), followed by terminating the present process.

Figure 28B:
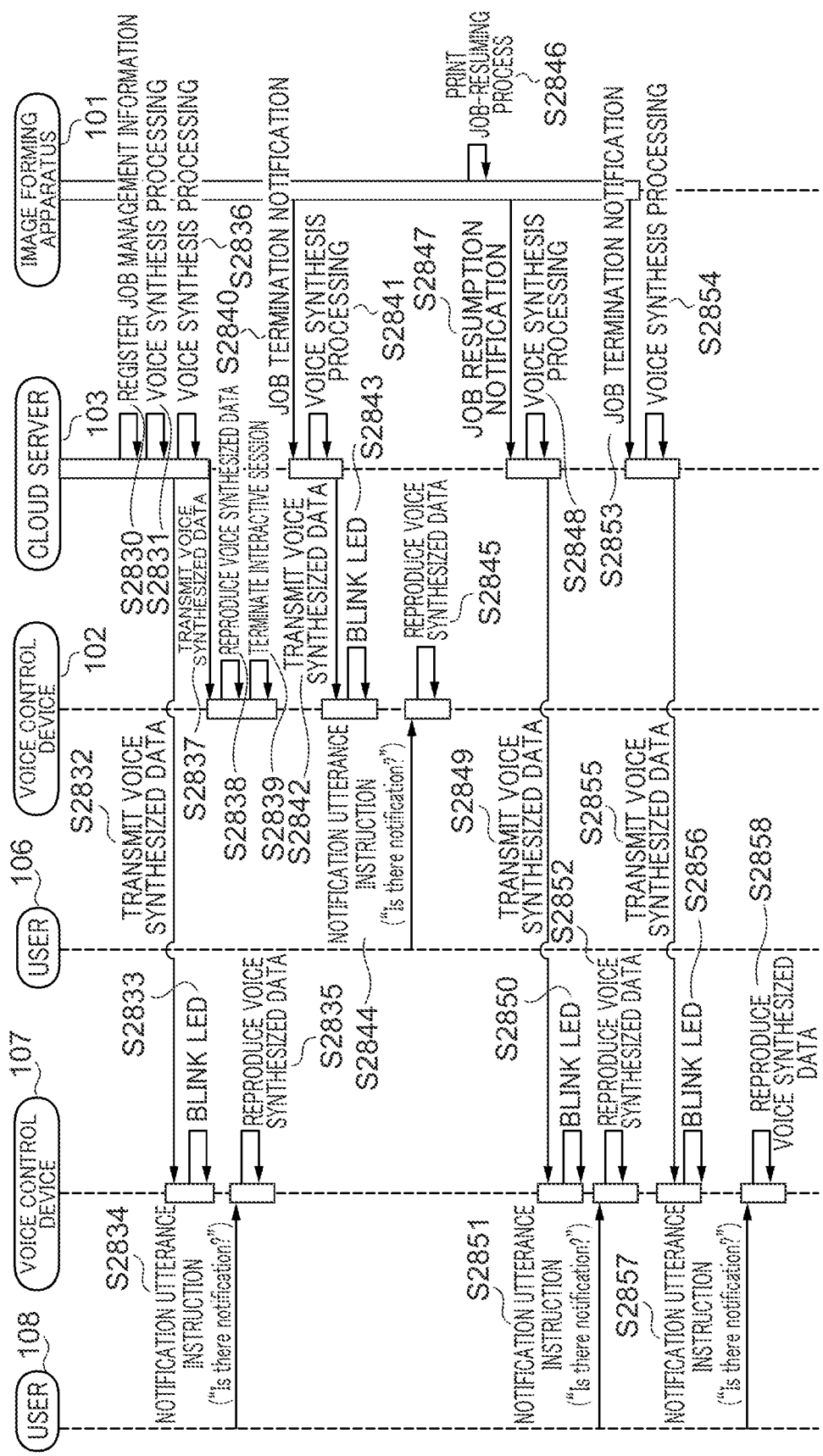

FIGS. 28A and 28B are a sequence diagram showing a first example of the voice operation control performed by the information processing system 100 according to the second embodiment. The voice operation control in FIGS. 28A and 28B is basically the same as the voice operation control in FIGS. 10A and 10B, and the following description will be given of different points from the voice operation control in FIGS. 10A and 10B. In FIGS. 28A and 28B, a case will be described, by way of example, where job requests are transmitted from the voice control device 107 and the voice control device 102 in the mentioned order. Also in the voice operation control in FIGS. 28A and 28B, it is assumed that the user 106 has registered the above-mentioned user information via the application provided by the service corresponding to the service URL "http://service1.com" managed by the cloud server 103, the WebAPI, and so forth, in advance. Further, it is assumed that the voice control device 107 and the voice control device 102 have already been registered by the registration process in FIG. 9 and the image forming apparatus 101 has already been registered by the registration process in FIG. 19, and the voice control device 102 has already been registered as the priority device for the image forming apparatus 101. Note that also in the voice operation control in FIGS. 28A and 28B, the voice control device 102, the image forming apparatus 101, and the cloud server 103 are in a state communicable with one another. Further, the image forming apparatus 101 is in a state capable of calling copy, scan, print, and the like functions, after started up by powering-on.

Referring to FIGS. 28A and 28B, steps S2801 to S2808 which are the same as the above-described steps S1001 to S1008 are executed. With these steps, the cloud server 103 performs the voice recognition processing, the morpheme analysis processing, and the group ID determination processing based on the job request received from the voice control device 107.

Then, the CPU 402 of the cloud server 103 stores the serial number of the voice control device 107 included in the job request transmitted from the voice control device 107 in the step S2805, in the RAM 403, as the voice control device information. Then, the CPU 402 executes a print job command generation process, described hereinafter with reference to FIG. 31 (step S2809). Here, the voice control device 107 is not the priority device for the image forming apparatus 101, and hence in the step S2809, a normal print job command shown in FIG. 29, in which "low" is set as the priority, is generated. Then, the CPU 402 transmits the normal print job command to the image forming apparatus 101 via the network interface 406 (step S2810).

The CPU 202 of the image forming apparatus 101 stores the received normal print job command in the RAM 203. Then, the CPU 202 executes a print job execution process, described hereinafter with reference to FIG. 35 (step S2811) and starts a print job based on the normal print job command. The CPU 202 stores job data having a job ID of "1" indicating this print job and "job started" indicating the job status in the RAM 203, as a print job execution result. Then, the CPU 202 transmits a job start response to the cloud server 103 via the network interface 206 (step S2812). This job start response includes the job ID of "1" stored in the RAM 203 and "in-execution" indicating the job status.

Upon receipt of the job start response, the CPU 402 of the cloud server 103 registers job management information (step S2813). In the step S2813, the CPU 402 adds the job management information to the end of a job management information list stored in the RAM 403. The job management information includes the serial number of the voice control device 107, the serial number of the image forming apparatus 101, the job ID of "1", and "in-execution" indicating the job status. Then, the CPU 402 performs the voice synthesis processing (step S2814). In the step S2814, voice synthesized data of voice, for example, "Print job has been started", is generated. The CPU 402 transmits the generated voice synthesized data to the voice control device 107 via the network interface 406 (step S2815).

The CPU 302' of the voice control device 107 reproduces the received voice synthesized data (step S2816). When this voice synthesized data is reproduced, the voice, for example, "Print job has been started", is output from the speaker 310'. Then, the CPU 302' performs the LED lighting control for indicating the speech processing state. More specifically, the CPU 302' causes the LED 312' to blink, via the display controller 311'. After that, the cloud server 103 performs the determination of termination of the interactive session, and upon receipt of the interactive session termination notification transmitted from the cloud server 103 based on a result of the determination, the CPU 302' terminates the interactive session (step S2817).

After that, steps S2818 to S2825 which are the same as the above-described steps S1018 to S1025 are executed. With these steps, the cloud server 103 performs the voice recognition processing, the morpheme analysis processing, and the group ID determination processing based on the job request received from the voice control device 102.

Then, the CPU 402 of the cloud server 103 stores the serial number of the voice control device 102, which is included in the job request transmitted from the voice control device 102 in the step S2822, in the RAM 403, as the voice control device information. Then, the CPU 402 executes the print job command generation process, described hereinafter with reference to FIG. 35 (step S2826). Here, the voice control device 102 is the priority device for the image forming apparatus 101, and hence in the step S2826, a high-priority print job command shown in FIG. 30, in which "high" is set as the priority, is generated. Then, the CPU 402 transmits the high-priority print job command to the image forming apparatus 101 via the network interface 406 (step S2827).

The CPU 202 of the image forming apparatus 101 stores the received high-priority print job command in the RAM 203. Then, the CPU 202 executes the print job execution process, described hereinafter with reference to FIG. 35 (step S2828). In the step S2828, the print job based on the normal print job command, which has been started in the step S2811, is stopped, and a print job based on the high-priority print job command is executed as an interrupt. The CPU 202 stores job data of a job ID of "2" indicating the print job based on the high-priority print job command and "interrupt started" indicating the job status, in the RAM 203, as a print job execution result. Then, the CPU 202 transmits a print job response to the cloud server 103 via the network interface 206 (step S2829). This print job response includes the job ID of "2" stored in the RAM 203 and "interrupt started" indicating the job status.

Upon receipt of the print job response, the CPU 402 of the cloud server 103 registers job management information (step S2830). More specifically, the CPU 402 searches the job management information list stored in the RAM 403 for job management information having the job status indicating "in-execution", and changes the job status of this job management information to "suspended". Further, the CPU 402 adds new job management information different from the above-mentioned job management information to the top of the job management information list. The new job management information includes the serial number of the voice control device 102, the serial number of the image forming apparatus 101, the job ID of "2", and "in-execution" indicating the job status. Then, the CPU 402 performs the voice synthesis processing (step S2831). In the step S2831, voice synthesized data of voice, for example, "Print job interrupt has occurred" is generated. Then, the CPU 402 identifies the voice control device having transmitted the job request of the interrupted job, from the job management information retrieved in the step S2830. The CPU 402 transmits the generated voice synthesized data to the identified voice control device, more specifically, to the voice control device 107 (step S2832).

Upon receipt of the voice synthesized data, the CPU 302' of the voice control device 107 sets a value indicating a notification received state, which is stored in the RAM 303', to "TRUE" and performs the LED lighting control for indicating the notification received state. More specifically, the CPU 302' causes the LED 312' to blink, via the display controller 311' (step S2833). The LED 312' blinks at predetermined intervals as long as the notification received state is "TRUE".

After that, when the user 108 utters "Any notification?" as a notification utterance instruction to the voice control device 107 (step S2834), the CPU 302' of the voice control device 107 reproduces the received voice synthesized data (step S2835). When this voice synthesized data is reproduced, the voice, for example, "Print job interrupt has occurred", is output from the speaker 310'. Further, the CPU 302' sets the value indicating the notification received state, which is stored in the RAM 303', to "FALSE".

On the other hand, after transmitting the voice synthesized data to the voice control device 107 in the step S2832, the CPU 402 of the cloud server 103 performs the voice synthesis processing (step S2836). In the step S2836, voice synthesized data of voice, for example, "Print job started", is generated. Then, the CPU 402 transmits the generated voice synthesized data to the voice control device 102 via the network interface 406 (step S2837).

The CPU 302 of the voice control device 102 reproduces the received voice synthesized data (step S2838). When this voice synthesized data is reproduced, the voice, for example, "Print job started", is output from the speaker 310. Then, the CPU 302 performs the LED lighting control for indicating the speech processing state. More specifically, the CPU 302 causes the LED 312 to blink, via the display controller 311. After that, the cloud server 103 performs the determination of termination of the interactive session, and upon receipt of the interactive session termination notification transmitted from the cloud server 103 based on a result of the determination, the CPU 302 terminates the interactive session (step S2839).

After that, when the print job based on the high-priority print job command, which has been started in the step S2828, is terminated, the CPU 202 of the image forming apparatus 101 transmits a job termination notification to the cloud server 103 via the network interface 206 (step S2840). This job termination notification includes the job ID of "2" indicating the terminated print job and "normally terminated" indicating the job status.

Upon receipt of the job termination notification, the CPU 402 of the cloud server 103 performs the voice synthesis processing (step S2841). In the step S2841, voice synthesized data of voice, for example, "Print job normally finished", is generated. Then, the CPU 402 searches the job management information list stored in the RAM 403 for job management information associated with the job ID of "2". The CPU 402 transmits the generated voice synthesized data to the voice control device 102 corresponding to the serial number of the voice control device in the retrieved job management information (step S2842). Further, the CPU 402 deletes the job management information of the job ID of "2" from the job management information list.

Upon receipt of the voice synthesized data, the CPU 302 of the voice control device 102 sets the value indicating the notification received state, which is stored in the RAM 303, to "TRUE" and performs the LED lighting control for indicating the notification received state. More specifically, the CPU 302 causes the LED 312 to blink, via the display controller 311 (step S2843). The LED 312 blinks at predetermined intervals as long as the notification received state is set to "TRUE".

After that, when the user 106 utters "Any notification?" as the notification utterance instruction to the voice control device 102 (step S2844), the CPU 302 of the voice control device 102 reproduces the received voice synthesized data (step S2845). When this voice synthesized data is reproduced, the voice, for example, "Print job normally finished", is output from the speaker 310. Further, the CPU 302 sets the value indicating the notification received state, which is stored in the RAM 303, to "FALSE".

On the other hand, when the print job based on the high-priority print job command, which has been started in the step S2828, is terminated, the CPU 202 of the image forming apparatus 101 executes a print job-resuming process, described hereinafter with reference to FIG. 36 (step S2846). With this, the print job based on the normal print job command suspended in the step S2828 is resumed. The CPU 202 stores the job ID of "1" indicating this print job and "job resumed" indicating the job status, in the RAM 203 as a result of the print job-resuming process. Then, the CPU 202 transmits a job resumption notification to the cloud server 103 via the network interface 206 (step S2847). The job resumption notification includes the job ID of "1" and "job resumed" indicating the job status.

Upon receipt of the job resumption notification, the CPU 402 of the cloud server 103 performs the voice synthesis processing (step S2848). In the step S2848, voice synthesized data of voice, for example, "Suspended print job resumed", is generated. Then, the CPU 402 searches the job management information list stored in the RAM 403 for job management information of the job ID of "1". The CPU 402 transmits the generated voice synthesized data to the voice control device 107 corresponding to the serial number of the voice control device in the retrieved job management information (step S2849).

Upon receipt of the voice synthesized data, the CPU 302' of the voice control device 107 sets the value indicating the notification received state, which is stored in the RAM 303', to "TRUE" and causes the LED 312' to blink, via the display controller 311' (step S2850).

After that, when the user 108 utters "Any notification?" as the notification utterance instruction to the voice control device 107 (step S2851), the CPU 302' of the voice control device 107 reproduces the received voice synthesized data (step S2852). When this voice synthesized data is reproduced, the voice, for example, "Suspended print job resumed", is output from the speaker 310'. Further, the CPU 302' sets the value indicating the notification received state, which is stored in the RAM 303', to "FALSE".

After that, when the print job resumed in the step S2846 is terminated, the CPU 202 of the image forming apparatus 101 transmits a job termination notification to the cloud server 103 via the network interface 406 (step S2853). This job termination notification includes the job ID of "1" indicating the terminated print job and "normally terminated" indicating the job status.

Upon receipt of the job termination notification, the CPU 402 of the cloud server 103 performs the voice synthesis processing (step S2854). In the step S2854, voice synthesized data of voice, for example, "Print job normally finished", is generated. Then, the CPU 402 searches the job management information list stored in the RAM 403 for job management information corresponding to the job ID of "1". The CPU 402 transmits the generated voice synthesized data to the voice control device 107 corresponding to the serial number of the voice control device in the retrieved job management information (step S2855). Further, the CPU 402 deletes the job management information of the job ID of "1" from the job management information list.

Upon receipt of the voice synthesized data, the CPU 302' of the voice control device 107 sets the value indicating the notification received state, which is stored in the RAM 303', to "TRUE" and causes the LED 312' to blink, via the display controller 311' (step S2856).

After that, when the user 108 utters "Any notification?" which is the notification utterance instruction to the voice control device 107 (step S2857), the CPU 302' of the voice control device 107 reproduces the received voice synthesized data (step S2858). When this voice synthesized data is reproduced, the voice, for example, "Print job normally finished", is output from the speaker 310'. Further, the CPU 302' sets the value indicating the notification received state, which is stored in the RAM 303', to "FALSE", followed by terminating the present process.

Figure 31:
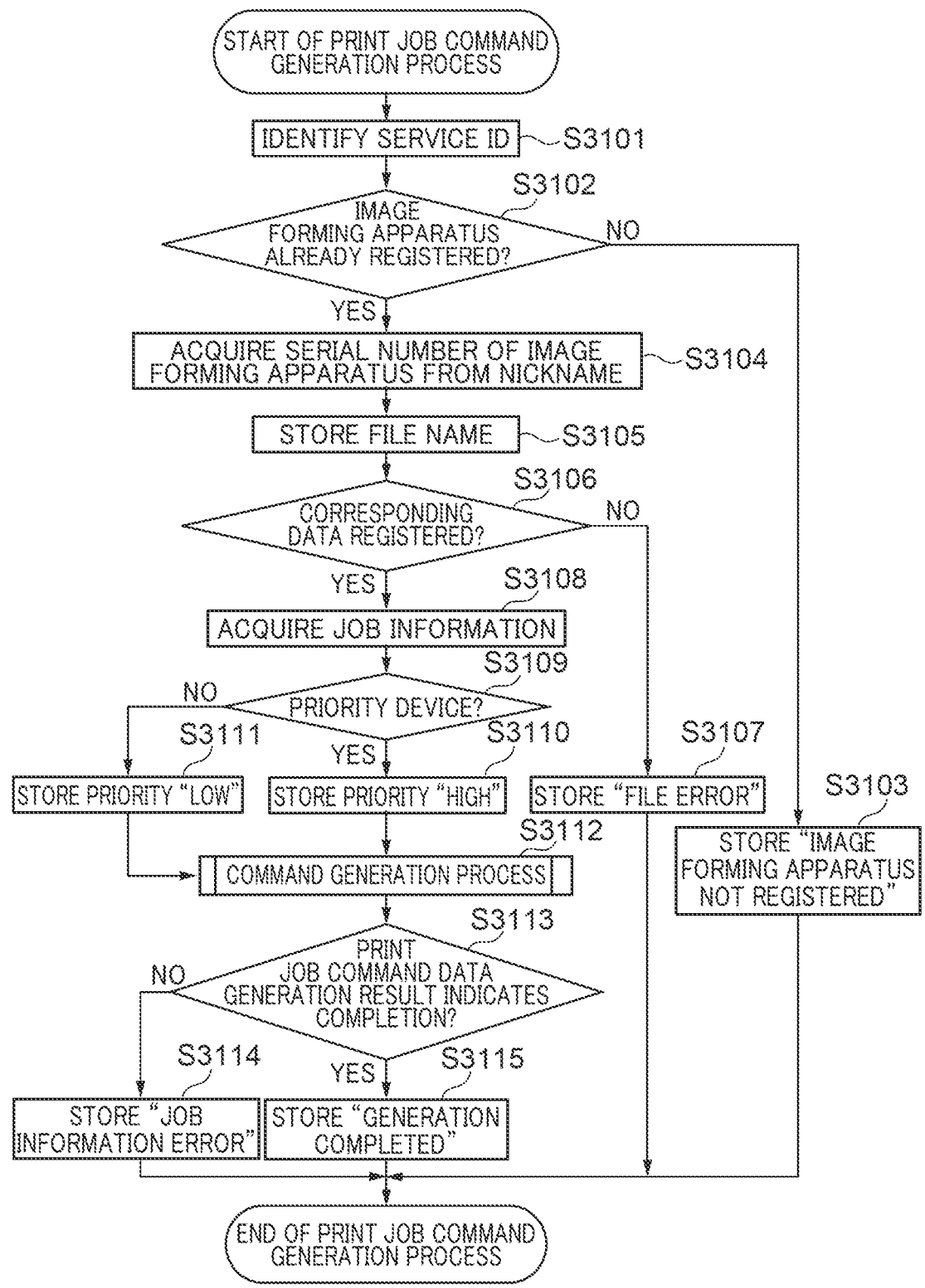
FIG. 31 is a flowchart of a print job command generation process in each of steps in FIG. 28A.

FIG. 31 is a flowchart of the print job command generation process in each of the steps S2809 and S2826 in FIG. 28A. The print job command generation process in FIG. 31 is also realized by the CPU 402 of the cloud server 103, which executes an associated program stored in the ROM 404 or the storage 405.

Referring to FIG. 31, the CPU 402 acquires the serial number of the voice control device from the voice control device information stored in the RAM 403 and extracts data matching the acquired serial number of the voice control device from the voice control device service data list. The CPU 402 identifies the service ID from the extracted data (step S3101) and stores the identified service ID in the RAM 403. Then, the CPU 402 determines whether or not an image forming apparatus associated with the acquired service ID has already been registered (step S3102). For example, the CPU 402 determines that a character string positioned after "by" in the morpheme string analysis result list stored in the RAM 403 is a nickname. The CPU 402 extracts data including both of the nickname and the acquired service ID from the nickname data list. In a case where corresponding data can be extracted from the nickname data list, the CPU 402 determines that the image forming apparatus associated with the acquired service ID has already been registered. On the other hand, in a case where corresponding data cannot be extracted from the nickname data list, the CPU 402 determines that the image forming apparatus associated with the acquired service ID has not been registered.

If it is determined in the step S3102 that the image forming apparatus associated with the acquired service ID has not been registered, the CPU 402 stores "image forming apparatus not registered" in the RAM 403 as a print job generation result (step S3103), followed by terminating the present process.

If it is determined in the step S3102 that the image forming apparatus associated with the acquired service ID has already been registered, the CPU 402 acquires the serial number of the image forming apparatus from the data extracted from the nickname data list (step S3104) and stores the acquired serial number of the image forming apparatus in the RAM 403. Then, the CPU 402 determines that a character string positioned before "by" in the morpheme string analysis result list stored in the RAM 403, is a file name, and stores the file name in the RAM 403 (step S3105). Then, the CPU 402 determines whether or not data having the file name stored in the RAM 403 as a file word has already been registered in the file management list shown in FIG. 32 (step S3106). In the file management list, information on a file to be printed is registered.

If it is determined in the step S3106 that the corresponding data has not been registered in the file management list, the CPU 403 stores "file error" in the RAM 403 as a print job generation result (step S3107), followed by terminating the present process.

If it is determined in the step S3106 that the corresponding data has already been registered in the file management list, the CPU 402 acquires a character string positioned after "Print" in the morpheme string analysis result list stored in the RAM 403 as job information (step S3108). The CPU 402 records group IDs corresponding to this character string, in a job information group ID list stored in the RAM 403. Then, the CPU 402 determines whether or not the voice control device which is the transmission source of the job request is the priority device (step S3109). In the step S3109, for example, the CPU 402 extracts data including the service ID and the serial number of the image forming apparatus, which are stored in the RAM 403, from the image forming apparatus service data list. In a case where the serial number set for the priority device of the extracted data matches the serial number of the voice control device included in the voice control device information stored in the RAM 403, the CPU 402 determines that the voice control device which is the transmission source of the job request is the priority device. On the other hand, in a case where the serial number set for the priority device of the extracted data does not match the serial number of the voice control device included in the voice control device information stored in the RAM 403, the CPU 402 determines that the voice control device which is the transmission source of the job request is not the priority device.

If it is determined in the step S3109 that the voice control device which is the transmission source of the job request is the priority device, the CPU 402 stores the priority of "high" in the RAM 403, as the priority information (step S3110). Then, the print job command generation process proceeds to a step S3112. If it is determined in the step S3109 that the voice control device which is the transmission source of the job request is not the priority device, the CPU 402 stores the priority of "low" in the RAM 403 as the priority information (step S3111). Then, the CPU 402 executes a command generation process, described hereinafter with reference to FIG. 33 (step S3112), and generates a print job command. Then, the CPU 402 determines whether or not the print job command generation result indicates "completed" (step S3113).

If it is determined in the step S3113 that the print job command generation result does not indicate "completed", the CPU 402 stores "job information error" in the RAM 403 as a print job generation result (step S3114), followed by terminating the present process. If it is determined in the step S3113 that the print job command generation result indicates "completed", the CPU 402 stores "generation completed" in the RAM 403 as the print job generation result (step S3115), followed by terminating the present process.

Figure 33:
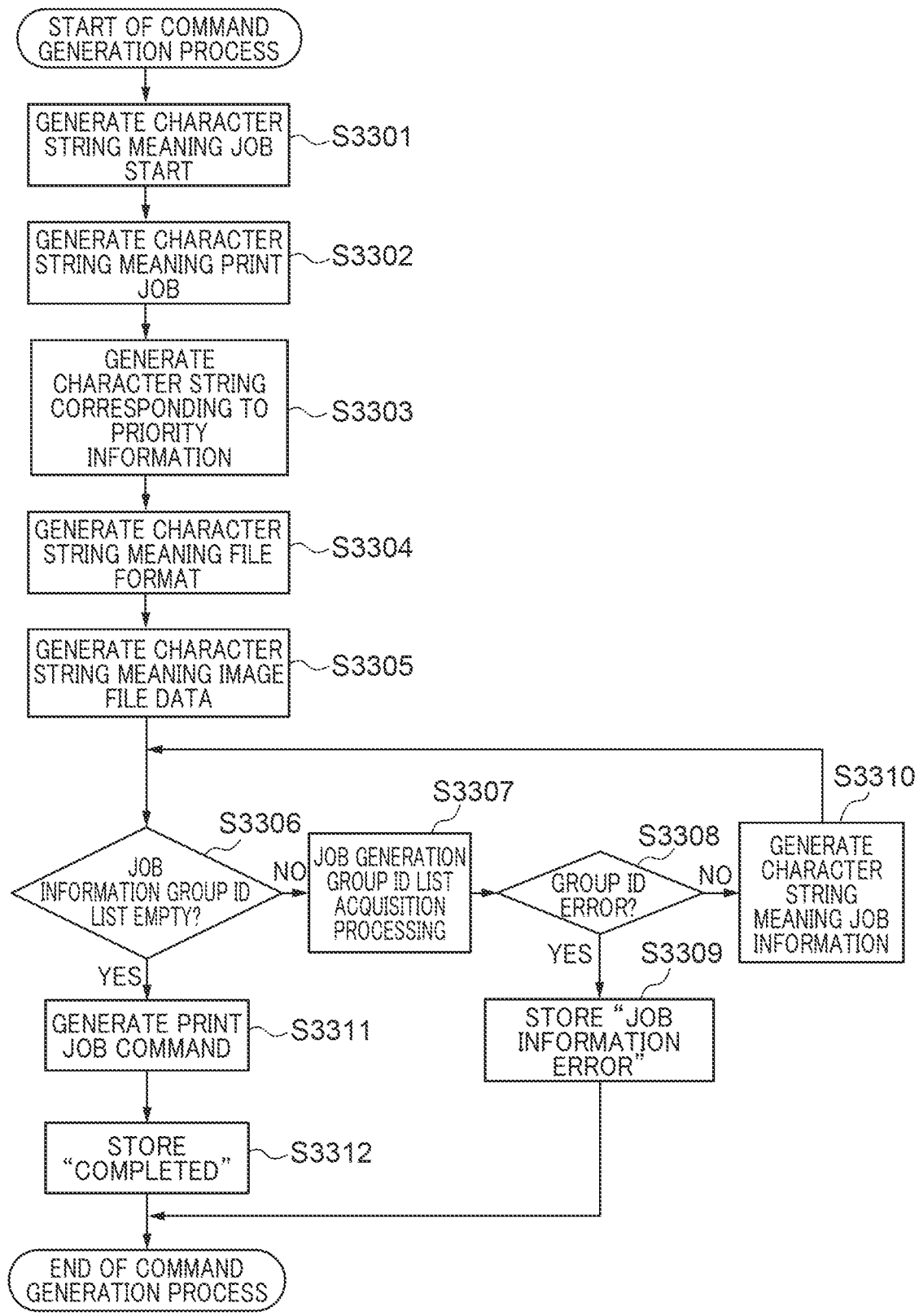
FIG. 33 is a flowchart of a command generation process in a step in FIG. 31.

FIG. 33 is a flowchart of the command generation process in the step S3112 in FIG. 31.

Referring to FIG. 33, the CPU 402 generates a character string of "operation":"jobStart" which means the start of a job (step S3301). Then, the CPU 402 generates a character string of "jobName":"Print" which means a print job (step S3302). Then, the CPU 402 generates a character string corresponding to the priority information stored in the RAM 403 in the step S3110 or S3111 (step S3303). For example, in a case where the priority information indicates the priority of "high", the CPU 402 generates a character string of "priority":"high" which means this priority. On the other hand, in a case where the priority information indicates the priority of "low", the CPU 402 generates a character string of "priority":"low" which means this priority. The CPU 402 stores the generated character string in the RAM 403 as the priority character string.

Then, the CPU 402 extracts data corresponding to the file name stored in the RAM 403 in the step S3105 from the file management list. The CPU 402 generates a character string which means the file format of the extracted data (step S3304). For example, in a case where the file format of the extracted data is "JPEG", the CPU 402 generates a character string of "format":"JPEG" and stores the generated character string in the RAM 403 as the format character string.

Then, the CPU 402 converts image file data indicated by a file path of the extracted data to binary data and generates a character string which means the image file data (step S3305). For example, in a case where the binary data of the file is "xxxx . . . ", the CPU 402 generates a character string of "data":"xxxx . . . " and stores the generated character string in the RAM 403 as the file data character string. Then, the CPU 402 determines whether or not the job information group ID list is empty (step S3306).

If it is determined in the step S3306 that the job information group ID list is not empty, the CPU 402 performs processing for acquiring a job information-generating group ID list (step S3307). In the step S3307, the CPU 402 searches the job information group ID list from the top until a group ID matches any of keywords in a job information setting rule shown in FIG. 34. In a case where a group ID matches any of the keywords, the CPU 402 stores elements in the job information group ID list from the top to the group ID matching the keyword, in the job information-generating group ID list in the RAM 403 and deletes the stored elements from the job information group ID list. Further, in a case where numeric value permission of the job information setting rule, associated with the matched keyword, is set to "Yes", a group ID indicating a number does not exist in the job information-generating group ID list, and the top element of the job information group ID list is a group ID indicating a number, the CPU 402 stores the top element of the job information group ID list in the job information-generating group ID list and deletes the top element from the job information group ID list. For example, in a case where the utterance keyword is "Print double-sided one copy", the job information group ID list is generated as {ID:NUM0001, ID:CNF00001, ID:CNF00005}, and {ID:NUM0001, ID:CNF00001}, which is retrieved until the keyword of "ID:CNF00001" matches, forms the job information-generating group ID list. Although the numeric value permission is set to "Yes", the group ID {ID:NUM00001} indicating a number is included in the job information-generating group ID list, and hence {ID:NUM0001, ID:CNF00001} is set as the job information-generating group ID list. On the other hand, in a case where the utterance keyword is "Print copy one double-sided", the job information group ID list is generated as {ID:CNF00001, ID:NUM0001, ID:CNF00005}. After storing {ID:CNF00001} retrieved until the keyword of "ID:CNF00001" matches, in the job information-generating group ID list, since the numeric value permission of CNF00001 is set to "Yes", the top element {ID:NUM00001} of the job information group ID list {ID:NUM00001, ID:CNF00005} formed by deleting the element ID:CNF00001 is stored in the job information-generating group ID list, whereby the job information-generating group ID list is formed as {ID:CNF00001, ID:NUM0001}.

Then, the CPU 402 determines whether or not a group ID error has occurred (step S3308). For example, in a case where a group ID other than a group ID indicating any of the keywords of the job information setting rule and group ID indicating a number is included in the job information-generating group ID list, or a case where the numeric value permission of the job information setting rule is set to "Yes", and there is no group ID corresponding to a number in the job information-generating group ID list, or a case where the value permission of the job information setting rule is set to "No" and there is a group ID corresponding to a number in the job information-generating group ID list, the CPU 402 determines that a group ID error has occurred. On the other hand, in a case where the above-mentioned conditions are not satisfied, the CPU 402 determines that no group ID error has occurred.

If it is determined in the step S3308 that a group ID error has occurred, the CPU 402 stores "job information error" in the RAM 403 as a print job command generation processing result (step S3309), followed by terminating the present process.

If it is determined in the step S3308 that no group ID error has occurred, the CPU 402 generates a character string which means the job information based on the job information-generating group ID list and a job command of the job information setting rule (step S3310). For example, with respect to a keyword having the numeric value permission set to "Yes" in the job information setting rule, the CPU 402 generates a character string formed by replacing the job command "#NUM#" by a number generated from a group ID corresponding to the number in the job information-generating group ID list. The CPU 402 records this character string at the end of a job information character string list stored in the RAM 403. On the other hand, with respect to a keyword having the numeric value permission set to "No" in the job information setting rule, the CPU 402 records a character string of the job command at the end of the job information character string list stored in the RAM 403. After that, the command generation process returns to the step S3306.

If it is determined in the step S3306 that the job information group ID list is empty, the CPU 402 connects the character strings generated in the steps S3301 to S3305 and S3310 to generate a print job command which is a character string of the JSON format (step S3311). The CPU 402 stores the generated print job command in the RAM 403. Then, the CPU 402 stores "completed" in the RAM 403 as a result of the print job command generation process (step S3312), followed by terminating the present process.

Figure 35:
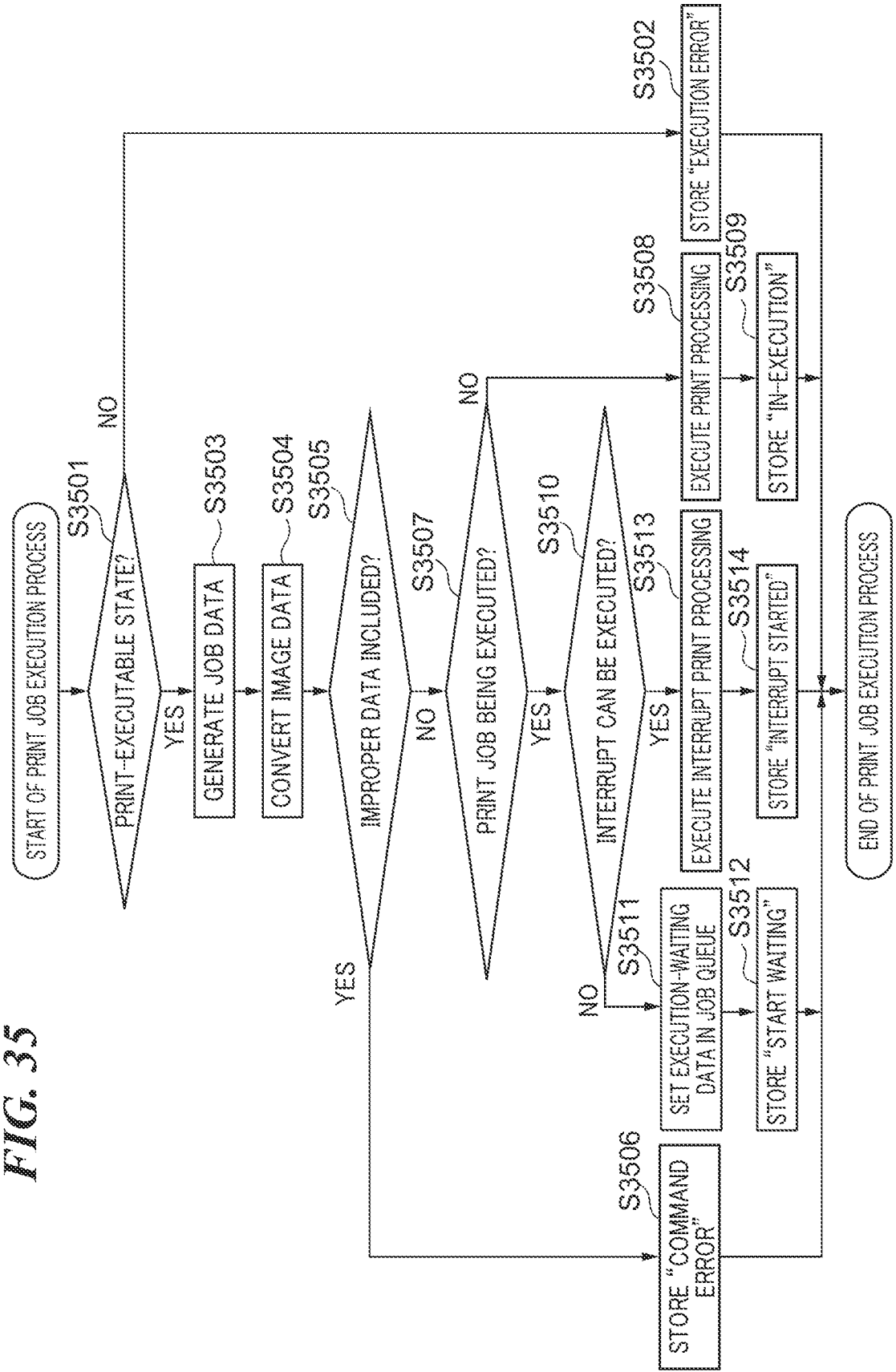
FIG. 35 is a flowchart of a print job execution process in each of steps in FIG. 28A.

FIG. 35 is a flowchart of the print job execution process in each of the steps S2811 and S2828 in FIG. 28A. The print job execution process in FIG. 35 is realized by the CPU 202 of the image forming apparatus 101, which executes an associated program stored in the ROM 204 or the storage 205.

Referring to FIG. 35, the CPU 202 determines whether or not the image forming apparatus 101 is in a state capable of executing printing (step S3501). For example, in a case where the image forming apparatus 101 is in a state incapable of executing the print operation, such as an error state or a print jam state, the CPU 202 determines that the image forming apparatus 101 is not in the state capable of executing printing. On the other hand, in a case where the image forming apparatus 101 is not in the above-mentioned state incapable of executing the print operation, the CPU 202 determines that the image forming apparatus 101 is in the state capable of executing printing.

If it is determined in the step S3501 that the image forming apparatus 101 is not in the state capable of executing printing, the CPU 202 stores "execution error" in the RAM 203 as a print job execution result (step S3502), followed by terminating the present process.

If it is determined in the step S3501 that the image forming apparatus 101 is in the state capable of executing printing, the CPU 202 generates job data based on a print job command received from the cloud server 103 (step S3503). For example, in a case where the print job command is a normal print job command shown in FIG. 29, the CPU 202 generates job data of "job name: print" based on "jobName": "Print". Further, the CPU 202 assigns a "job ID" which is assigned to each job generated by the image forming apparatus 101 from 1 in an ascending order, and sets "priority: low" in the job data based on "priority":"low" of the print job command. Further, the CPU 202 sets the print job parameter of "number of copies" of the generated job data to "1", based on "copies":"1" of the print job command. The CPU 202 stores the generated job data in the RAM 203 as execution waiting print job data. Here, for a job setting which is not specified by the print job command, a default setting value stored in the storage 205 of the image forming apparatus 101 is set.

Then, the CPU 202 converts the image data specified by the print job command to image data of a format which can be interpreted by the print engine 211 (step S3504). Then, the CPU 202 determines whether or not improper data is included in the generated job data (step S3505). In the step S3505, for example, in a case where although the print engine 211 of the image forming apparatus 101 is capable of performing only single-sided printing, "douplex: on" is specified, the CPU 202 determines that improper data is included in the generated job data.

If it is determined in the step S3505 that improper data is included in the generated job data, the CPU 202 stores "command error" in the RAM 203 as the print job execution result (step S3506), followed by terminating the present process. If it is determined in the step S3505 that improper data is not included in the generated job data, the CPU 202 determines whether or not there is a print job being executed in a job queue of the RAM 203 of the image forming apparats 101 (step S3507).

If it is determined in the step S3507 that there is no print job being executed in the job queue of the RAM 203, the CPU 202 executes print processing based on the job data generated in the step S3505 (step S3508). Then, the CPU 202 stores "in-execution" in the RAM 203 as the print job execution result (step S3509), followed by terminating the present process.

If it is determined in the step S3507 that there is a print job being executed in the job queue of the RAM 203, the CPU 202 determines whether or not an interrupt can be executed (step S3510). For example, in a case where the priority setting of the execution waiting print job data is "priority: high" and the priority setting of the data of the job being executed is "priority: low", the CPU 202 determines that an interrupt can be executed. On the other hand, in a case where the priority setting of the execution waiting print job data is "priority: low" and the priority setting of the data of the job being executed is "priority: high", the CPU 202 determines that an interrupt cannot be executed.

If it is determined in the step S3510 that an interrupt cannot be executed, the CPU 202 sets the execution waiting print job data at the end of the job queue of the RAM 203 (step S3511). With this, the print job of this execution waiting print job data is to be executed after completion of the job being executed. Then, the CPU 202 stores "start waiting" in the RAM 203 as the print job execution result (step S3512), followed by terminating the present process.

If it is determined in the step S3510 that an interrupt can be executed, the CPU 202 executes interrupt print processing (step S3513). In the interrupt print processing, the CPU 202 transmits a temporary suspension command which designates the job ID of the print job being executed to the print engine 211 via the print controller 210 and causes the print engine 211 to suspend the print job being executed. With this, the state of the print job is changed from "in-execution" to "suspended", and the execution waiting print job data is set to the top of the job queue of the RAM 203. The CPU 202 instructs the print engine 211 via the print controller 210 to start the print job of the execution waiting print job data. Then, the CPU 202 stores "interrupt started" in the RAM 203 as the print job execution result (step S3514), followed by terminating the present process.

Figure 36:
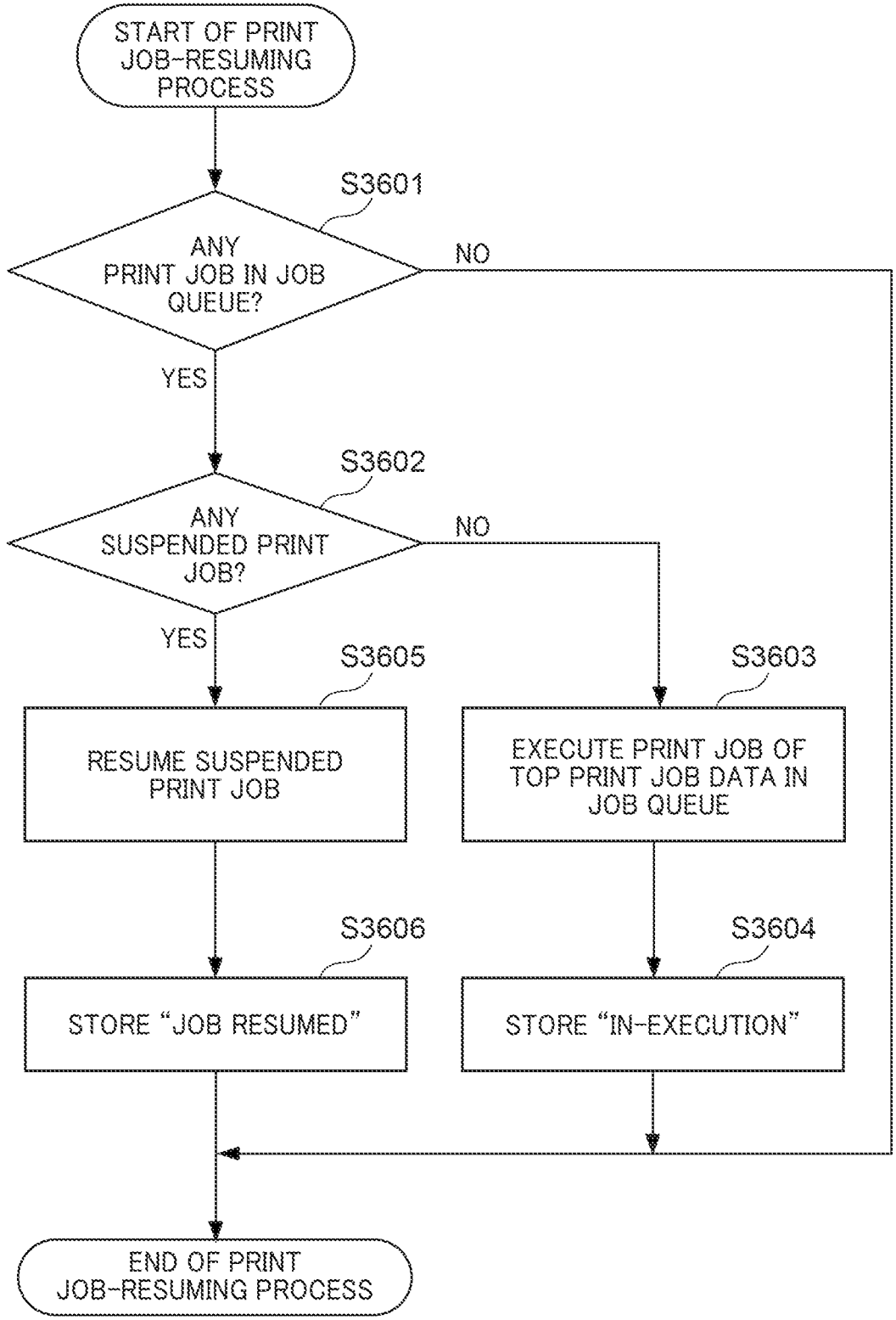
FIG. 36 is a flowchart of a print job-resuming process in a step in FIG. 28B.

FIG. 36 is a flowchart of the print job-resuming process in the step S2846 in FIG. 28B. The print job-resuming process in FIG. 36 is realized by the CPU 202 of the image forming apparatus 101, which executes an associated program stored in the ROM 204 or the storage 205.

Referring to FIG. 36, the CPU 202 determines whether or not there is any print job in the job queue of the RAM 203 (step S3601).

If it is determined in the step S3601 that there is no print job in the job queue of the RAM 203, the CPU 202 terminates the present process. If it is determined in the step S3601 that there is a print job in the job queue of the RAM 203, the CPU 202 determines whether or not there is a print job of which the job state is "suspended" in the job queue of the RAM 203 (step S3602).

If it is determined in the step S3602 that there is no print job of which the job state is "suspended" in the job queue of the RAM 203, the CPU 202 executes a print job of print job data, at the top of the job queue (step S3603). Then, the CPU 202 stores "in-execution" in the RAM 203 as a print job execution result (step S3604), followed by terminating the present process.

If it is determined in the step S3602 that there is a print job of which the job state is "suspended" in the job queue of the RAM 203, the CPU 202 resumes the print job of which the job state is "suspended" (step S3605). Then, the CPU 202 stores "job resumed" in the RAM 203 as the print job execution result (step S3606), followed by terminating the present process.

Figure 37A:
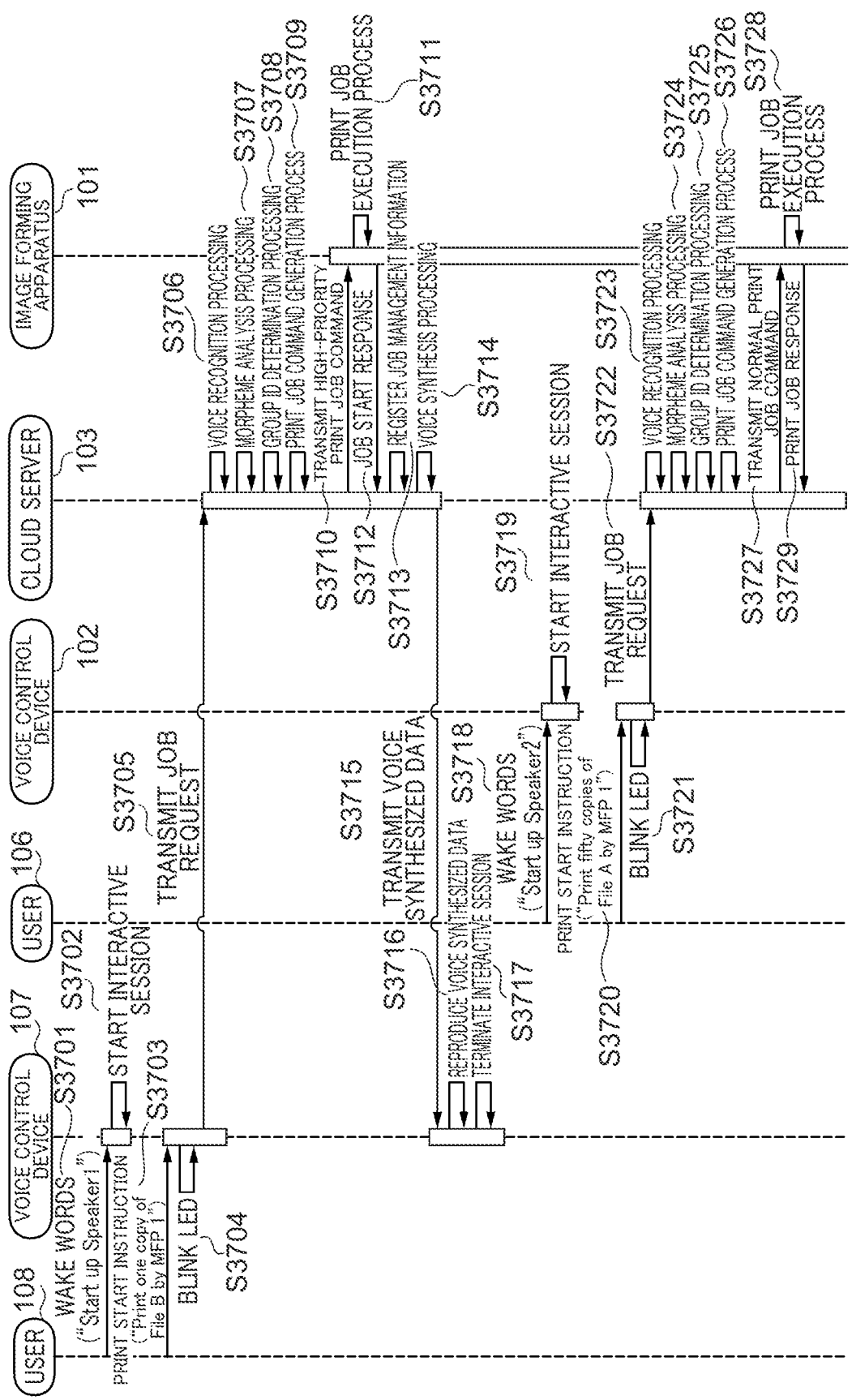
FIGS. 37A and 37B are a sequence diagram showing a second example of the voice operation control performed by the information processing system according to the second embodiment.
Figure 37B:
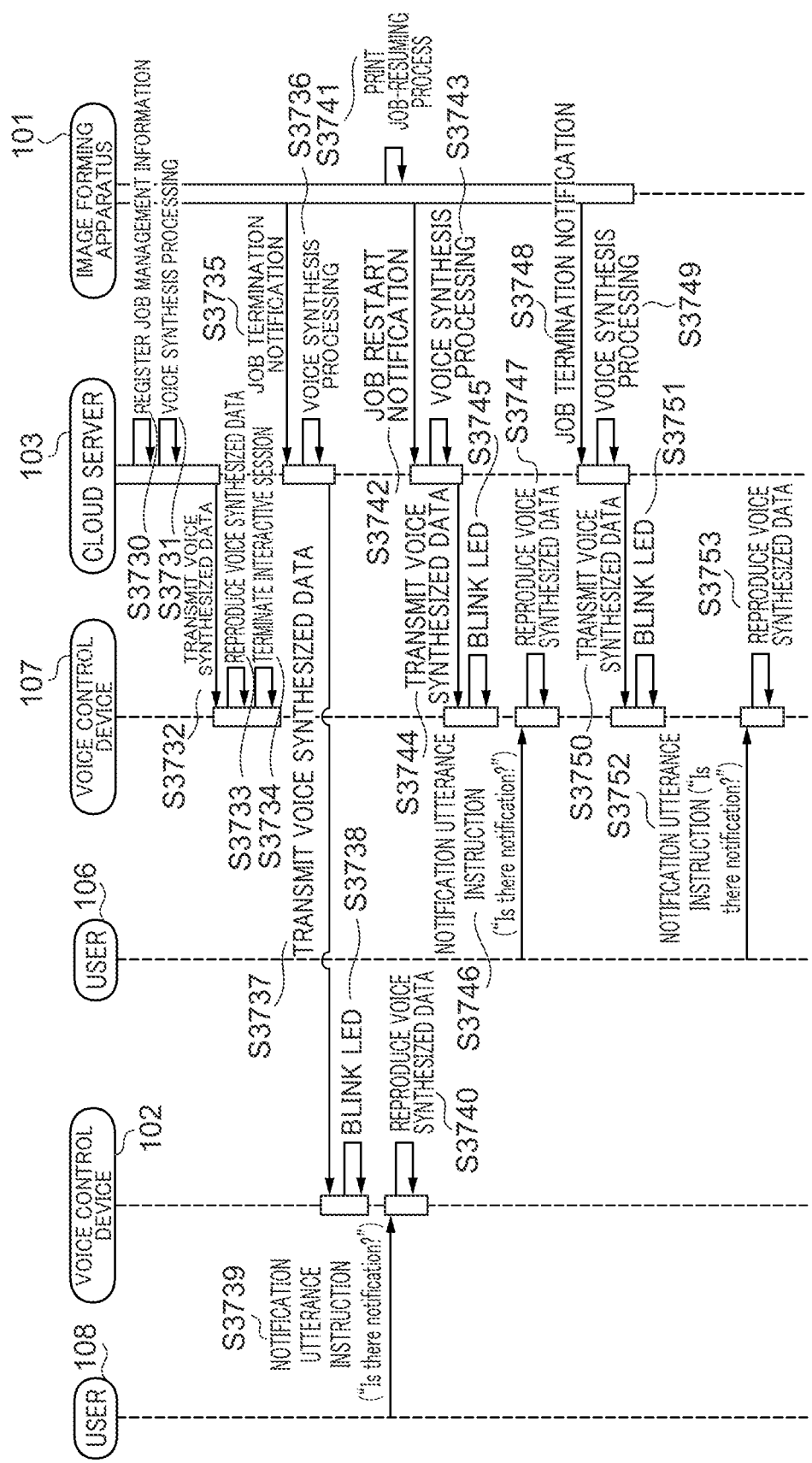

FIGS. 37A and 37B are a sequence diagram showing a second example of the voice operation control performed by the information processing system 100 according to the second embodiment. The voice operation control in FIGS. 37A and 37B is basically the same as the voice operation control in FIGS. 28A and 28B, and the following description will be given of different points from the voice operation control in FIGS. 28A and 28B. In FIGS. 37A and 37B, a case will be described, by way of example, where job requests are transmitted respectively from the voice control device 102 and the voice control device 107 in the mentioned order. Also in the voice operation control in FIGS. 37A and 37B, it is assumed that the user 106 has registered the above-mentioned user information via the application provided by the service corresponding to the service URL "http://service1.com" managed by the cloud server 103, the WebAPI, and so forth, in advance. Further, it is assumed that the voice control device 107 and the voice control device 102 have already been registered by the registration process in FIG. 9 and the image forming apparatus 101 has already been registered by the registration process in FIG. 19, and the voice control device 102 has already been registered as the priority device for the image forming apparatus 101. Note that also in the voice operation control in FIGS. 37A and 37B, the voice control device 102, the image forming apparatus 101, and the cloud server 103 are in the state communicable with one another. Further, the image forming apparatus 101 is in a state capable of calling copy, scan, print, and the like functions, after started up by powering-on.

Referring to FIGS. 37A and 37B, steps S3701 to S3711 which are the same as the above-described steps S2818 to S2828 are executed. With these steps, the image forming apparatus 101 starts a print job based on the job request transmitted from the voice control device 102 set as the priority device.

Then, the CPU 202 of the image forming apparatus 101 transmits a job start response to the cloud server 103 via the network interface 206 (step S3712). This job start response includes the job ID of "1" indicating the print job started in the step S3711 and "in-execution" indicating the job status. After that, steps S3713 and S3714 which are the same as the steps S2813 and S2814 are executed, and the CPU 402 of the cloud server 103 generates voice synthesized data.

Then, the CPU 402 transmits the generated voice synthesized data to the voice control device 102 via the network interface 406 (step S3715).

The CPU 302 of the voice control device 102 reproduces the received voice synthesized data (step S3716), and further, terminates the interactive session similarly to the step S2817 (step S3717).

Then, steps S3718 to S3727 which are the same as the above-described steps S2801 to S2810 are executed. With these steps, a normal print job command is transmitted from the cloud server 103 to the image forming apparatus 101 based on the job request transmitted from the voice control device 107.

The CPU 202 of the image forming apparatus 101 stores the received normal print job command in the RAM 203 and executes the above-described print job execution process in FIG. 35 (step S3728). In the step S3728, since the priority of the voice control device 102 which is the requesting source of the print job being executed is higher than the priority of the voice control device 107, execution of the interrupt of the print job based on the job request transmitted from the voice control device 107 is not performed. The CPU 202 executes the steps 3511 and S3512 to cause execution of the print job based on the job request transmitted from the voice control device 107 to wait. Then, the CPU 202 transmits a print job response to the cloud server 103 via the network interface 206 (step S3729). This print job response includes the job ID of "2" corresponding to the print job based on the job request transmitted from the voice control device 107 and "start waiting" indicating an execution result of this print job.

The CPU 402 of the cloud server 103 registers job management information at the end of the job management information list stored in the RAM 403 (step S3730). This job management information includes the serial number of the voice control device 107, the serial number of the image forming apparatus 101, the job ID of "2", and "start waiting" indicating the execution result of this print job. Then, the CPU 402 performs the voice synthesis processing (step S3731). In the step S3731, voice synthesized data of voice, for example, "Print job will be started after finishing the print job being executed" is generated. Then, the CPU 402 transmits the generated voice synthesized data to the voice control device 107 via the network interface 406 (step S3732).

The CPU 302' of the voice control device 107 reproduces the received voice synthesized data (step S3733). When this voice synthesized data is reproduced, the voice, for example, "Print job will be started after finishing the print job being executed", is output from the speaker 310'. Then, the CPU 302' terminates the interactive session started in the step S3719 (step S3734).

When the print job based on the high-priority print job command, which was started in the step S3711, is completed, the CPU 202 of the image forming apparatus 101 transmits a job termination notification to the cloud server 103 via the network interface 206 (step S3735). Then, steps S3736 to S3740 which are the same as the steps S2841 to S2845 are executed.

On the other hand, after transmitting the job termination notification to the cloud server 103 in the step S3735, the CPU 202 of the image forming apparatus 101 executes the above-described print job-resuming process described hereinabove with reference to FIG. 36 (step S3741). With the process in the step S3741, the CPU 202 executes the print job in the waiting state, more specifically, the print job based on the job request transmitted from the voice control device 107. Then, steps S3742 to S3753 which are the same as the steps S2847 to S2858 are executed.

In the above-described second embodiment, a job associated with a voice instruction received by a voice control device set as the priority device out of the voice control device 102 and the voice control device 107 is preferentially executed. With this, it is possible to immediately execute a print job associated with a voice instruction received by the voice control device set as the priority device.

Note that in the above-described second embodiment, the user 106 may instruct registration of the image forming apparatus 101 by operating the console panel 209 and instruct registration of the priority device for the image forming apparatus 101 using the voice control device 102.

Figure 38:
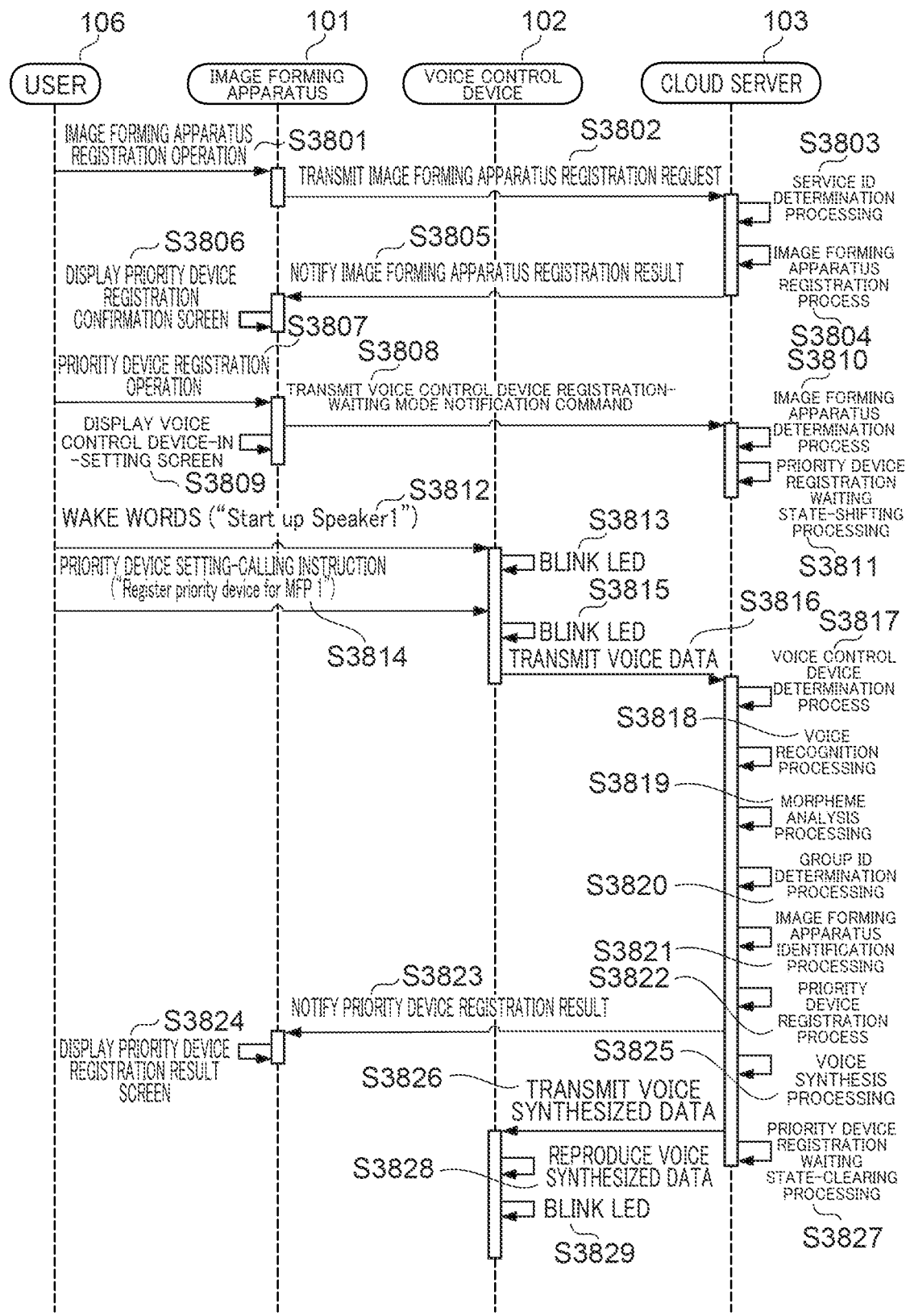
FIG. 38 is a sequence diagram useful in explaining a second example of registration of an image forming apparatus for the information processing system according to the second embodiment.

FIG. 38 is a sequence diagram useful in explaining a second example of registration of an image forming apparatus in the information processing system 100 according to the second embodiment. In FIG. 38, a case will be described, by way of example, where the user 106 instructs registration of the image forming apparatus 101 by operating the console panel 209 and further, instructs registration of the priority device for the image forming apparatus 101 using the voice control device 102. Note that the registration process in FIG. 38 is partially the same as the registration process in FIG. 19, and the following description will be given of different points from the registration process in FIG. 19. Also in FIG. 38, it is assumed that the user 106 has registered the above-mentioned user information via the application provided by the service corresponding to the service URL "http://service1.com" managed by the cloud server 103, the WebAPI, and so forth, in advance. Further, in FIG. 38, it is assumed that a voice control service-setting screen 3901 appearing in FIG. 39, which is similar in function and configuration to the voice control service-setting screen 2001, is displayed on the console panel 209 of the image forming apparatus 101.

Referring to FIG. 38, first, steps S3801 to S3806 which are the same as the steps S1901 to S1906 are executed. With these steps, the image forming apparatus 101 is registered, and a priority device registration confirmation screen 3903 appearing in FIG. 39, which has the same function and configuration as the priority device registration confirmation screen 2003, is displayed on the console panel 209.

After that, the user 106 performs the operation for registering the priority device (step S3807). More specifically, the user 106 presses a "Yes" button 3904 on the priority device registration confirmation screen 3903 displayed on the console panel 209.

When the priority device registration operation is performed, the CPU 202 of the image forming apparatus 101 transmits a voice control device registration-waiting mode notification command to the cloud server 103 via the network interface 206 (step S3808). The voice control device registration-waiting mode notification command includes the serial number of the image forming apparatus 101 and the service ID input in the step S3801. Further, the CPU 202 displays a priority device-setting screen 3905 appearing in FIG. 39 on the console panel 209 (step S3809). The priority device-setting screen 3905 shows a method of registering a priority device for the image forming apparatus 101 using a voice control device.

The CPU 402 of the cloud server 103 stores the service ID and the serial number of the image forming apparatus 101, which are included in the received voice control device registration-waiting mode notification command in the RAM 403 as the image forming apparatus information. Then, the CPU 402 executes steps S3810 and S3811 which are the same as the above-described steps S1909 and S1910.

After that, the user 106 utters wake words to the voice control device 102 (step S3812). The wake words are e.g. "Start up Speaker 1".

When it is detected that the user 106 has uttered the wake words, the CPU 302 of the voice control device 102 controls the display controller 311 to blink the LED 312 (step S3813) and starts an interactive session.

After the interactive session has been started, the user 106 utters a keyword serving as a priority device setting-calling instruction to the voice control device 102 (step S3814). This keyword is e.g. "Register priority device for MFP 1" displayed on the priority device-setting screen 3905.

When it is detected that the user 106 has uttered the keyword, the CPU 302 of the voice control device 102 controls the display controller 311 to blink the LED 312 (step S3815). Then, the CPU 302 transmits the voice data of the voice uttered by the user 106 in the step S3814 and the serial number of the voice control device 102 to the cloud server 103 via the network interface 306 (step S3816).

The CPU 402 of the cloud server 103 stores the received serial number of the voice control device 102 in the RAM 403 as the voice control device information, and executes a voice control device determination process, described hereinafter with reference to FIG. 40 (step S3817). Then, the CPU 402 performs the voice recognition processing on the voice data received in the step S3816 (step S3818). Text, such as "Register priority device for MFP 1", is generated by this voice recognition processing. Then, the CPU 402 performs the morpheme analysis processing on the text generated in the step S3818 (step S3819). With this morpheme analysis processing, text, such as "Register priority device for MFP 1", is analyzed as a morpheme string of "Register", "priority", "device", "for", "M", "F", "P", and "1".

Then, the CPU 402 performs the group ID determination processing on the analyzed morpheme string (step S3820). In the group ID determination processing, for example, matching between the morpheme string of "Register", "priority", "device", "for", "M", "F", "P", and "1" and the group ID list shown in FIGS. 7B1 to 7B4 is performed. As a group ID determination result, {ID:OPR00046, ID:NAM00002, ID:NAM00001, ID:ALP00013, ID:ALP00006, ID:ALP00016, ID:NUM00001} is generated.

Then, the CPU 402 performs image forming apparatus identification processing (step S3821). In the step S3821, the CPU 402 judges that the request received from the voice control device 102 is a priority device registration request based on the order of "ID:OPR00046, ID:NAM00002, ID:NAM00001" in the group ID determination result. Further, the CPU 402 generates a character string "MFP 1" from the morpheme arranged after "for" in the morpheme string analyzed in the step S3819 and judges this character string as the nickname of the image forming apparatus for which the priority device is to be registered. The CPU 402 acquires the serial number of the image forming apparatus 101 from the service ID stored in the RAM 403 and the nickname. The CPU 402 stores this serial number of the image forming apparatus 101 and the serial number of the voice control device 102 transmitted from the voice control device 102 in the step S3816 in the RAM 403 as the priority device setting information.

Then, the CPU 402 executes the above-described priority device registration process described with reference to FIG. 27 (step S3822) and sets the voice control device 102 as the priority device for the image forming apparatus 101. When registration of the priority device for the image forming apparatus 101 is completed, the CPU 402 transmits "registration completion" to the image forming apparatus 101 via the network interface 406 as a priority device registration result obtained by the executed priority device registration process (step S3823).

Figure 39:
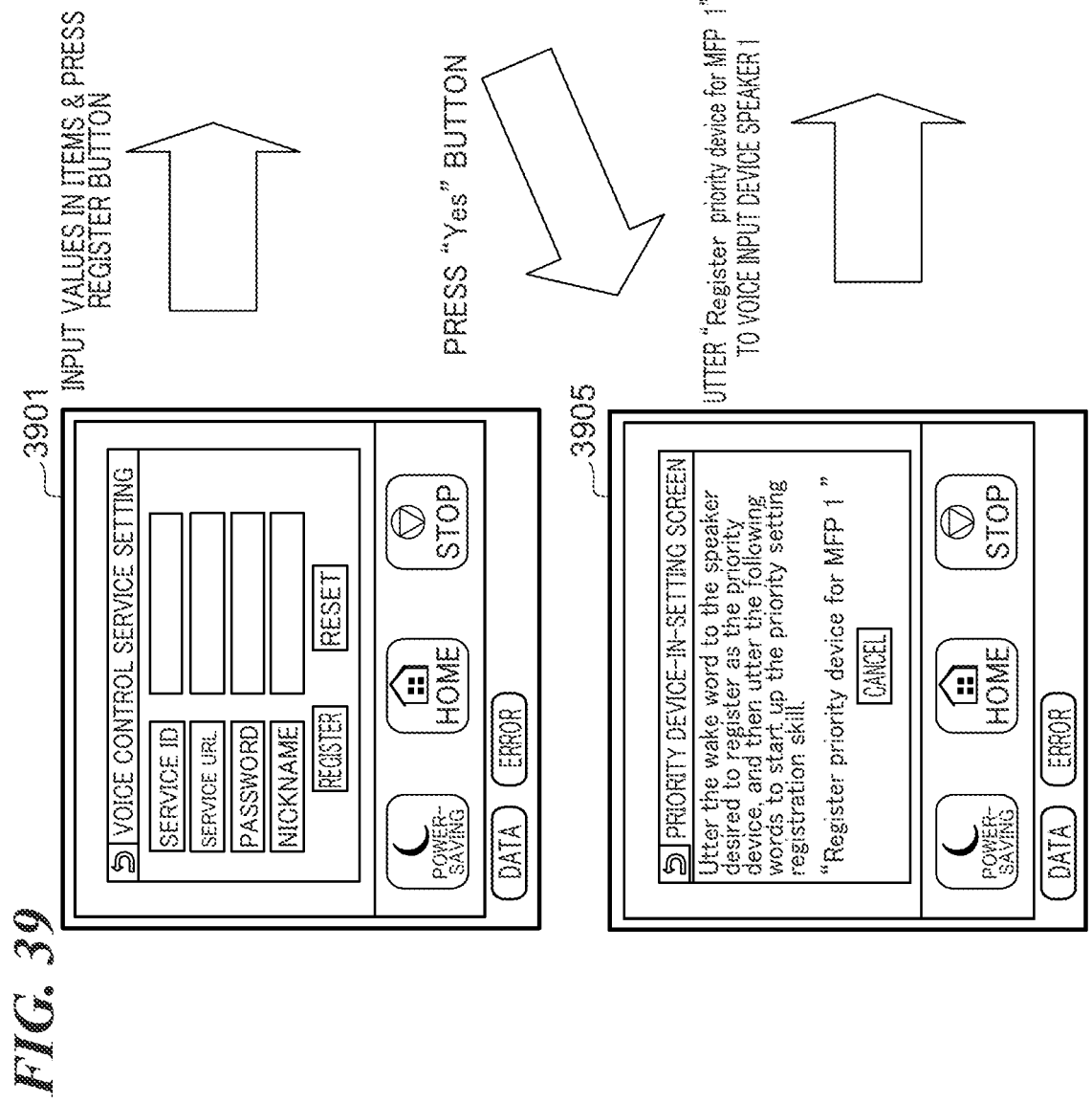
FIG. 39 is a diagram showing changes in a screen occurring when setting a priority image forming apparatus for the information processing system according to the second embodiment.

The CPU 202 of the image forming apparatus 101 displays a priority device registration result screen 3906 appearing in FIG. 39 on the console panel 209 (step S3824). On the priority device registration result screen 3906, a message to the effect that registration of the priority device is completed is displayed.

On the other hand, when transmission of the priority device registration result in the step S3823 is completed, the CPU 402 of the cloud server 103 performs the voice synthesis processing (step S3825). In the step S3825, voice synthesized data of voice, for example, "Device is set as priority device for MFP 1", is generated. Then, the CPU 402 transmits the generated voice synthesized data to the voice control device 102 via the network interface 406 (step S3826). Further, the CPU 402 executes a step S3827 which is the same as the above-described step S1918.

The CPU 302 of the voice control device 102 reproduces the received voice synthesized data (step S3828). When this voice synthesized data is reproduced, the voice, for example, "Device is set as priority device for MFP 1", is output from the speaker 310. Then, the CPU 302 controls the display controller 311 to blink the LED 312 (step S3829) and terminates the interactive session started in the step S3813, followed by terminating the present process.

Figure 40:
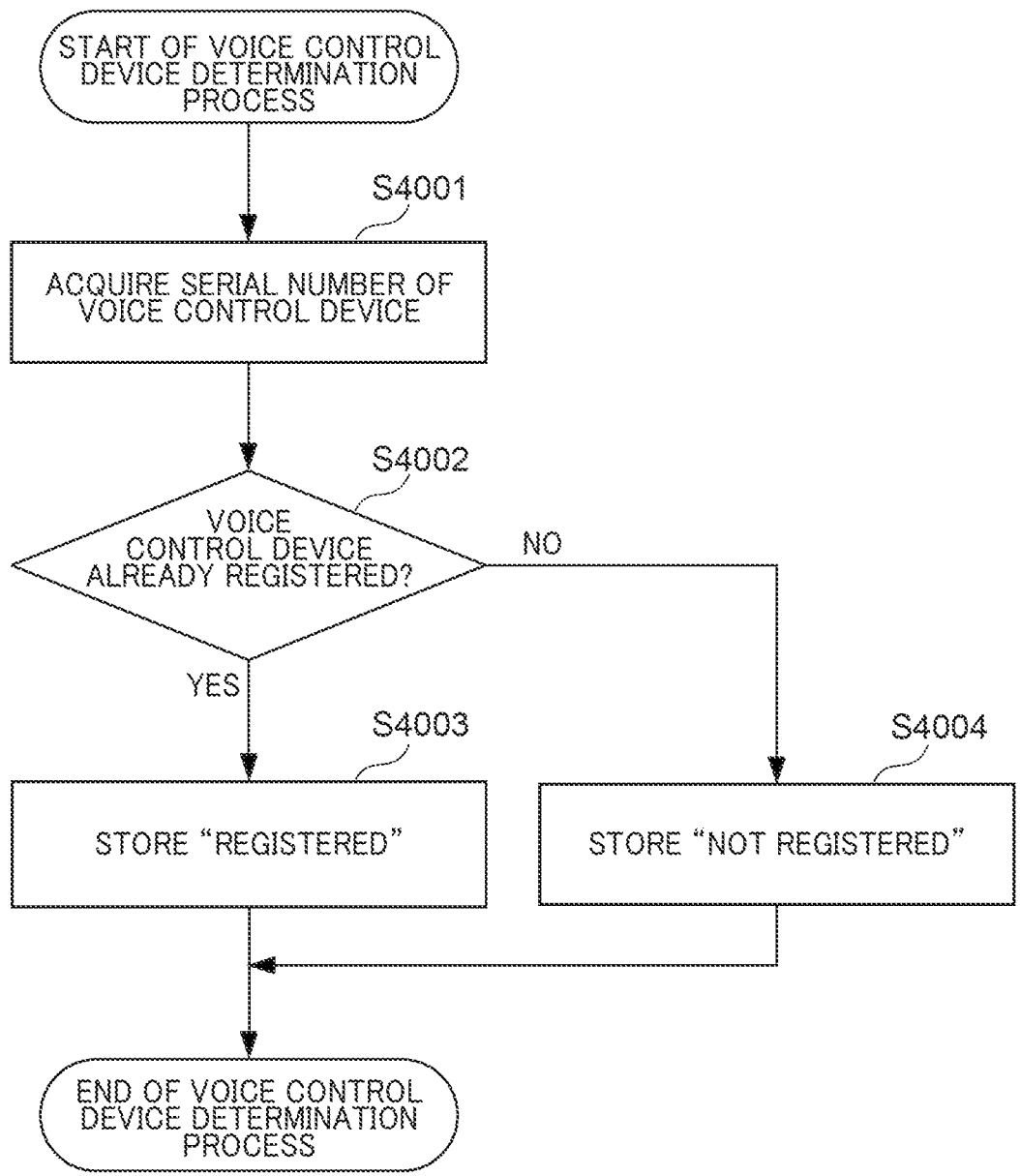
FIG. 40 is a flowchart of a voice control device determination process in a step in FIG. 38.

FIG. 40 is a flowchart of the voice control device determination process in the step S3817 in FIG. 38. The voice control device determination process in FIG. 40 is realized by the CPU 402 of the cloud server 103, which executes an associated program stored in the ROM 404 or the storage 405.

Referring to FIG. 40, the CPU 402 acquires the serial number of the voice control device 102 from the voice control device information stored in the RAM 403 (step S4001). Then, the CPU 402 determines whether or not the voice control device corresponding to the acquired serial number has already been registered (step S4002). For example, in a case where the acquired serial number has been set in the above-mentioned image forming apparatus service data list, the CPU 402 determines that the voice control device corresponding to the acquired serial number has already been registered. On the other hand, in a case where the acquired serial number has not been set in the above-mentioned image forming apparatus service data list, the CPU 402 determines that the voice control device corresponding to the acquired serial number has not been registered.

If it is determined in the step S4002 that the voice control device corresponding to the acquired serial number has already been registered, the CPU 402 stores "registered" in the RAM 403 as a voice control device determination result (step S4003), followed by terminating the present process.

If it is determined in the step S4002 that the voice control device corresponding to the acquired serial number has not been registered, the CPU 402 stores "not registered" in the RAM 403 as the voice control device determination result (step S4004), followed by terminating the present process.

Thus, in the above-described embodiment, only by uttering the keyword serving as the priority device setting-calling instruction to a voice control device desired to be set as the priority device for the image forming apparatus 101, the user can register the corresponding voice control device as the priority device for the image forming apparatus 101.

Note that the priority device registration method is not limited to the above-described method. For example, after an image forming apparatus is registered with a service, the priority device may be registered from another screen, or the priority device may be registered by using a management service of the cloud server 103.

Further, in the above-described embodiment, the image forming apparatus 101 or the image forming apparatus 110 may perform the above-described variety of processes performed by the cloud server 103 by executing the voice data conversion control program. In this case, the voice control device 102 and the voice control device 107 transmit a job request and the like, directly to the image forming apparatus 101 or the image forming apparatus 110 without via the cloud server 103.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-096097, filed Jun. 8, 2021, which is hereby incorporated by reference herein in its entirety.

What is claimed is:

1. An information processing system comprising:
an information processing apparatus;
a first voice control device that receives a voice instruction to the information processing apparatus; and
a second voice control device that receives a voice instruction to the information processing apparatus;
at least one processor; and
a memory coupled to the at least one processor, the memory having instructions that, when executed by the processor, perform the operations as:
   a control unit configured to preform control for causing the information processing apparatus to execute a job based on information on which of the first voice control device and the second voice control device is a device which is to be preferentially used.

2. The information processing system according to claim 1, wherein the control unit sets operating authority over the information processing apparatus for one of the first voice control device and the second voice control device and causes the information processing apparatus to execute a job associated with a voice instruction received by the voice control device for which the operating authority over the information processing apparatus is set.

3. The information processing system according to claim 2, wherein the control unit sets the operating authority over the information processing apparatus for a voice control device that has received a voice instruction first, out of the first voice control device and the second voice control device.

4. The information processing system according to claim 2, wherein the control unit sets the operating authority over the information processing apparatus for a voice control device that has received a word indicating urgency, out of the first voice control device and the second voice control device.

5. The information processing system according to claim 2, wherein the instructions perform the operations also as:
   a first setting unit configured to set priorities for the first voice control device and the second voice control device, and
   wherein the control unit sets the operating authority over the information processing apparatus for a voice control device for which a higher priority is set, out of the first voice control device and the second voice control device.

6. The information processing system according to claim 5, wherein in a case where, during execution of a job associated with a voice instruction received by the first voice control device by the information processing apparatus, the second voice control device for which the higher priority than that of the first voice control device is set receives another voice instruction, the control unit changes the setting of the operating authority over the information processing apparatus from the first voice control device to the second voice control device.

7. The information processing system according to claim 6, wherein the control unit causes the information processing apparatus to suspend the job associated with the voice instruction received by the first voice control device and execute the other job associated with the other voice instruction received by the second voice control device as an interrupt.

8. The information processing system according to claim 7, wherein after the information processing apparatus completes the other job, the control unit causes the information processing apparatus to resume the suspended job associated with the voice instruction received by the first voice control device.

9. The information processing system according to claim 6, wherein in a case where the other voice instruction is a request for checking a status of the information processing apparatus, the control unit holds the operating authority over the information processing apparatus in a state set for the first voice control device.

10. The information processing system according to claim 1, further comprising a server that relays between the information processing apparatus and the first voice control device or the second voice control device,
   wherein the server includes the control unit.

11. The information processing system according to claim 1, wherein the instructions perform the operations also as:
   a second setting unit configured to set one of the first voice control device and the second voice control device as a priority device, and
   wherein the control unit causes the information processing apparatus to preferentially execute a job associated with a voice instruction received by a voice control device set as the priority device.

12. The information processing system according to claim 11, wherein the second voice control device is set as the priority device, and
   wherein in a case where, during execution of a job associated with a voice instruction received by the first voice control device by the information processing apparatus, the second voice control device receives another voice instruction, the control unit causes the information processing apparatus to suspend the job associated with the voice instruction received by the first voice control device and execute the other job associated with the other voice instruction received by the second voice control device as an interrupt.

13. A method of controlling an information processing system including an information processing apparatus, a first voice control device that receives a voice instruction to the information processing apparatus, and a second voice control device that receives a voice instruction to the information processing apparatus, comprising:
   preforming control for causing the information processing apparatus to execute a job based on information on which of the first voice control device and the second voice control device is a device which is to be preferentially used.

14. A non-transitory computer-readable storage medium storing a program for causing a computer to execute a method of controlling an information processing system including an information processing apparatus, a first voice control device that receives a voice instruction to the information processing apparatus, and a second voice control device that receives a voice instruction to the information processing apparatus, the method comprising:
   preforming control for causing the information processing apparatus to execute a job based on information on which of the first voice control device and the second voice control device is a device which is to be preferentially used.

* * * * *